(12) United States Patent
Visser et al.

(10) Patent No.: US 9,354,310 B2
(45) Date of Patent: May 31, 2016

(54) SYSTEMS, METHODS, APPARATUS, AND COMPUTER-READABLE MEDIA FOR SOURCE LOCALIZATION USING AUDIBLE SOUND AND ULTRASOUND

(75) Inventors: Erik Visser, San Diego, CA (US); Brian Momeyer, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 13/198,122

(22) Filed: Aug. 4, 2011

(65) Prior Publication Data

US 2012/0224456 A1 Sep. 6, 2012

Related U.S. Application Data

(60) Provisional application No. 61/448,950, filed on Mar. 3, 2011.

(51) Int. Cl.
*G01S 15/00* (2006.01)
*G01S 15/87* (2006.01)
*G01S 3/80* (2006.01)
*G01S 7/521* (2006.01)
*G01S 15/02* (2006.01)
(Continued)

(52) U.S. Cl.
CPC ............ *G01S 15/876* (2013.01); *G01S 3/8006* (2013.01); *G01S 7/521* (2013.01); *G01S 15/025* (2013.01); *G01S 15/42* (2013.01); *G01S 2013/468* (2013.01); *G01S 2015/465* (2013.01)

(58) Field of Classification Search
CPC ................................. G01S 3/808; G01S 15/89

USPC .................................................. 367/124, 127
See application file for complete search history.

(56) References Cited

U.S. PATENT DOCUMENTS 6,061,022 A * 5/2000 Menegozzi et al. ........... 342/442
6,205,380 B1 3/2001 Bauer et al.
(Continued)

FOREIGN PATENT DOCUMENTS

CN 101213476 A 7/2008
CN 102458255 A 5/2012
(Continued)

OTHER PUBLICATIONS

Ming, Doa Estimation of Speech Source With Microphone Arrays, Circuits and Systems, 1998. ISCAS '98 May 31,-Jun. 3, 1998, vol. 5, pp. 293-296, http://ieeexplore.ieee.org/xpls/abs_all.jsp?arnumber=694469&tag=1.*
(Continued)

*Primary Examiner* — Luke Ratcliffe
*Assistant Examiner* — Hovhannes Baghdasaryan
(74) *Attorney, Agent, or Firm* — Austin Rapp & Hardman

(57) ABSTRACT

A method of signal processing includes calculating a range based on information from a reflected ultrasonic signal. Based on the calculated range, one among a plurality of direction-of-arrival (DOA) estimation operations is selected. The method also includes performing the selected operation to calculate an estimated direction of arrival (DOA) of an audio-frequency component of a multichannel signal. Examples of DOA estimation operations include operations based on phase differences between channels of the multichannel signal and operations based on a difference in gain between signals that are based on channels of the multichannel signal.

55 Claims, 38 Drawing Sheets

(51) Int. Cl.
  *G01S 15/42* (2006.01)
  *G01S 15/46* (2006.01)
  *G01S 13/46* (2006.01)

(56) References Cited

U.S. PATENT DOCUMENTS

| | | | |
|---|---|---|---|
| 6,266,014 B1* | 7/2001 | Fattouche et al. | 342/450 |
| 7,272,073 B2 | 9/2007 | Pellegrini et al. | |
| 7,619,563 B2 | 11/2009 | Taenzer | |
| 7,639,826 B1 | 12/2009 | Azima et al. | |
| 7,653,487 B2* | 1/2010 | Okuda | 701/301 |
| 2008/0048907 A1 | 2/2008 | Matsuura et al. | |
| 2009/0207694 A1 | 8/2009 | Guigne et al. | |
| 2009/0238377 A1 | 9/2009 | Ramakrishnan et al. | |
| 2009/0310444 A1 | 12/2009 | Hiroe | |
| 2009/0323991 A1 | 12/2009 | Hudson et al. | |
| 2010/0033427 A1* | 2/2010 | Marks et al. | 345/156 |
| 2010/0110273 A1 | 5/2010 | Turbahn et al. | |
| 2011/0038489 A1* | 2/2011 | Visser | G01S 3/8006 381/92 |
| 2011/0103448 A1* | 5/2011 | Dahl et al. | 375/224 |
| 2013/0170319 A1* | 7/2013 | Kallinger et al. | 367/118 |

FOREIGN PATENT DOCUMENTS

| | | |
|---|---|---|
| JP | 2003098003 A | 4/2003 |
| WO | WO0021203 A1 | 4/2000 |
| WO | WO2008128989 A1 | 10/2008 |

OTHER PUBLICATIONS

International Search Report and Written Opinion—PCT/US2012/026771—ISA/EPO—Jun. 26, 2012.

Kalgaonkar et al., "Ultrasonic Doppler sensor for speaker recognition", IEEE International Conference on Acoustics, Speech and Signal Processing (ICASSP), Mar. 31, 2008, pp. 4865-4868, XP031251689, ISBN: 978-1-4244-1483-3, DOI: 10.1109/ICASSP.2008.4518747.

Noulas et al., "Audiovisual Fusion for Speaker Diarization", Dissertation Audiovisual Fusion for Speaker Diarization, Jan. 1, 2010, pp. 17-40, XP007920724.

Doornekamp, Ico, "[PD] Ultrasonic 'theremin' patch," Dated Aug. 7, 2008, Available online Aug. 3, 2011 at http://lists.puredata.info/pipermail/pd-list/2008-08/064381.html.

Hashizume, et al., "Fast and accurate positioning technique using ultrasonic phase accordance method," TENCON 2005, 2005 IEEE Region 10, 6 pages.

Jimenez, A.R., et al., "Ultrasonic Localization Methods for Accurate Positioning," Dated Sep. 29, 2005, 17 pp., Available online Aug. 3, 2011 at http://www.iai.csic.es/lopsi/static/publicaciones/Libro/ConfIA-Antonio.pdf.

Jian M., et al., "Doa Estimation of Speech Source With Microphone Arrays", Circuits and Systems, 1998, ISCAS '98, May 31,-Jun. 3, 1998, vol. 5, pp. 293-296, http://ieeexplore.ieee.org/xpls/abs_all.jsp?arnumber=694489&tag=1.

* cited by examiner

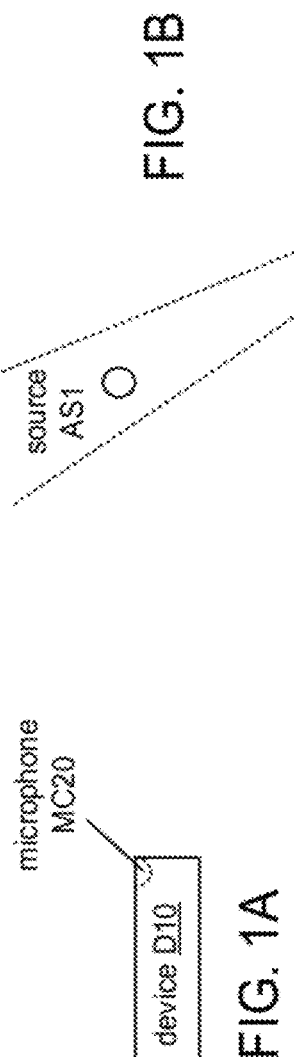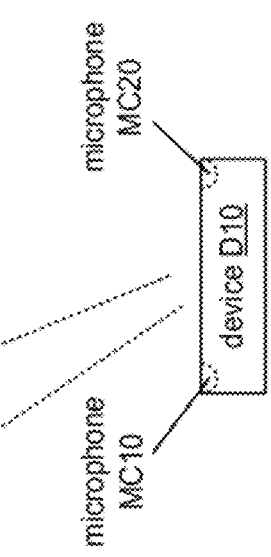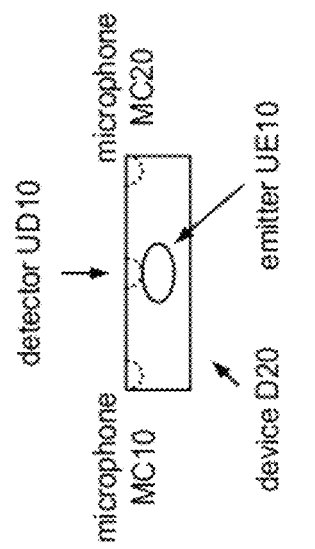

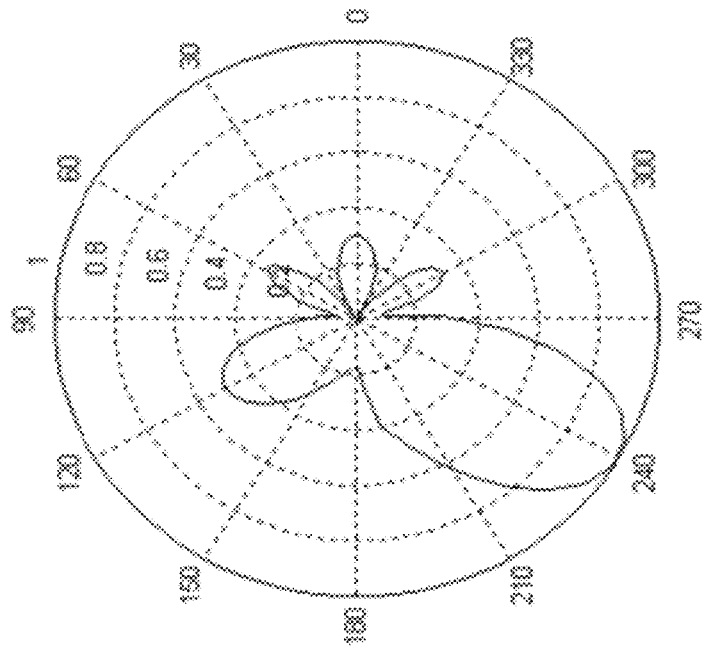
FIG. 3C
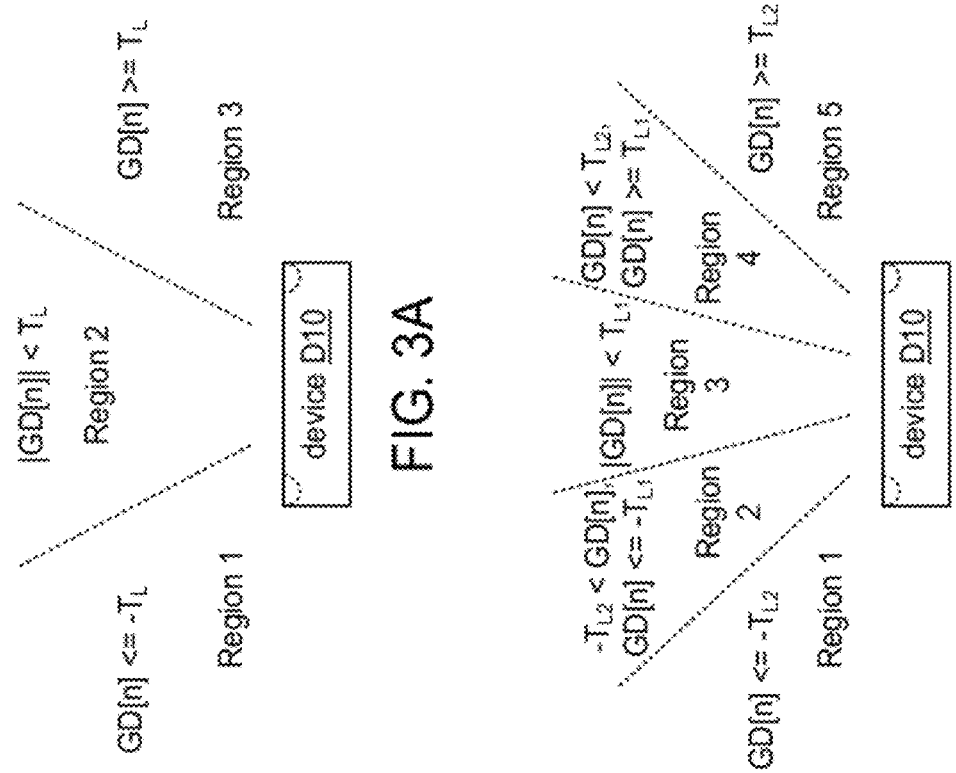
FIG. 3A
FIG. 3B

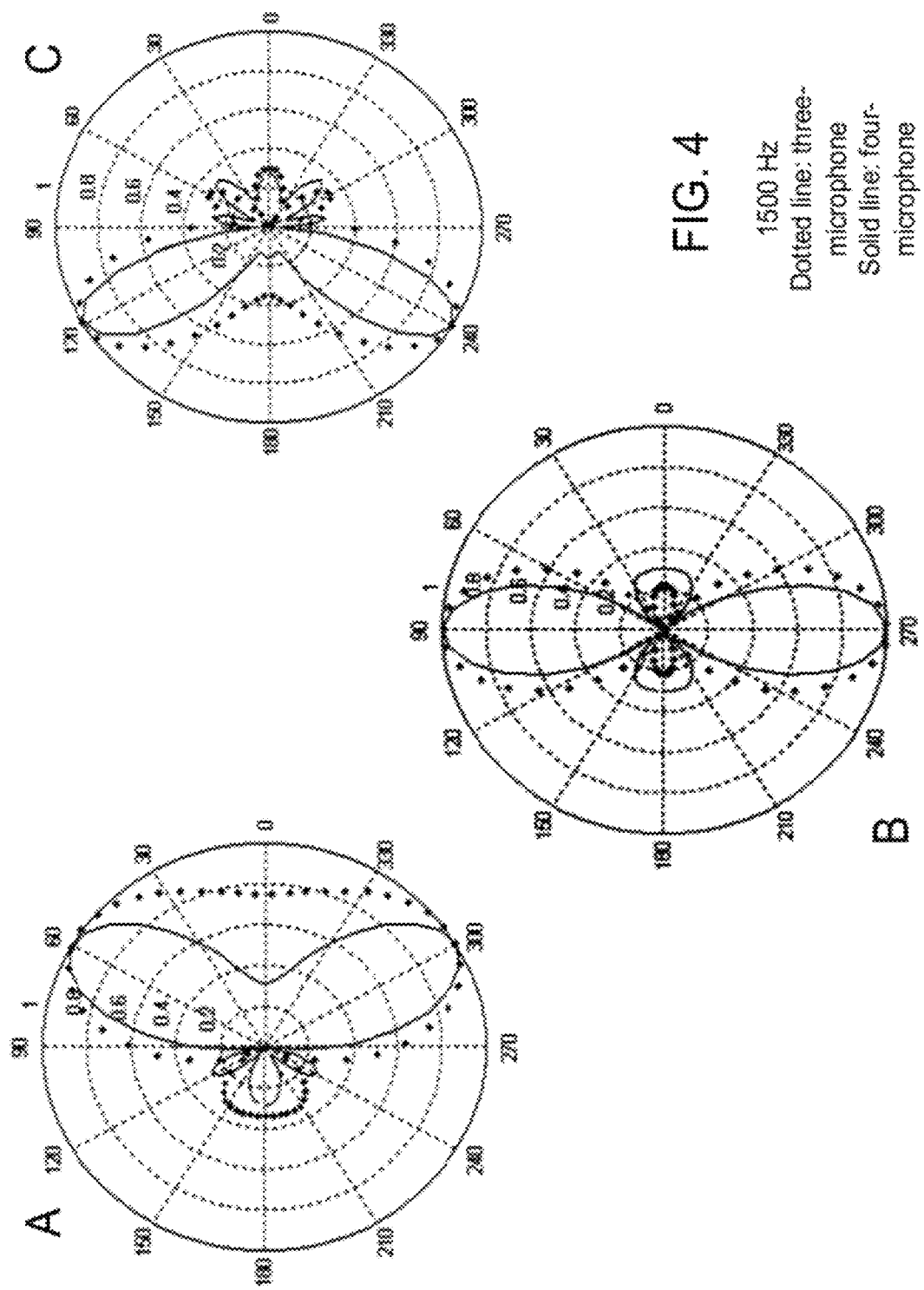

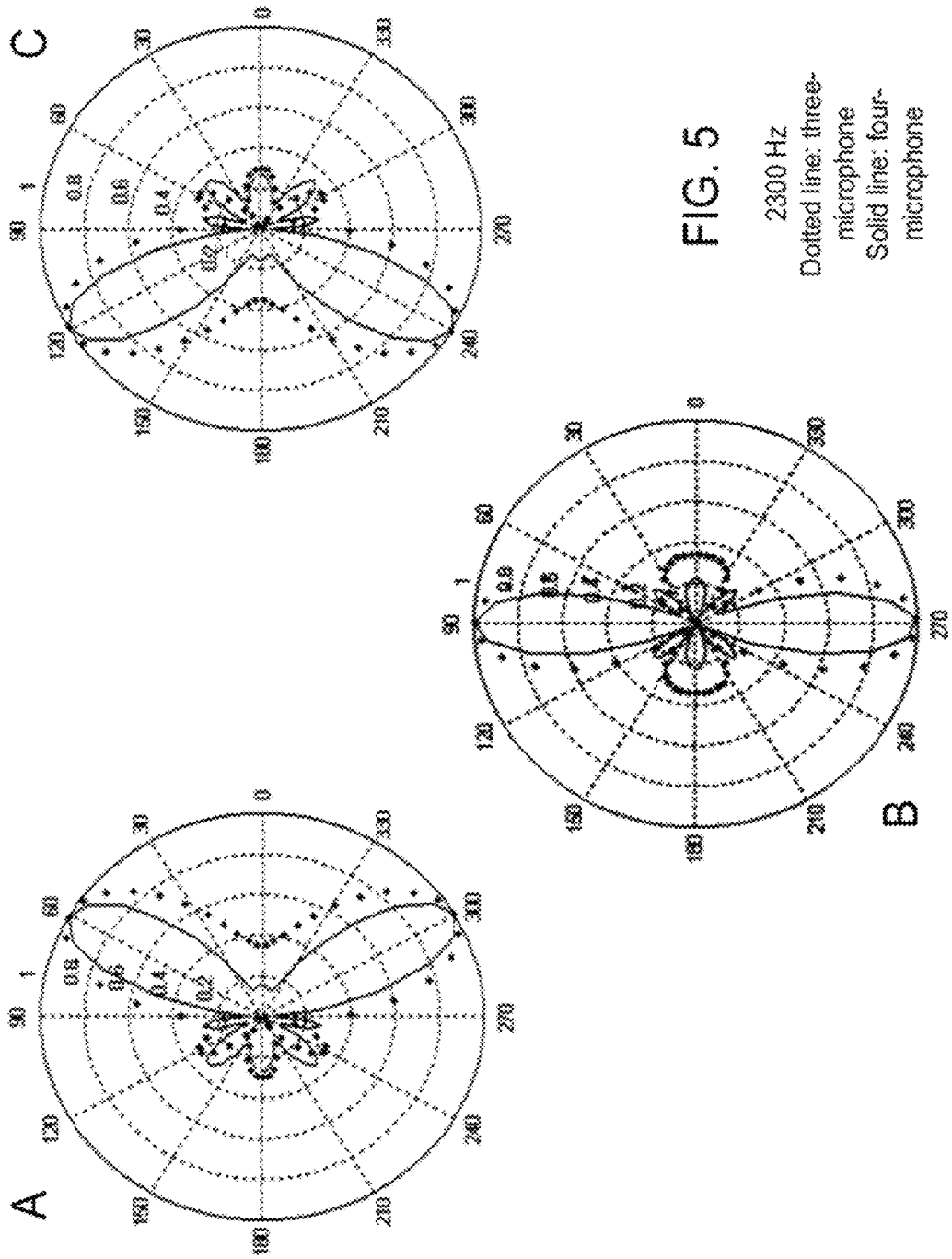

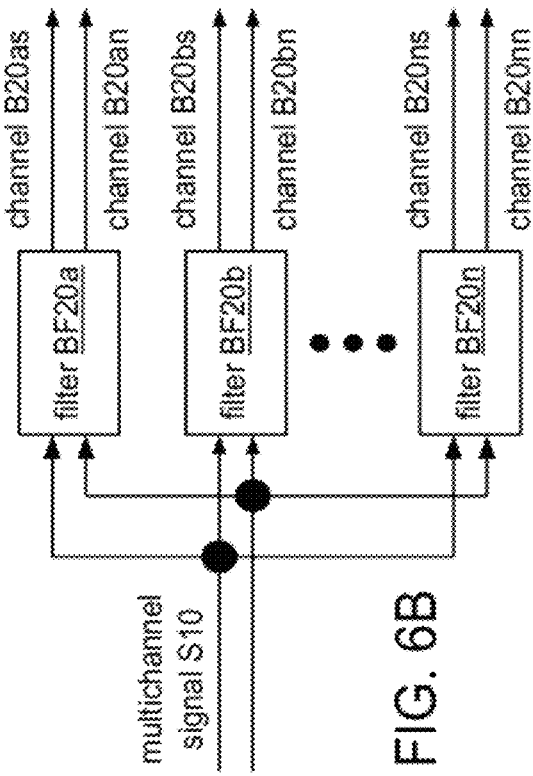
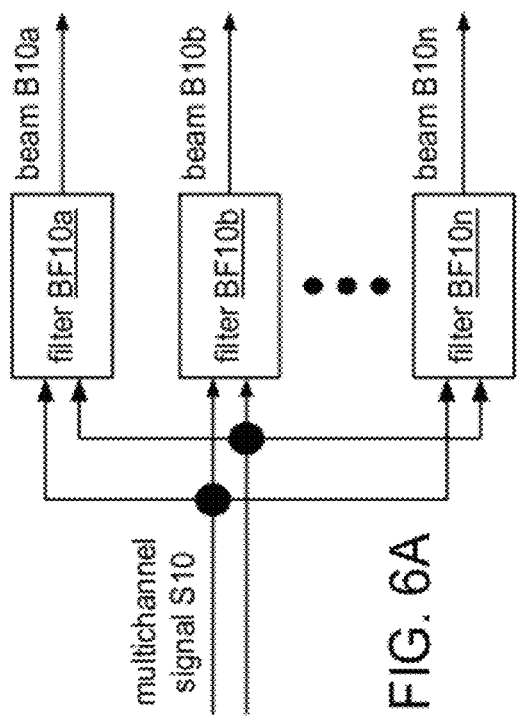

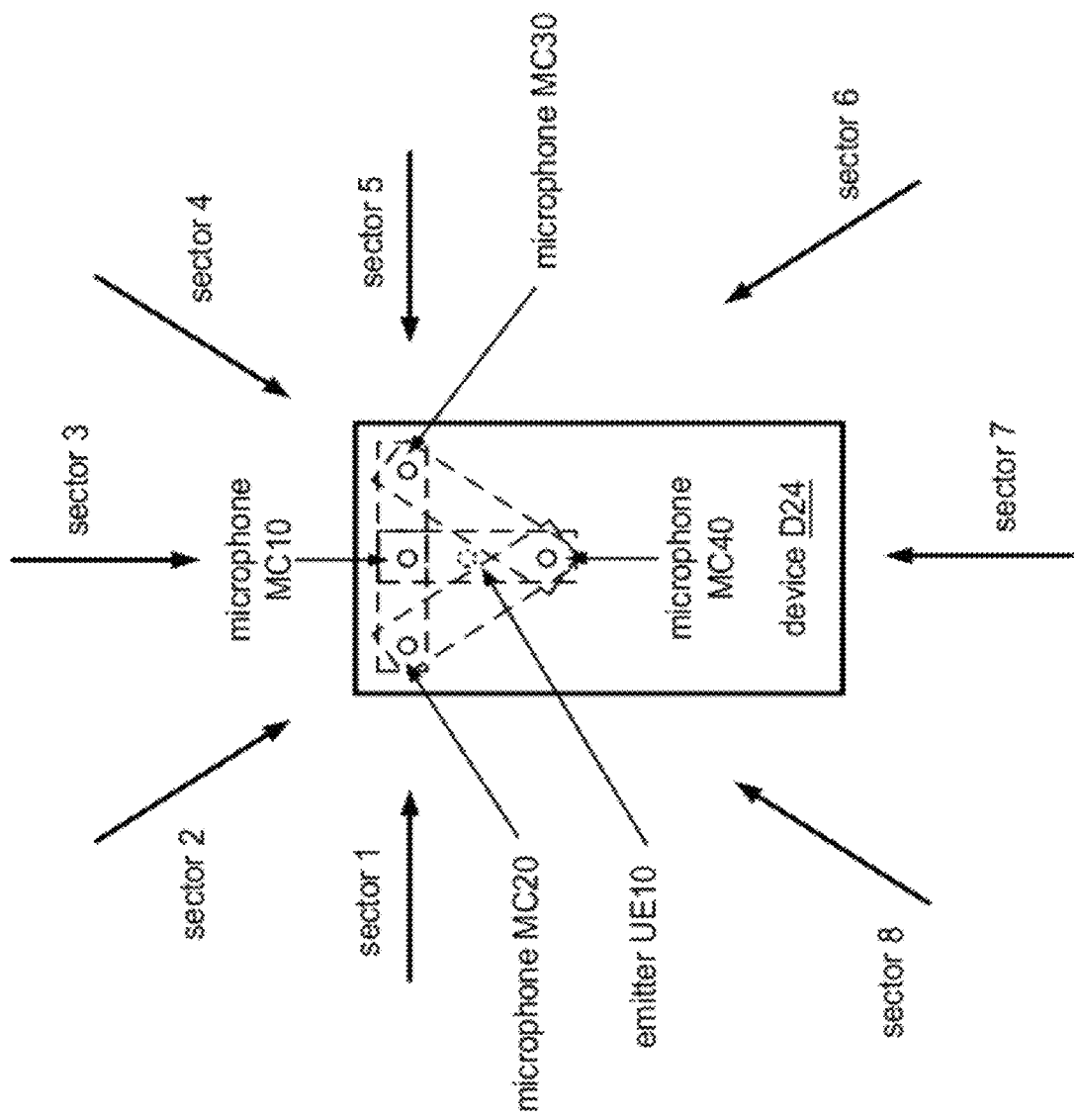

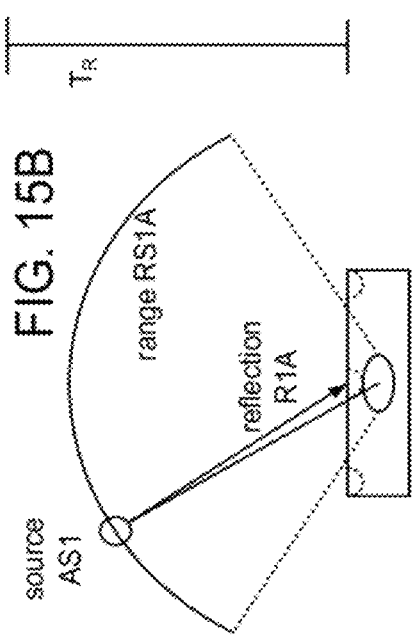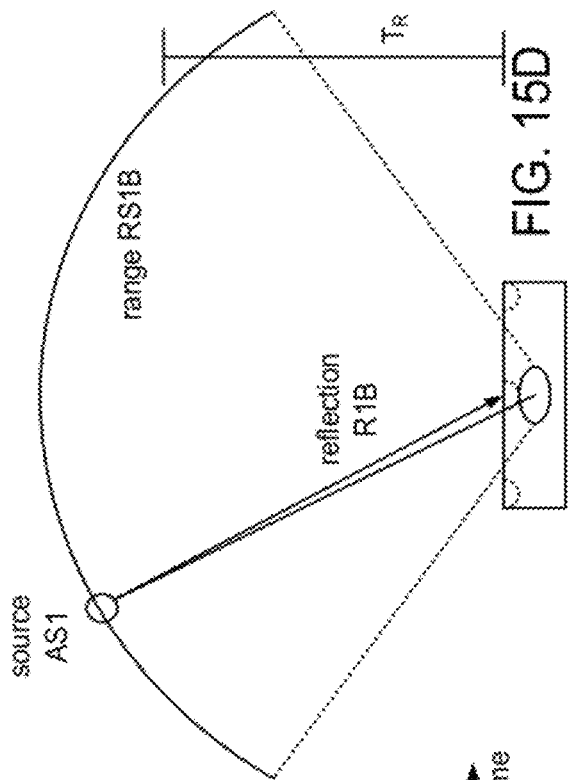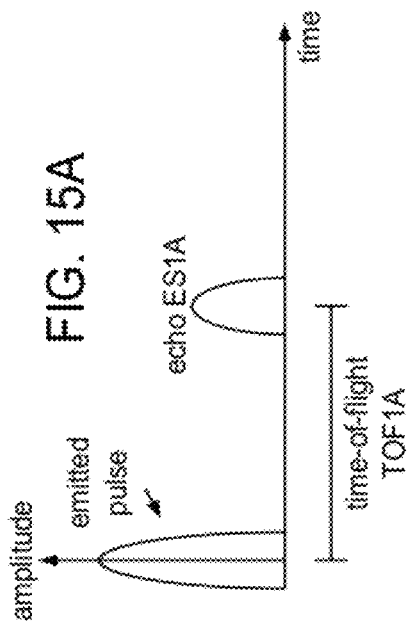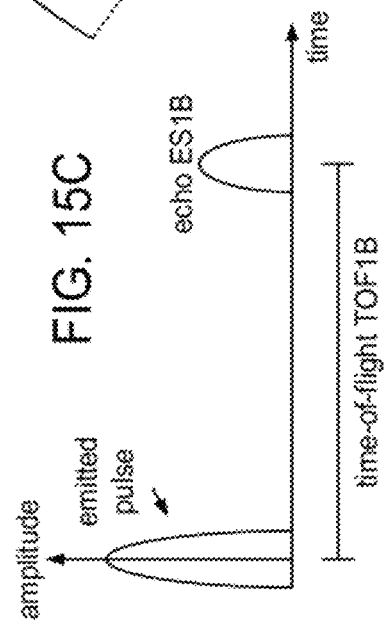

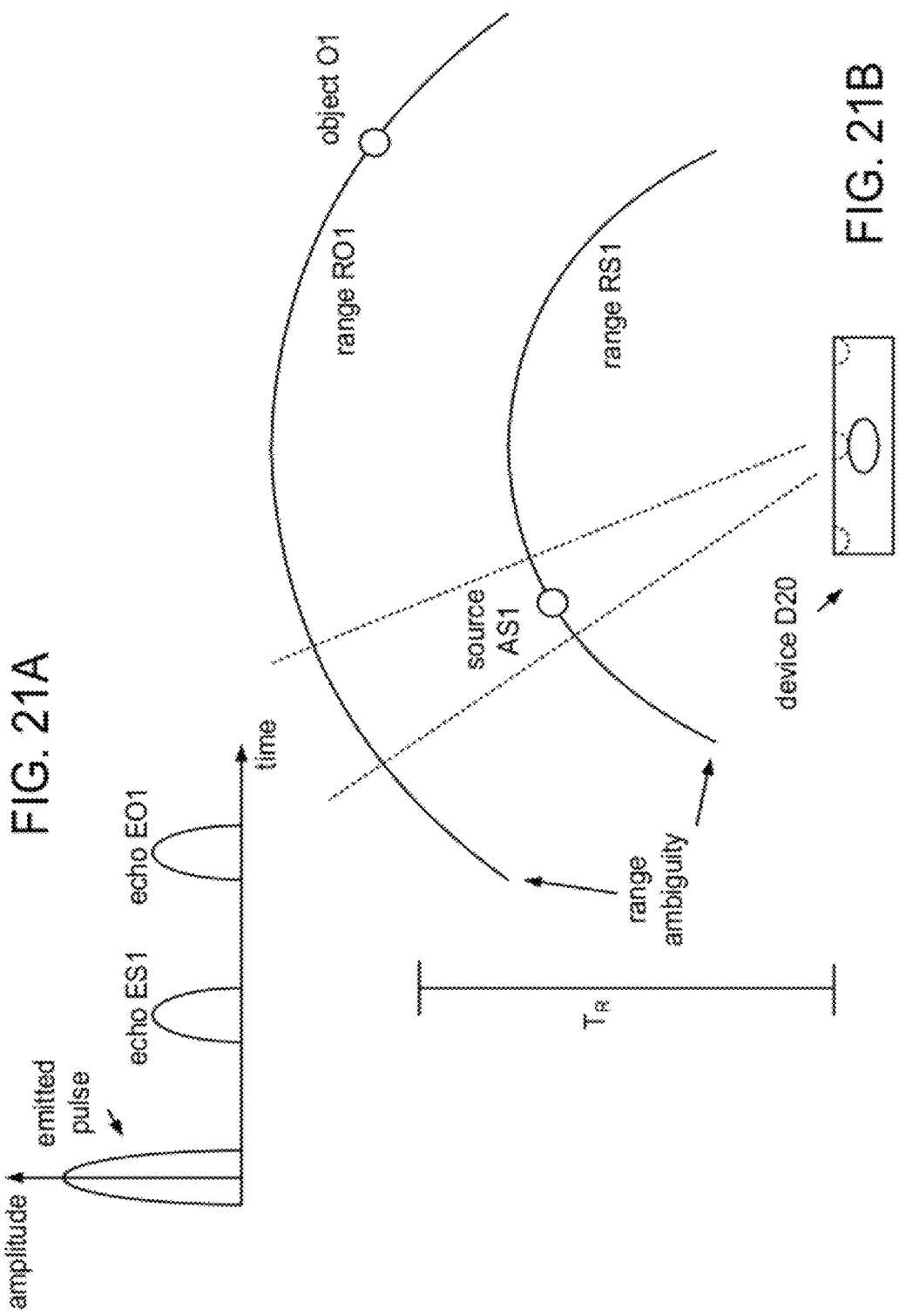

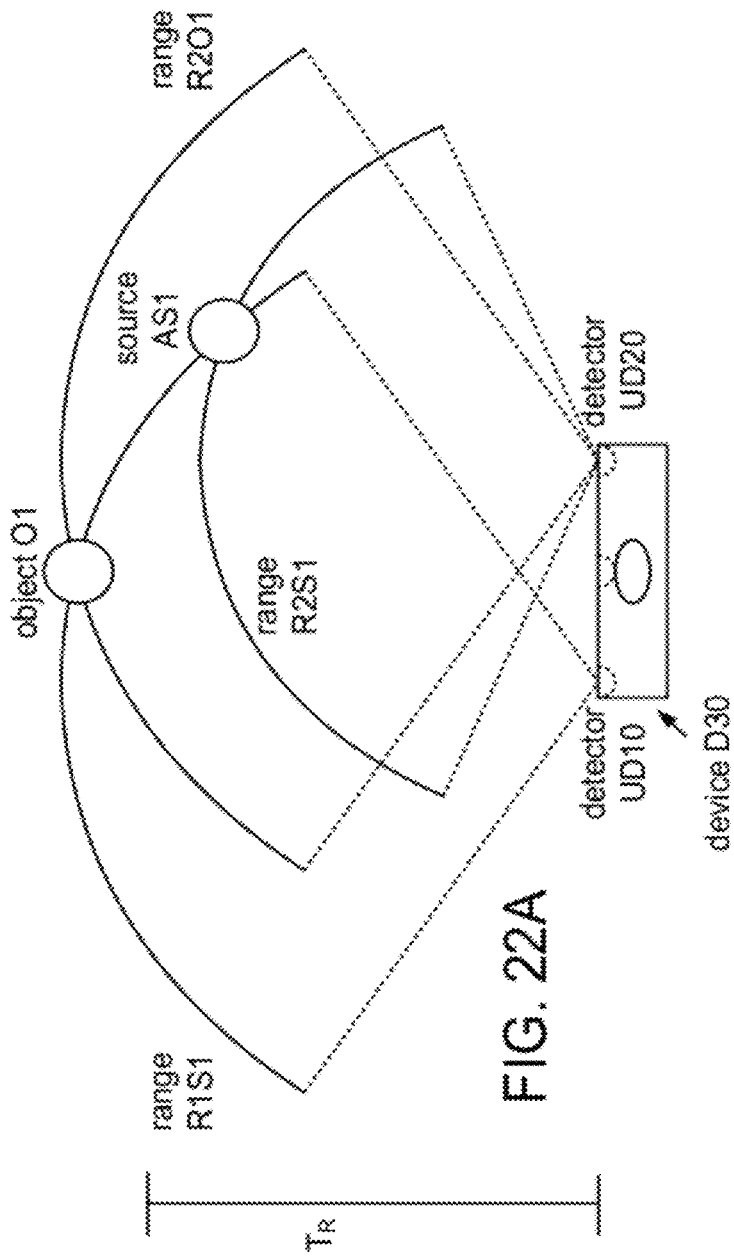
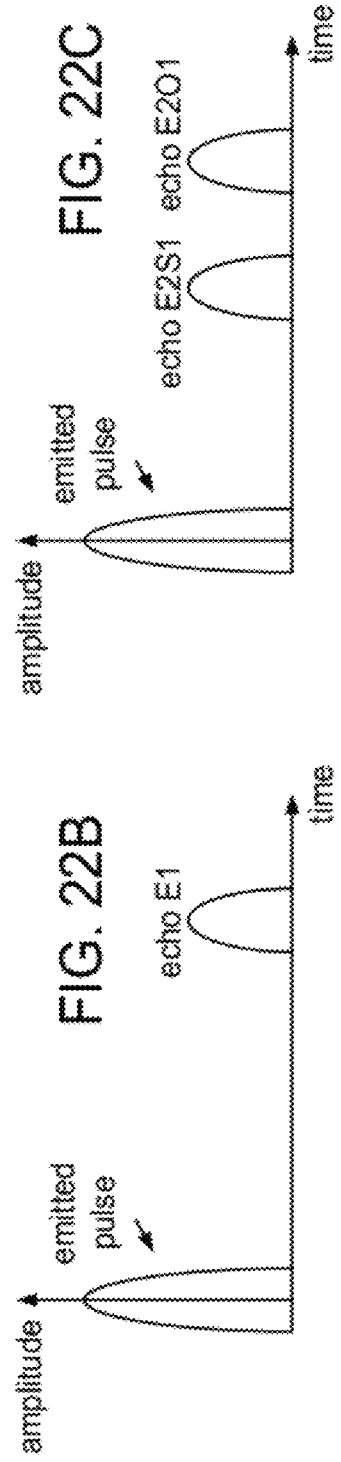

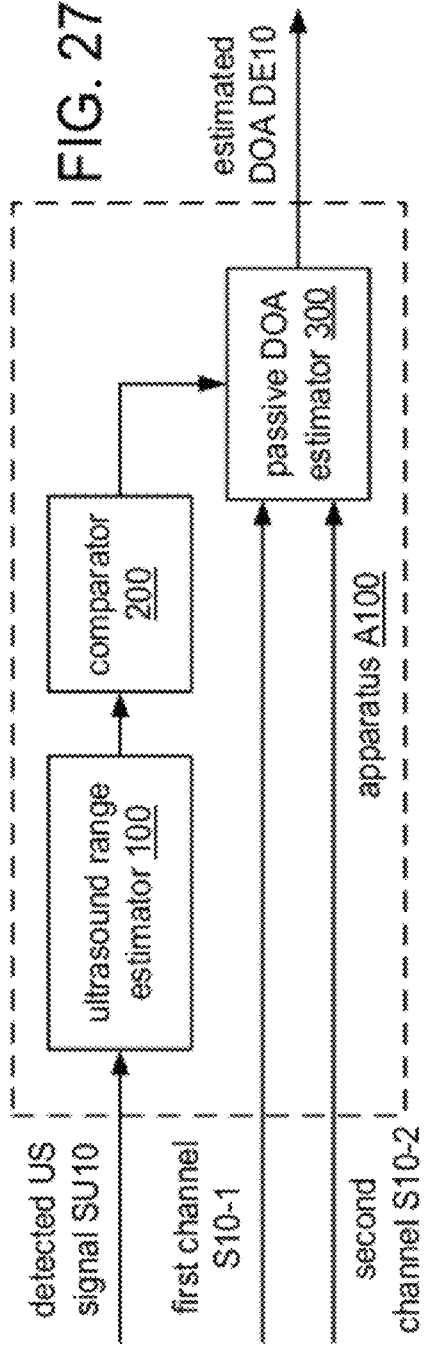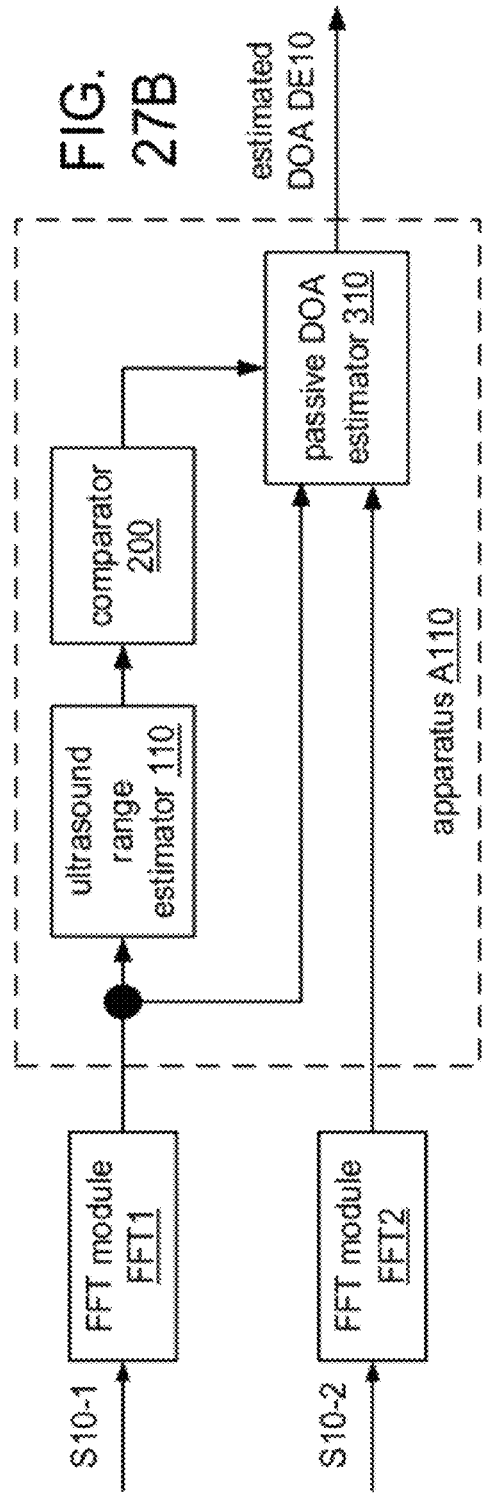

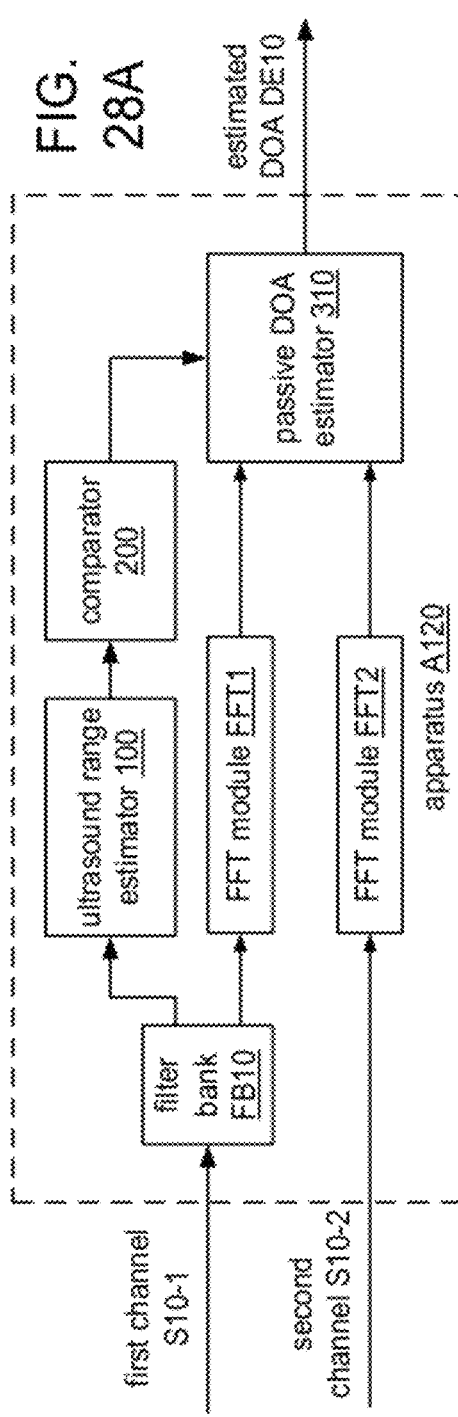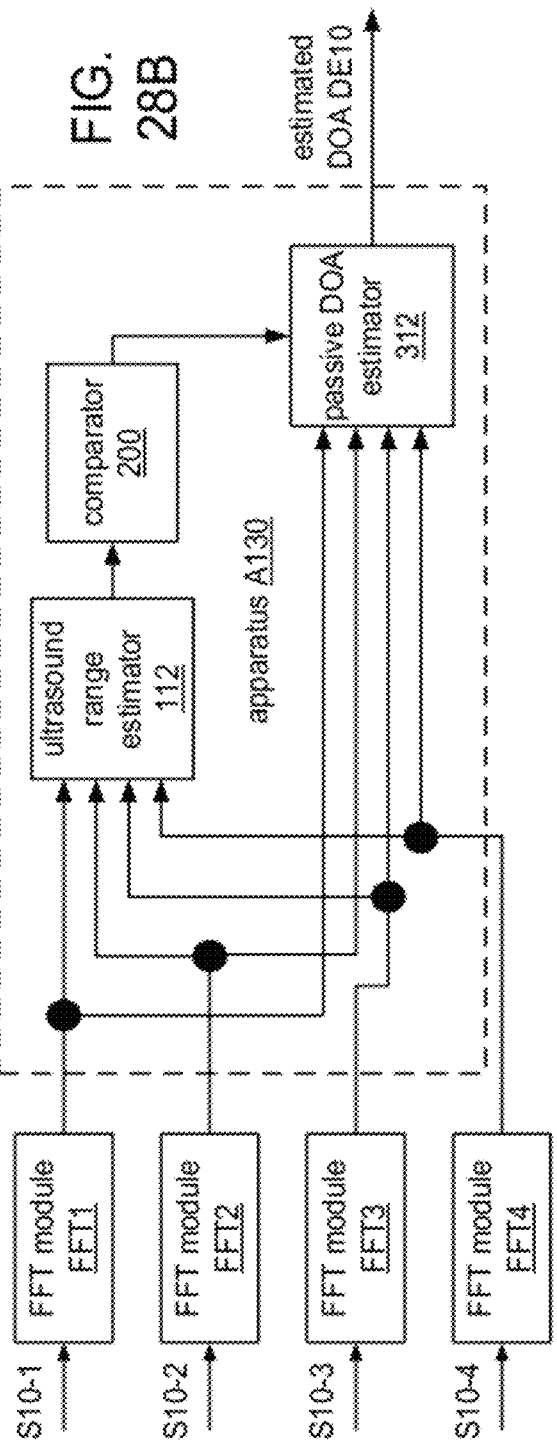

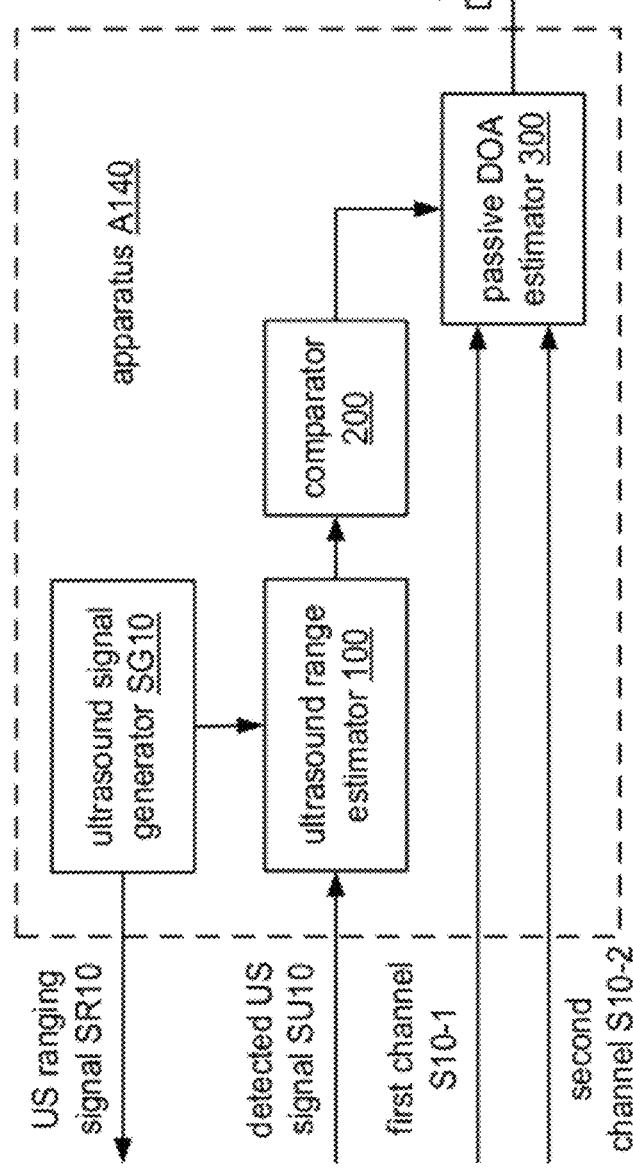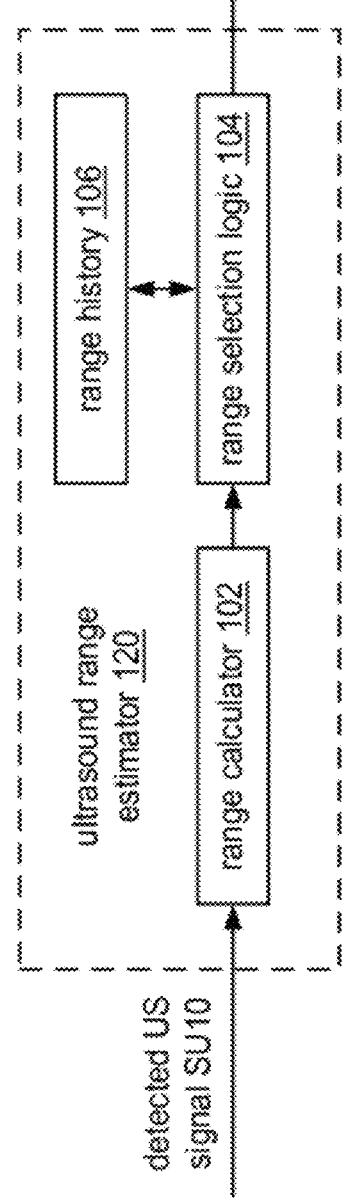

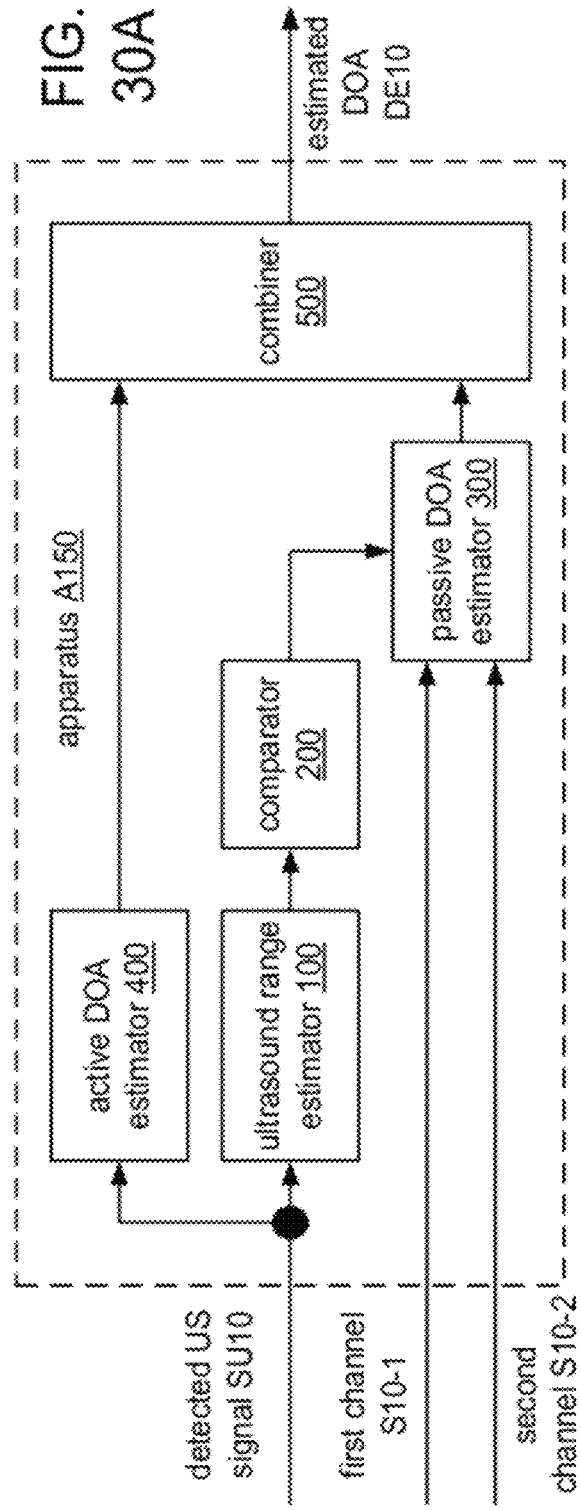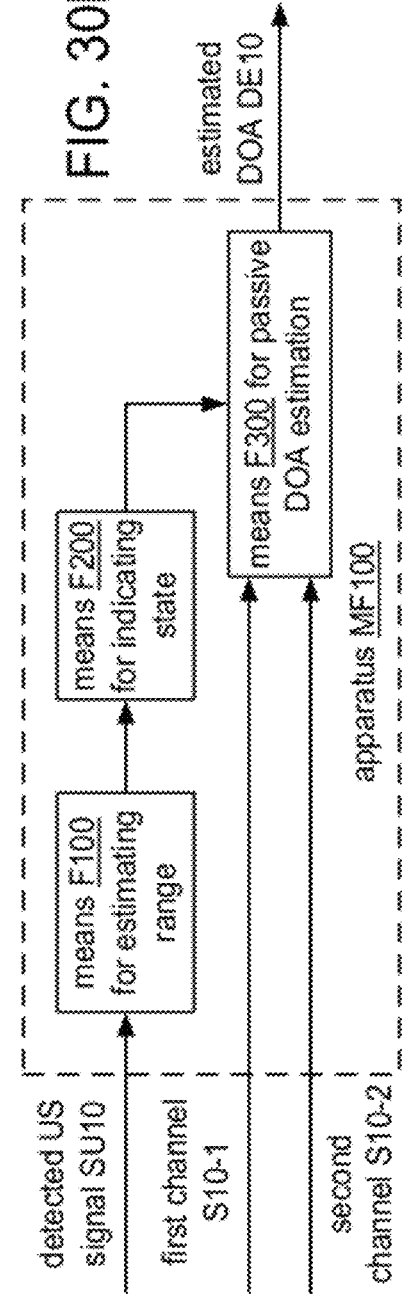

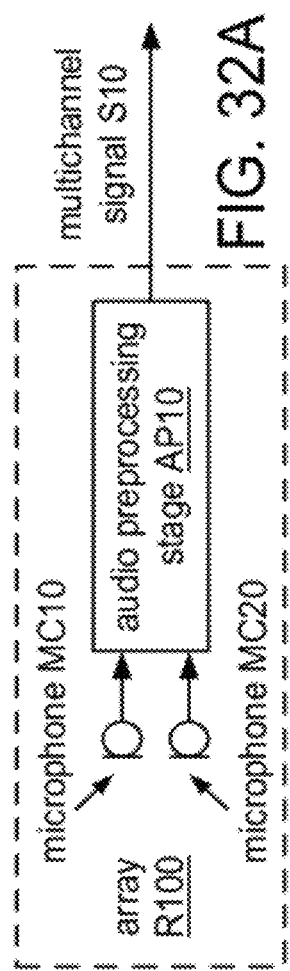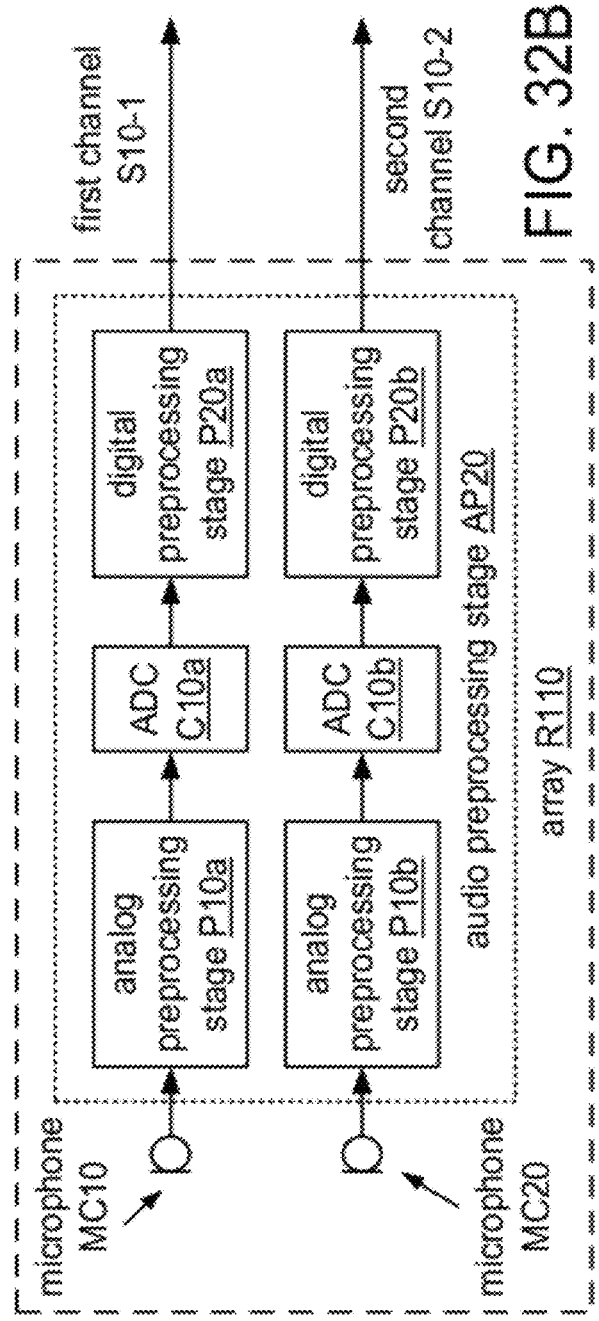

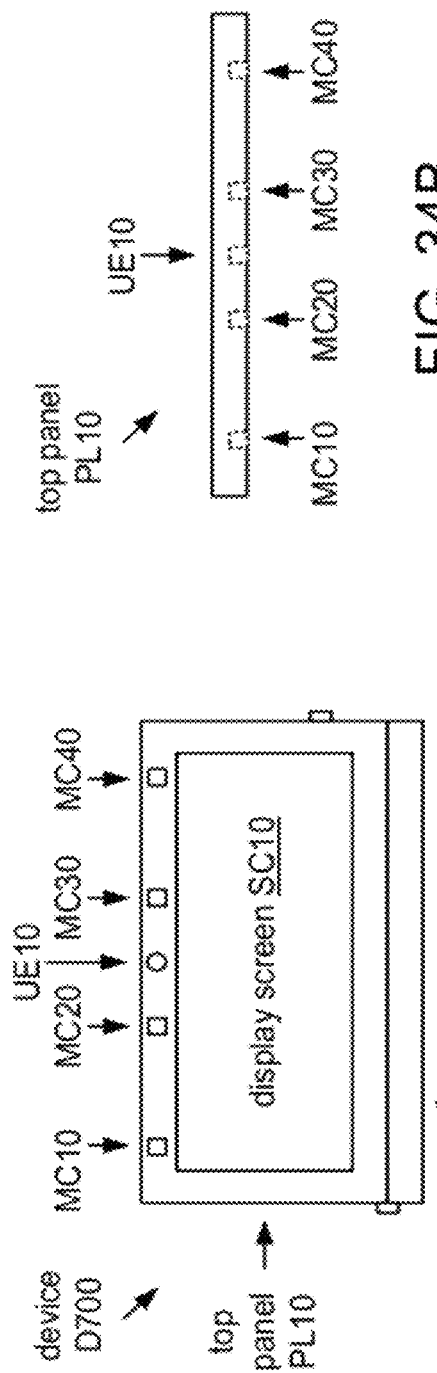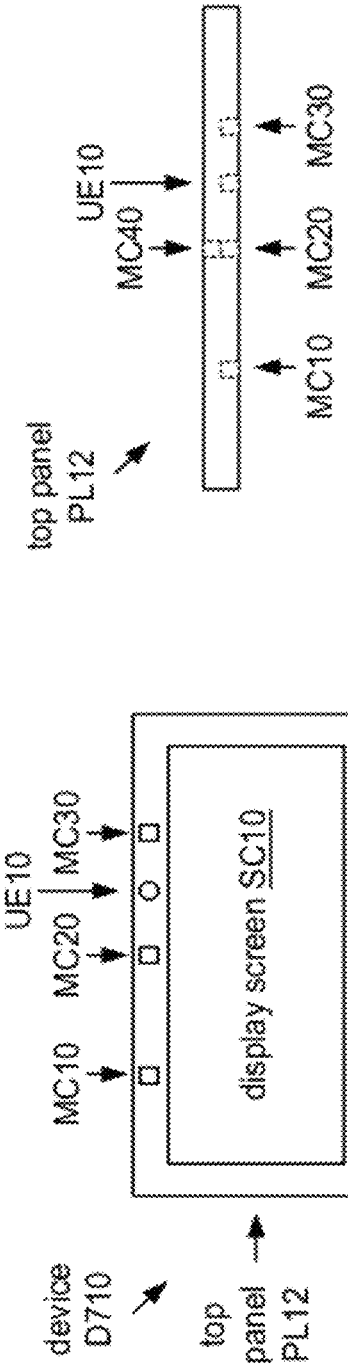

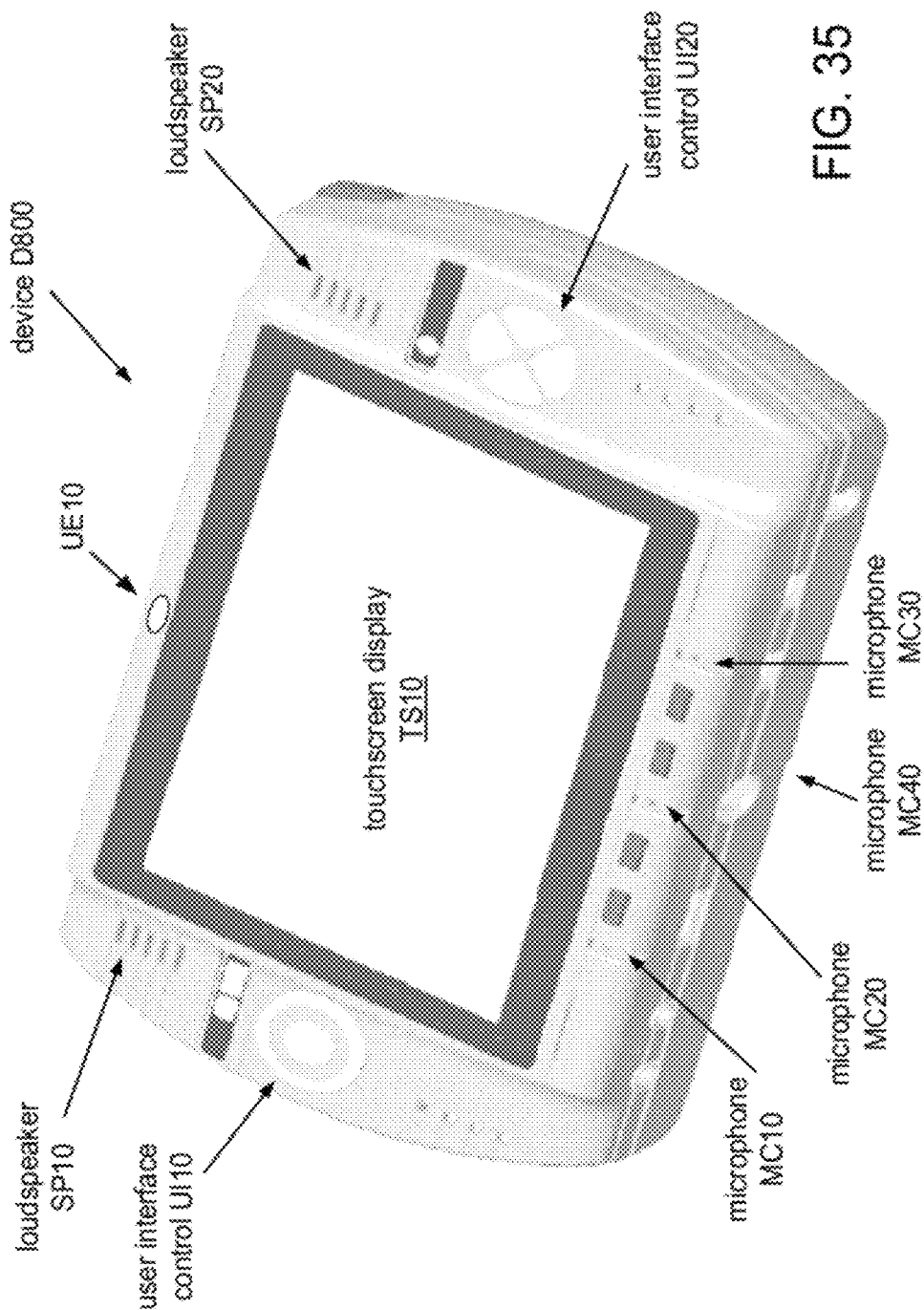

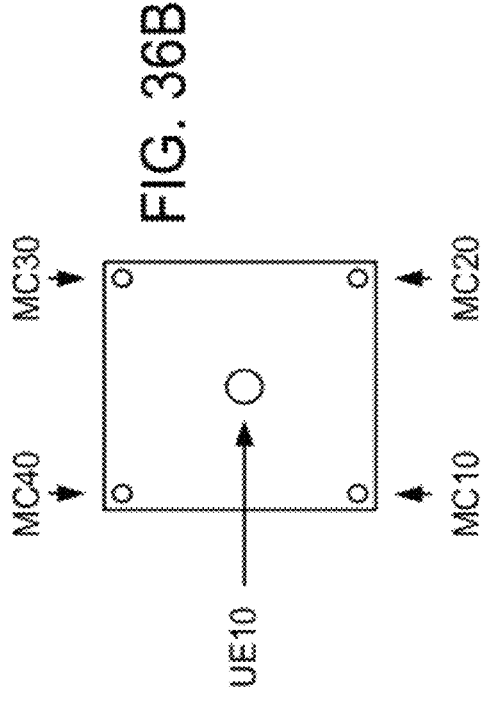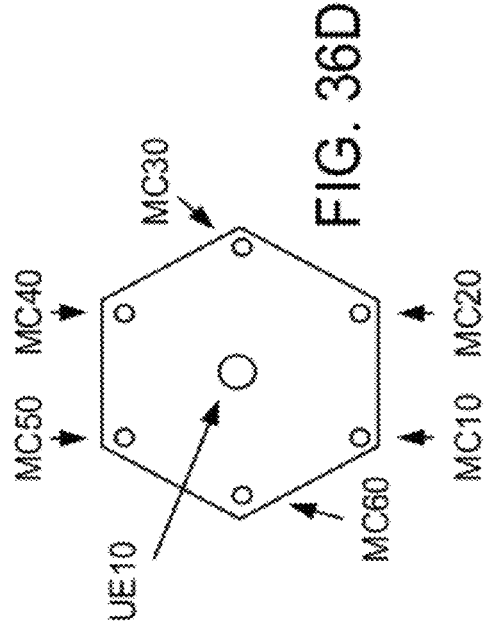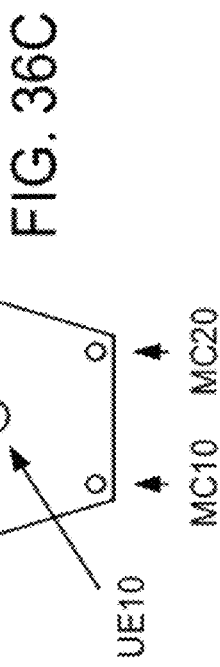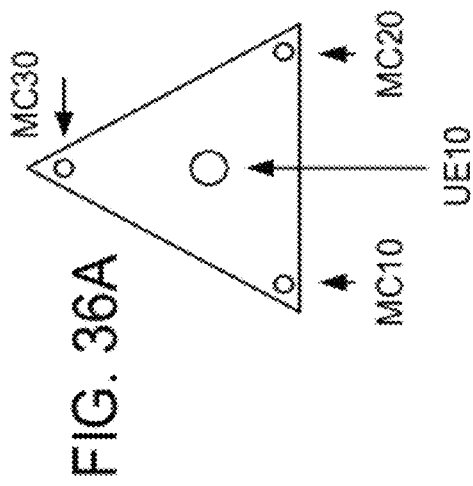

SYSTEMS, METHODS, APPARATUS, AND COMPUTER-READABLE MEDIA FOR SOURCE LOCALIZATION USING AUDIBLE SOUND AND ULTRASOUND

CLAIM OF PRIORITY UNDER 35 U.S.C. §119

The present application for patent claims priority to Provisional Application No. 61/448,950 entitled "ROBUST MULTIMICROPHONE TRACKING SYSTEM USING AUDIBLE SOUND AND ULTRASOUND," filed Mar. 3, 2011, and assigned to the assignee hereof.

BACKGROUND

1. Field

This disclosure relates to signal processing.

2. Background

For applications in which voice recording (e.g., for communications) occurs in a noisy environment, it may be desirable to separate a desired speech signal from background noise. Noise may be defined as the combination of all signals interfering with or otherwise degrading the desired signal. Background noise may include numerous noise signals generated within the acoustic environment, such as background conversations of other people, as well as reflections and reverberation generated from the desired signal and/or any of the other signals. Unless the desired speech signal is separated from the background noise, it may be difficult to make reliable and efficient use of it.

The acoustic noise encountered in a typical use environment may include a variety of different components, such as music, sounds from interfering sources (e.g., a TV set, a radio, a competing talker), babble noise, street noise, and/or airport noise. As such noise is typically nonstationary and may have an average spectrum is close to that of the user's own voice, it may be hard to model using traditional single-microphone or fixed beamforming type methods. Therefore it may be desirable to use multiple-microphone-based signal processing techniques, such as spatially selective processing, to support separation of a speech component in noisy environments.

In some applications for voice recording, the location of the user's mouth relative to the microphone may change during use. For example, applications for voice communications are evolving beyond traditional telephony to include scenarios in which the user's mouth is located at some distance away from the audio sensing device during use. Examples of such scenarios include Voice over IP (VoIP) telephony using microphones (and possibly a webcam) embedded in a laptop or tablet computer. In such cases, movement of the user's mouth relative to the device may significantly affect the performance of a spatially selective processing operation.

SUMMARY

A method of signal processing according to a general configuration includes estimating a range of a sound-emitting object, based on information from a reflection of an ultrasonic signal. This method includes selecting one among a plurality of direction-of-arrival estimation operations, based on the estimated first range, and performing the selected direction-of-arrival estimation operation to calculate, based on information from an audio-frequency component of a multichannel signal, an estimate of a direction of arrival of the audio-frequency component. Computer-readable storage media having tangible features that cause a machine reading the features to perform such a method are also disclosed.

An apparatus for signal processing according to another general configuration includes means for estimating a range of a sound-emitting object, based on information from a reflection of an ultrasonic signal; means for selecting one among a plurality of direction-of-arrival estimation operations, based on the estimated first range; and means for performing the selected direction-of-arrival estimation operation to calculate, based on information from an audio-frequency component of a multichannel signal, an estimate of a direction of arrival of the audio-frequency component.

An apparatus for signal processing according to another general configuration includes a range estimator configured to estimate a range of a sound-emitting object, based on information from a reflection of an ultrasonic signal; a comparator configured to select one among a plurality of direction-of-arrival estimation operations, based on the estimated first range; and a direction calculator configured to perform the selected direction-of-arrival estimation operation to calculate, based on information from an audio-frequency component of a multichannel signal, an estimate of a direction of arrival of the audio-frequency component.

BRIEF DESCRIPTION OF THE DRAWINGS

FIG. 1A shows a block diagram of a multi-microphone audio sensing device D10.

FIG. 1B shows an example of an application of device D10.

FIG. 1C shows an example in which a direction of arrival and a range are associated with a desired source AS1.

FIG. 1D shows a block diagram of an implementation D20 of device D10.

FIGS. 3A and 3B show examples of gain-difference-based DOA estimation methods.

FIG. 3C shows an example of a beam pattern for an asymmetrical array.

FIGS. 4 and 5 show examples of beamformer beam patterns.

FIGS. 6A and 6B show examples of fixed filters arranged to generate beams based on a multichannel signal.

FIGS. 11-14 show examples of a sector-based DOA estimation method used with a four-microphone implementation D24 of device D20.

FIGS. 15A-15D illustrate an example of an application of method M100.

FIG. 21A shows a plot of a signal produced by ultrasonic detector UD10.

FIG. 21B illustrates a range ambiguity.

FIGS. 22A-C show an example of an application of DOA estimation using ranging results from multiple ultrasound detectors.

FIG. 27A shows a block diagram of an apparatus A100 according to a general configuration.

FIG. 27B shows a block diagram of an application of an implementation A110 of apparatus A100.

FIG. 28A shows a block diagram of an implementation A120 of apparatus A100.

FIG. 28B shows a block diagram of an application of an implementation A130 of apparatus A100.

FIG. 29A shows a block diagram of an implementation A140 of apparatus A100.

FIG. 29B shows a block diagram of an implementation 120 of ultrasound range estimator 100.

FIG. 30A shows a block diagram of an implementation A150 of apparatus A100.

FIG. 30B shows a block diagram of an apparatus MF100 according to a general configuration.

FIG. 32A shows a block diagram of an example R100 of a microphone array.

FIG. 32B shows a block diagram of an implementation R110 of array R100.

FIGS. 34A and 34B show different views of a portable computing implementation D700 of device D100.

FIGS. 34C and 34D show different views of a portable computing implementation D710 of device D100.

FIG. 35 shows a diagram of a portable implementation D800 of multimicrophone audio sensing device D100.

FIGS. 36A-D show top views of several examples of a conferencing device.

DETAILED DESCRIPTION

Figure 2A:
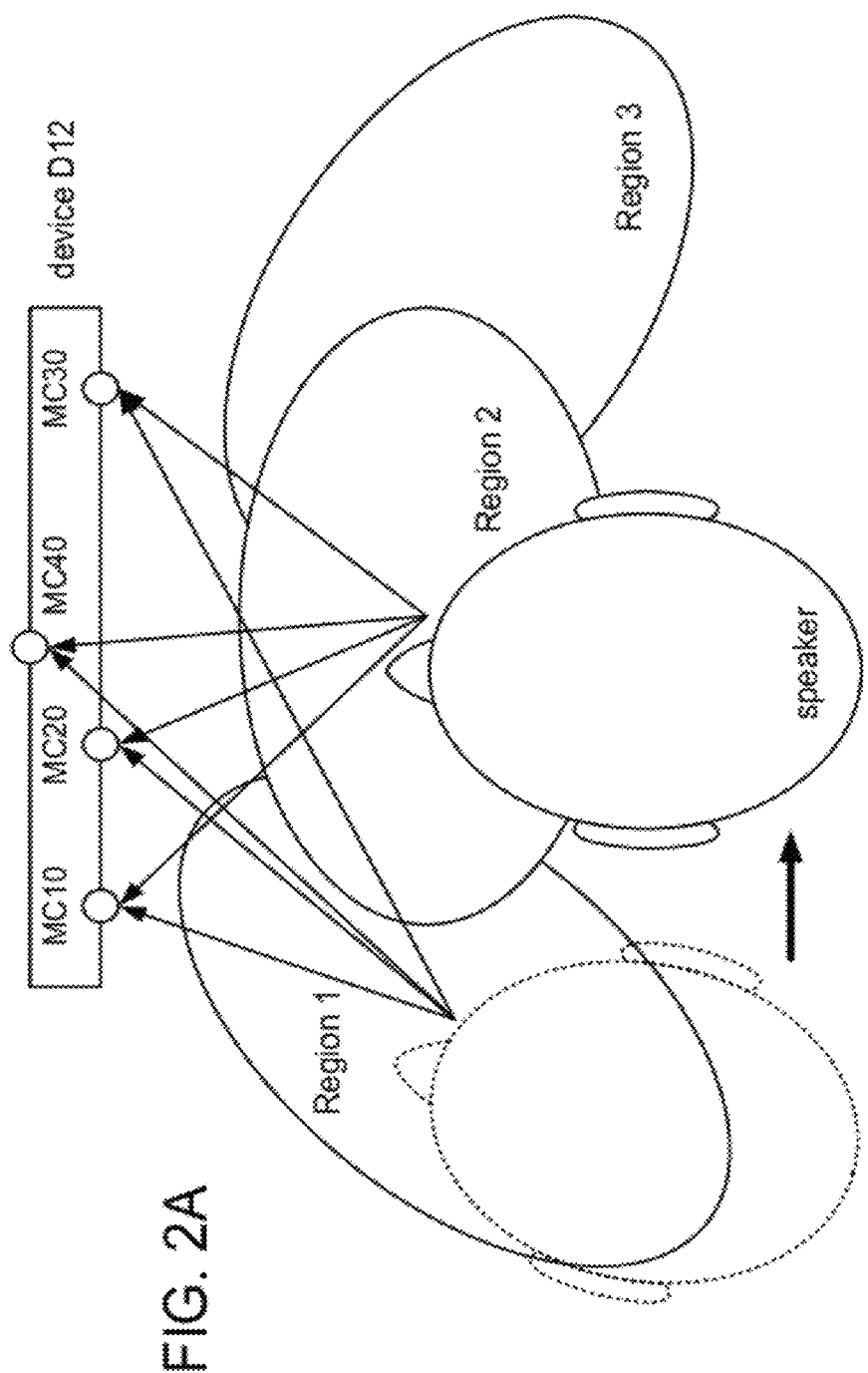
FIG. 2A shows an example of an application of a four-microphone implementation D12 of device D10.

This description includes disclosure of systems, methods, and apparatus that use ultrasonic ranging to configure an operation for estimating the direction of arrival of an audio-frequency component. Such an operation may provide more accurate source localization to support better performance of a directionally selective audio processing operation.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

The near-field may be defined as that region of space which is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

A multi-microphone device may be configured to perform a spatially selective processing operation to receive acoustic signals from one or more sources in a space (e.g., to receive speech from a user of the device) while suppressing sound that arrives from other directions. FIG. 1A shows an example of a multi-microphone device D10 that includes an array of two microphones MC10 and MC20. In other examples of device D10, the microphone array may include more than two microphones (e.g., three, four, or more). In such cases, the microphones may be disposed in a linear or two- or three-dimensional pattern, and the spacing between adjacent microphones in the array may be uniform or non-uniform.

FIG. 1B shows an example of an application in which device D10 is configured to enhance sound arriving from a region that includes the direction of audible sound source AS1 (also called a "pick-up region") relative to sound arriving from other directions. Source AS1 (e.g., a user of the device) may move from one location to another over time, and it may be desirable to adapt the spatially selective processing operation based on a current location of the source. Device D10 may also be implemented to enhance sounds arriving from multiple desired sources, which may be situated at various different locations in the space.

FIG. 1D shows an example of an implementation D20 of device D10 that may be configured to perform an implementation of method M100 as described herein. Device D20 includes an ultrasonic emitter UE10 and an ultrasonic detector UD10. As described below, it may be desirable to implement detector UD10 as a microphone (e.g., as another microphone in the microphone array). Examples of audio sensing devices that may be configured to include an instance of device D10 or D20 include set-top boxes, gaming consoles, smartphones, and laptop and tablet computers.

FIG. 2A shows an example of an application of a four-microphone implementation D12 of device D10 in which the spatially selective processing operation is configured to enhance sound arriving from one of a plurality of different pick-up regions 1, 2, 3 in front of the device and to suppress sound arriving from directions outside the region that is currently selected. It may be desirable to configure such a device to select the current pick-up region according to an estimated current location of a desired speaker. In the example shown in FIG. 2A, the spatially selective processing operation is adapting in response to a change in the estimated direction of arrival of the speaker's voice from region 1 to region 2.

It may be desirable to configure device D10 to estimate a direction of arrival of a sound component received by the multimicrophone array from a directional sound source, such as audible source AS1. Such DOA estimation may be useful, for example, to support adaptation of a spatially selective processing operation in response to movement of a desired source. Device D10 may be configured to perform any one or more of several different techniques to estimate the direction of arrival (DOA). Techniques for DOA estimation that may be expected to produce estimates of source DOA with similar spatial resolution include gain-difference-based methods and phase-difference-based methods. Cross-correlation-based methods (e.g., calculating a lag between channels of the multichannel signal, and using the lag as a time-difference-of-arrival to determine DOA) may also be useful in some cases.

A DOA estimation operation may be configured to produce a DOA estimate for each of a series of segments of the multichannel signal. Typical segment lengths range from about five or ten milliseconds to about forty or fifty milliseconds, and the segments may be overlapping (e.g., with adjacent segments overlapping by 25% or 50%) or nonoverlapping. In one particular example, the multichannel signal is divided into a series of nonoverlapping segments or "frames", each having a length of ten milliseconds. In another particular example, each frame has a length of twenty milliseconds. A segment as processed by a DOA estimation operation may also be a segment (i.e., a "subframe") of a larger segment as processed by a different audio processing operation, or vice versa.

A gain-difference-based method estimates the DOA based on a difference between the gains of signals that are based on channels of the multichannel signal. For example, such a method may be implemented to estimate the DOA based on a difference between the gains of different channels of the multichannel signal (e.g., a difference in magnitude or energy). Measures of the gain of a segment of the multichannel signal may be calculated in the time domain or in a frequency domain (e.g., a transform domain, such as an FFT, DCT, or MDCT domain). Examples of such gain measures include, without limitation, the following: total magnitude (e.g., sum of absolute values of sample values), average magnitude (e.g., per sample), RMS amplitude, median magnitude, peak magnitude, peak energy, total energy (e.g., sum of squares of sample values), and average energy (e.g., per sample). In order to obtain accurate results with a gain-difference technique, it may be desirable for the responses of the two microphone channels to be calibrated relative to each other. It may be desirable to apply a lowpass filter to the multichannel signal such that calculation of the gain measure is limited to an audio-frequency component of the multichannel signal.

A difference between gains may be calculated as a difference between corresponding gain measure values for each channel in a logarithmic domain (e.g., values in decibels) or, equivalently, as a ratio between the gain measure values in a linear domain. In some cases, a single difference may be calculated for a frame (e.g., for each frame or for occasional frames). In other cases, a difference may be calculated for each of several frequency components (e.g., subbands or FFT bins) of the frame.

For a calibrated microphone pair, a gain difference of zero may be taken to indicate that the source is equidistant from each microphone (i.e., located in a broadside direction of the pair), a gain difference with a large positive value may be taken to indicate that the source is closer to one microphone (i.e., located in one endfire direction of the pair), and a gain difference with a large negative value may be taken to indicate that the source is closer to the other microphone (i.e., located in the other endfire direction of the pair). FIG. 3A shows an example in which the DOA of a source relative to device D10 is estimated by selecting one among endfire region 1, broadside region 2, and endfire region 3 according to the state of a relation between the gain difference GD[n] for segment n and a gain-difference threshold value $T_L$. FIG. 3B shows an example in which the DOA of a source relative to device D10 is estimated by selecting one among five regions according to the state of a relation between gain difference GD[n] and a first gain-difference threshold value $T_{L1}$ and the state of a relation between gain difference GD[n] and a second gain-difference threshold value $T_{L2}$.

In another example, a gain-difference-based method estimates the DOA based on a difference in gain among beams that are generated from the multichannel signal (e.g., from an audio-frequency component of the multichannel signal). Such a method may be implemented to use a set of fixed filters to generate a corresponding set of beams that span a desired range of directions (e.g., 180 degrees in 10-degree increments). Such an approach applies each of the fixed filters to the multichannel signal and estimates the DOA (e.g., for each segment) as the look direction of the beam that exhibits the highest output energy. FIG. 6A shows an example of such a configuration that includes fixed filters BF10a, BF10b, and BF10n arranged to filter multichannel signal S10 to generate respective beams B10a, B10b, and B10n. Examples of beamforming approaches that may be used to generate the fixed filters include generalized sidelobe cancellation (GSC), minimum variance distortionless response (MVDR), and linearly constrained minimum variance (LCMV) beamformers. Other examples of beam generation approaches that may be used to generate the fixed filters include blind source separation (BSS) methods, such as independent component analysis (ICA) and independent vector analysis (IVA), which operate by steering null beams toward interfering point sources.

FIGS. 4 and 5 show examples of beamformer beam patterns for an array of three microphones (dotted lines) and for an array of four microphones (solid lines) at 1500 Hz and 2300 Hz, respectively. In these figures, the top left plot A shows a pattern for a beamformer with a look direction of about sixty degrees, the bottom center plot B shows a pattern for a beamformer with a look direction of about ninety degrees, and the top right plot C shows a pattern for a beamformer with a look direction of about 120 degrees. Beamforming with three or four microphones arranged in a linear array (for example, with a spacing between adjacent microphones of about 3.5 cm) may be used to obtain a spatial bandwidth discrimination of about 10-20 degrees. FIG. 3C shows an example of a beam pattern for an asymmetrical array.

In a further example, a gain-difference-based method estimates the DOA based on a difference in gain between channels of beams that are generated from the multichannel signal (e.g., using a beamforming or BSS method as described above) to produce a multichannel output. For example, a fixed filter may be configured to generate such a beam by concentrating energy arriving from a particular direction or source (e.g., a look direction) into one output channel and/or concentrating energy arriving from another direction or source into a different output channel FIG. 6B shows an example of such a configuration that includes fixed filters BF20a, BF20b, and BF20n arranged to filter multichannel signal S10 to generate respective beams having signal channels B20as, B20bs, and B20ns (e.g., corresponding to a respective look direction) and noise channels B20an, B20bn, and B20mn. In such case, the gain-difference-based method may be implemented to estimate the DOA as the look direction of the beam that has the greatest difference in energy between its output channels.

Figure 37:
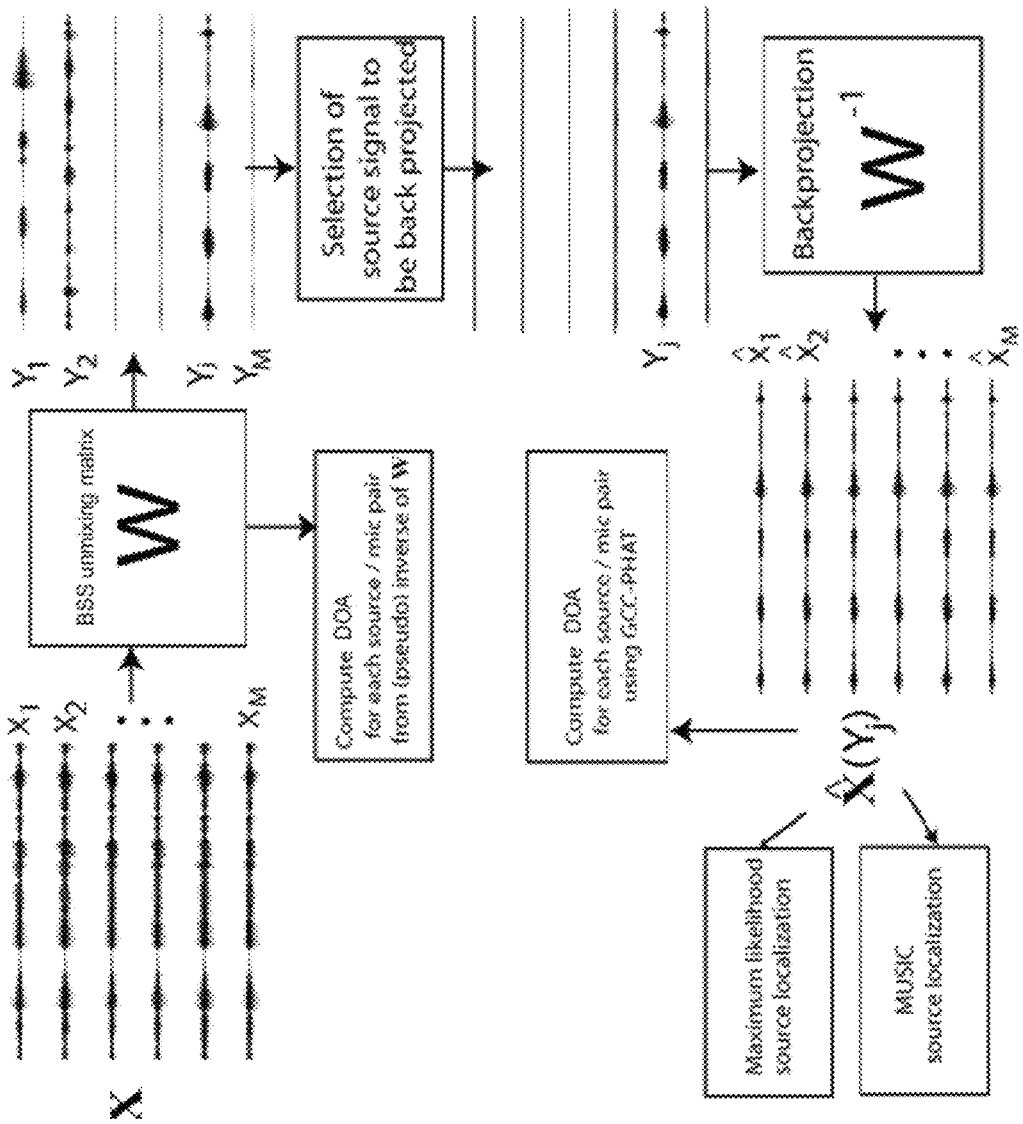
FIG. 37 illustrates back-projection techniques for DOA estimation.

A DOA estimate may also be obtained by directly using the BSS unmixing matrix W and the microphone spacing. Such a technique may include estimating the source DOA (e.g., for each source-microphone pair) by using back-projection of separated source signals, using an inverse (e.g., the Moore-Penrose pseudo-inverse) of the unmixing matrix W, followed by single-source DOA estimation on the back-projected data. Such a DOA estimation method is typically robust to errors in microphone gain response calibration. The BSS unmixing matrix W is applied to the m microphone signals $X_1$ to $X_M$, and the source signal to be back-projected $Y_j$ is selected from among the outputs of matrix W. A DOA for each source-microphone pair may be computed from the back-projected signals using a technique such as GCC-PHAT or SRP-PHAT. A maximum likelihood and/or multiple signal classification (MUSIC) algorithm may also be applied to the back-projected signals for source localization. The back-projection methods described above are illustrated in FIG. 37.

A phase-difference-based method estimates the DOA based on a difference between phases of different channels of the multichannel signal. Such methods include techniques that are based on a cross-power-spectrum phase (CPSP) of the multichannel signal (e.g., of an audio-frequency component of the multichannel signal), which may be calculated by normalizing each element of the cross-power-spectral-density vector by its magnitude. Examples of such techniques include generalized cross-correlation with phase transform (GCC-PHAT) and steered response power-phase transform (SRP-PHAT), which typically produce the estimated DOA in the form of a time difference of arrival. One potential advantage of a phase-difference-based approach is that it is typically robust to mismatches between the gain responses of the microphones.

Other phase-difference-based methods include estimating the phase in each channel for each of a plurality of frequency components to be examined. In one example, the phase of a frequency component is estimated as the inverse tangent (also called the arctangent) of the ratio of the imaginary term of the FFT coefficient of the frequency component to the real term of the FFT coefficient of the frequency component. It may be desirable to calculate the phase difference $\Delta\phi$ for each frequency component to be examined by subtracting the estimated phase for that frequency component in a primary channel from the estimated phase for that frequency component in another (e.g., secondary) channel. In such case, the primary channel may be the channel expected to have the highest signal-to-noise ratio, such as the channel corresponding to a microphone that is expected to receive the user's voice most directly during a typical use of the device.

It may be unnecessary for a DOA estimation method to consider phase differences across the entire bandwidth of the signal. For many bands in a wideband range (e.g., 0-8000 Hz), for example, phase estimation may be impractical or unnecessary. The practical valuation of phase relationships of a received waveform at very low frequencies typically requires correspondingly large spacings between the transducers. Consequently, the maximum available spacing between microphones may establish a low frequency bound. On the other end, the distance between microphones should not exceed half of the minimum wavelength in order to avoid spatial aliasing. An eight-kilohertz sampling rate, for example, gives a bandwidth from zero to four kilohertz. The wavelength of a four-kHz signal is about 8.5 centimeters, so in this case, the spacing between adjacent microphones should not exceed about four centimeters. The microphone channels may be lowpass filtered in order to remove frequencies that might give rise to spatial aliasing.

It may be desirable to perform DOA estimation over a limited audio-frequency range of the multichannel signal, such as the expected frequency range of a speech signal. One such example of a phase-based DOA estimation method is configured to calculate phase differences for the frequency range of 700 Hz to 2000 Hz, which may be expected to include most of the energy of the user's voice. For a 128-point FFT of a four-kilohertz-bandwidth signal, the range of 700 to 2000 Hz corresponds roughly to the twenty-three frequency samples from the tenth sample through the thirty-second sample. In further examples, such a method is configured to calculate phase differences over a frequency range that extends from a lower bound of about fifty, 100, 200, 300, or 500 Hz to an upper bound of about 700, 1000, 1200, 1500, or 2000 Hz (each of the twenty-five combinations of these lower and upper bounds is expressly contemplated and disclosed).

The energy spectrum of voiced speech (e.g., vowel sounds) tends to have local peaks at harmonics of the pitch frequency. The energy spectrum of background noise, on the other hand, tends to be relatively unstructured. Consequently, components of the input channels at harmonics of the pitch frequency may be expected to have a higher signal-to-noise ratio (SNR) than other components. It may be desirable to configure the DOA estimation method to favor phase differences which correspond to multiples of an estimated pitch frequency. For example, it may be desirable for at least twenty-five, fifty, or seventy-five percent (possibly all) of the calculated phase differences to correspond to multiples of an estimated pitch frequency, or to weight direction indicators that correspond to such components more heavily than others. Typical pitch frequencies range from about 70 to 100 Hz for a male speaker to about 150 to 200 Hz for a female speaker, and a current estimate of the pitch frequency (e.g., in the form of an estimate of the pitch period or "pitch lag") will typically already be available in applications that include speech encoding and/or decoding (e.g., voice communications using codecs that include pitch estimation, such as code-excited linear prediction (CELP) and prototype waveform interpolation (PWI)). The same principle may be applied to other desired harmonic signals as well. Conversely, it may be desirable to configure the DOA estimation method to ignore frequency components which correspond to known interferers, such as tonal signals (e.g., alarms, telephone rings, and other electronic alerts).

The DOA estimation method may be configured to calculate, for each of a plurality of the calculated phase differences, a corresponding indication of the DOA. In one example, an indication of the DOA $\theta_i$ of each frequency component is calculated as a ratio $r_i$ between estimated phase difference $\Delta\varphi_i$ and frequency $f_i$ $$\left(e.g., r_i = \frac{\Delta\varphi_i}{f_i}\right).$$

Alternatively, an indication of the DOA $\theta_i$ may be calculated as the inverse cosine (also called the arccosine) of the quantity $$\frac{c\Delta\varphi_i}{d2\pi f_i},$$

where c denotes the speed of sound (approximately 340 m/sec), d denotes the distance between the microphones, $\Delta\varphi_i$ denotes the difference in radians between the corresponding phase estimates for the two microphones, and $f_i$ is the frequency component to which the phase estimates correspond (e.g., the frequency of the corresponding FFT samples, or a center or edge frequency of the corresponding subbands). Alternatively, an indication of the direction of arrival $\theta_i$ may be calculated the inverse cosine of the quantity $$\frac{\lambda_i \Delta\varphi_i}{d2\pi},$$

where $\lambda_i$ denotes the wavelength of frequency component $f_i$.

In another example, an indication of the DOA is calculated as the time delay of arrival $\tau_i$ (e.g., in seconds) of the corresponding frequency component $f_i$ of the multichannel signal. For example, such a method may be configured to estimate the time delay of arrival $\tau_i$ at a secondary microphone with reference to a primary microphone, using an expression such as $$\tau_i = \frac{\lambda_i \Delta\varphi_i}{c 2\pi} \text{ or } \tau_i = \frac{\Delta\varphi_i}{2\pi f_i}.$$

In these examples, a value of $\tau_i=0$ indicates a signal arriving from a broadside direction, a large positive value of $\tau_i$ indicates a signal arriving from the reference endfire direction, and a large negative value of $\tau_i$ indicates a signal arriving from the other endfire direction. In calculating the values $\tau_i$, it may be desirable to use a unit of time that is deemed appropriate for the particular application, such as sampling periods (e.g., units of 125 microseconds for a sampling rate of 8 kHz) or fractions of a second (e.g., $10^{-3}$, $10^{-4}$, $10^{-5}$, or $10^{-6}$ sec). It is noted that a time delay of arrival $\tau_i$ may also be calculated by cross-correlating the frequency components $f_i$ of each channel in the time domain.

A phase-difference-based method may be configured to estimate the DOA as an average (e.g., the mean, median, or mode) of the DOA indicators. Alternatively, such a method may be configured to estimate the DOA by dividing the desired range of DOA coverage into a plurality of bins (e.g., a fixed scheme of 3, 4, 5, 6, 7, 8, 9, 10, 11, or 12 bins for a range of 0-180 degrees) and determining the number of DOA indicators whose values fall within each bin (i.e., the bin population). For a case in which the bins have unequal bandwidths, it may be desirable to calculate the bin population values by normalizing each bin population by the corresponding bandwidth. The DOA of the desired source may be estimated as the direction corresponding to the bin having the highest population value, or as the direction corresponding to the bin whose current population value has the greatest contrast (e.g., that differs by the greatest relative magnitude from a long-term time average of the population value for that bin).

Figure 7:
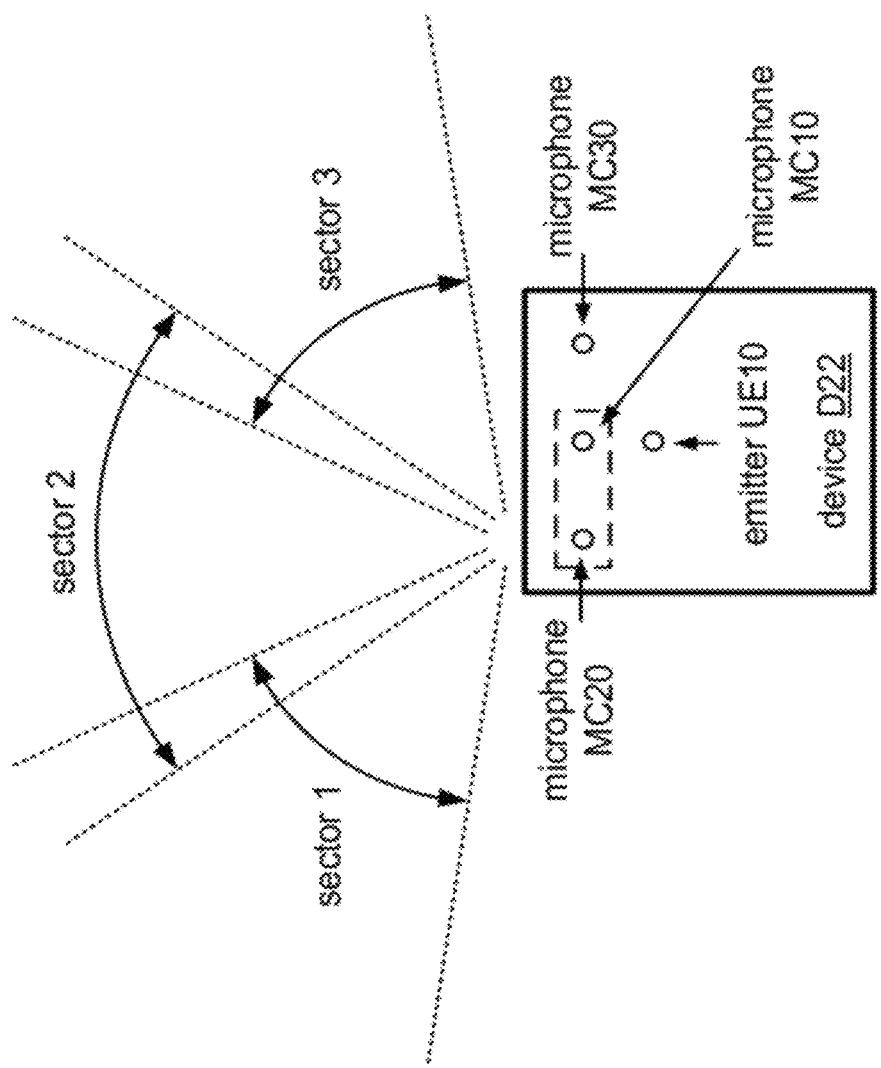
FIG. 7 shows a top view of an application of a three-microphone implementation D22 of device D20.
Figure 8A:
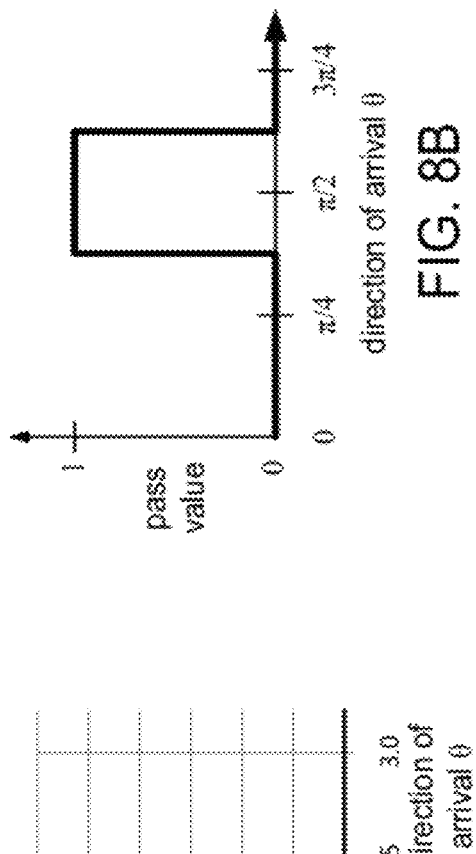
FIGS. 8A-8D show individual examples of directional masking functions.
Figure 8B:
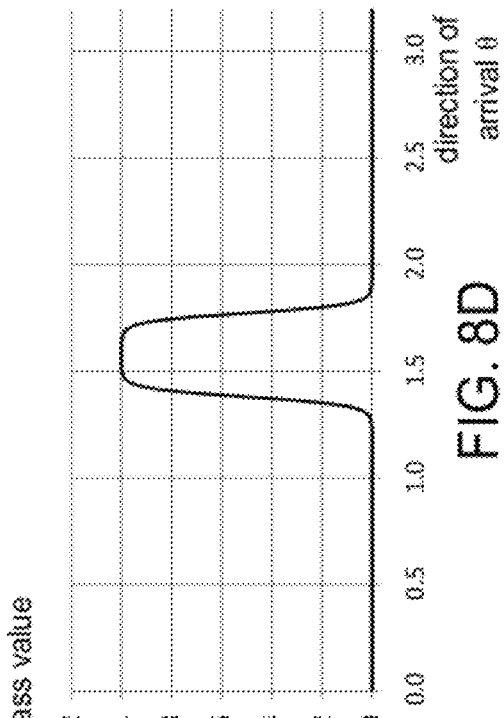
Figure 8C:
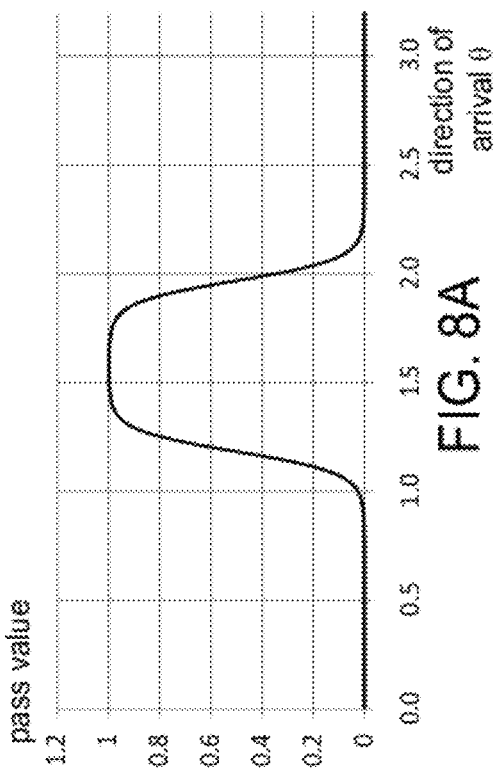
Figure 8D:
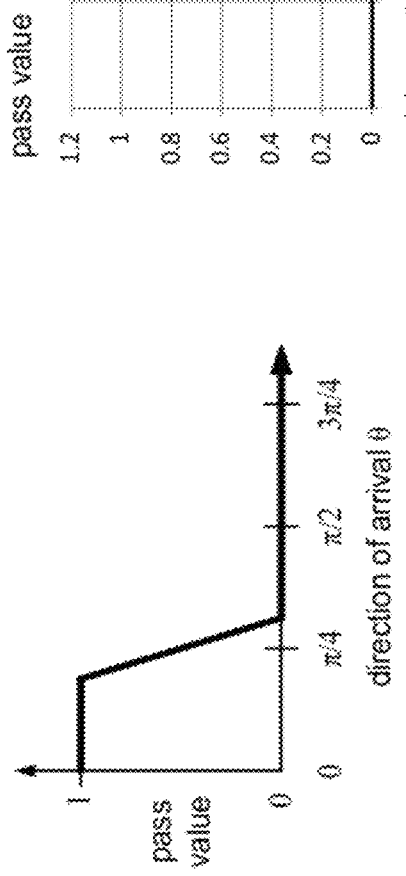

A similar method uses a set of directional masking functions to divide the desired range of DOA coverage into a plurality of sectors (e.g., 3, 4, 5, 6, 7, 8, 9, 10, 11, or 12 sectors for a range of 0-180 degrees). The directional masking functions for adjacent sectors may overlap, and the profile of a directional masking function may be linear or nonlinear. A directional masking function may be implemented such that the sharpness of the transition or transitions between stopband and passband are selectable and/or variable during operation according to the values of one or more factors (e.g., signal-to-noise ratio (SNR), noise floor, etc.). For example, it may be desirable to use a more narrow passband when the SNR is low. The sectors may have the same angular width (e.g., in degrees or radians) as one another, or two or more (possibly all) of the sectors may have different widths from one another. FIG. 7 shows a top view of such an application of a three-microphone implementation D22 of device D20 in which a set of three overlapping sectors is applied to the channel pair corresponding to microphones MC10 and MC20 for phase-difference-based DOA estimation.

Figure 9:
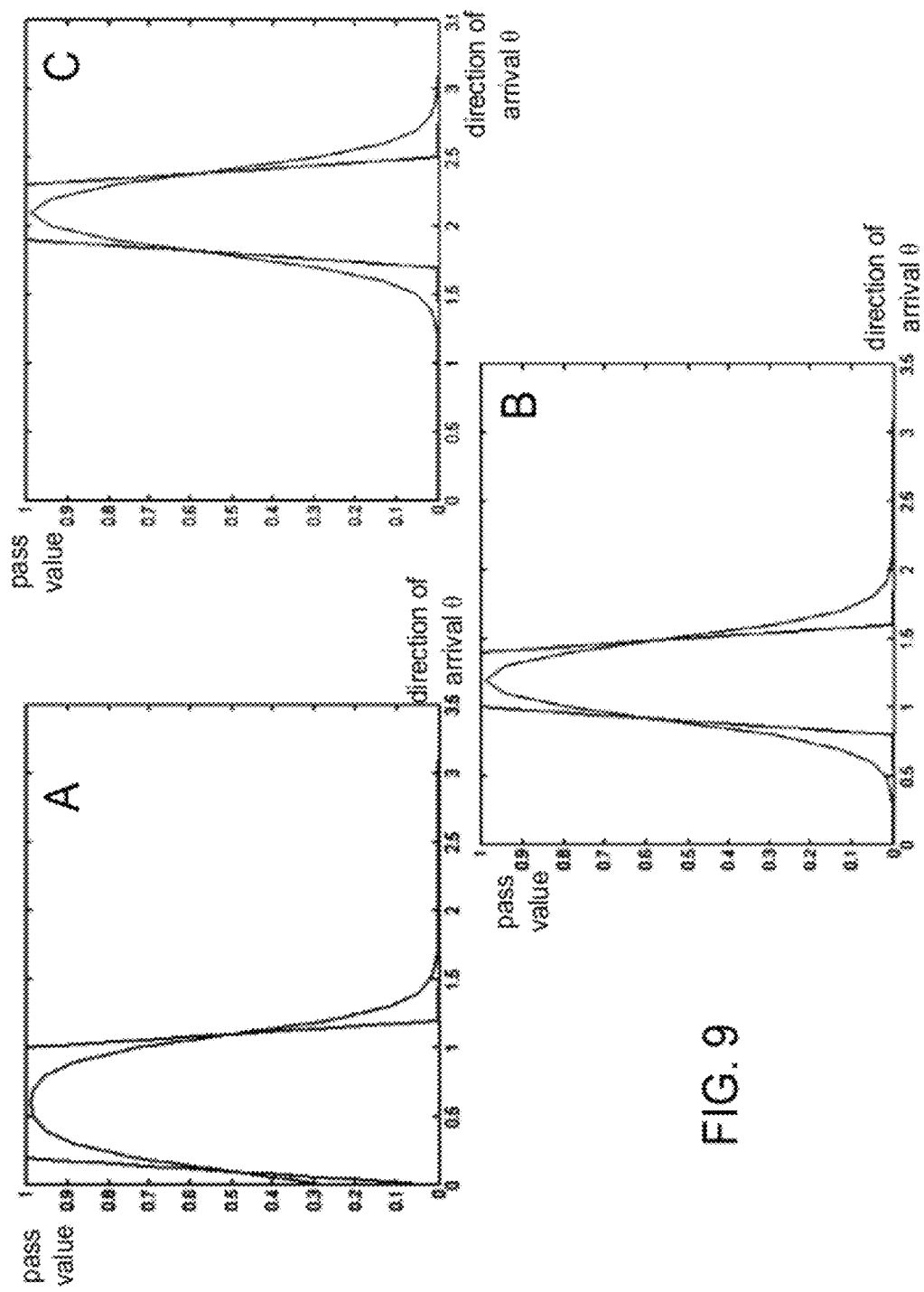
FIG. 9 shows examples of two sets of three directional masking functions.

FIGS. 8A-8D show individual examples of directional masking functions, and FIG. 9 shows examples of two different sets (linear vs. curved profiles) of three directional masking functions. In these examples, the output of a masking function for each segment is based on the sum of the pass values for the corresponding phase differences of the frequency components being examined. For example, the output may be calculated by normalizing the sum with respect to a maximum possible value for the masking function. Of course, the response of a masking function may also be expressed in terms of time delay τ or ratio r rather than direction θ.

Figure 10:
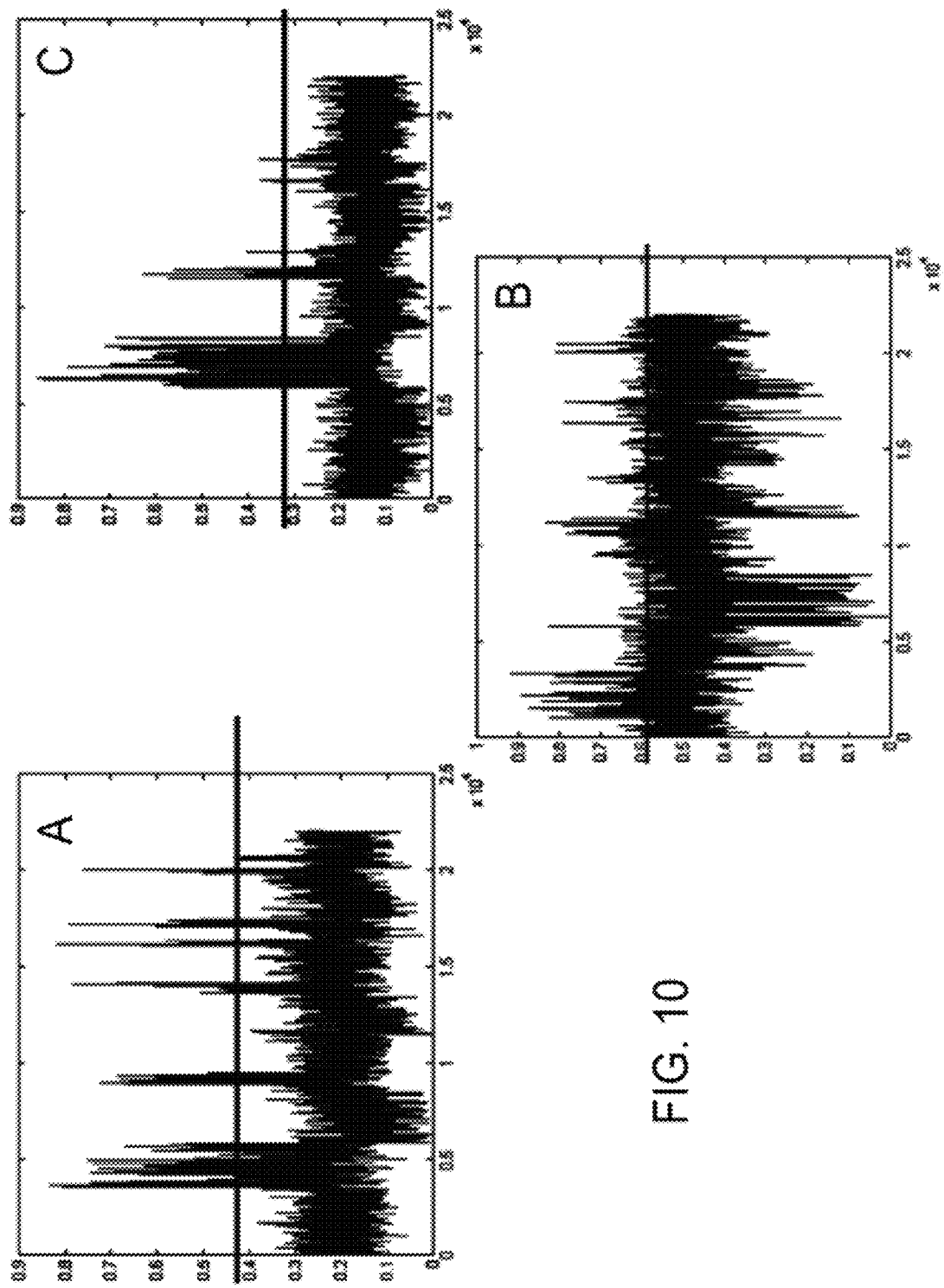
FIG. 10 shows results of applying a set of three directional masking functions as shown in FIG. 9 to the same multichannel audio signal.

It may be expected that a microphone array will receive different amounts of ambient noise from different directions. FIG. 10 shows plots of magnitude vs. time (in frames) for results of applying a set of three directional masking functions as shown in FIG. 9 to the same multichannel audio signal. It may be seen that the average responses of the various masking functions to this signal differ significantly. It may be desirable to apply a respective detection threshold value to the output of each masking function, such that a DOA corresponding to that sector is not selected as a DOA estimate for the segment unless the masking function output is above (alternatively, is not less than) the corresponding detection threshold value.

Figure 11:
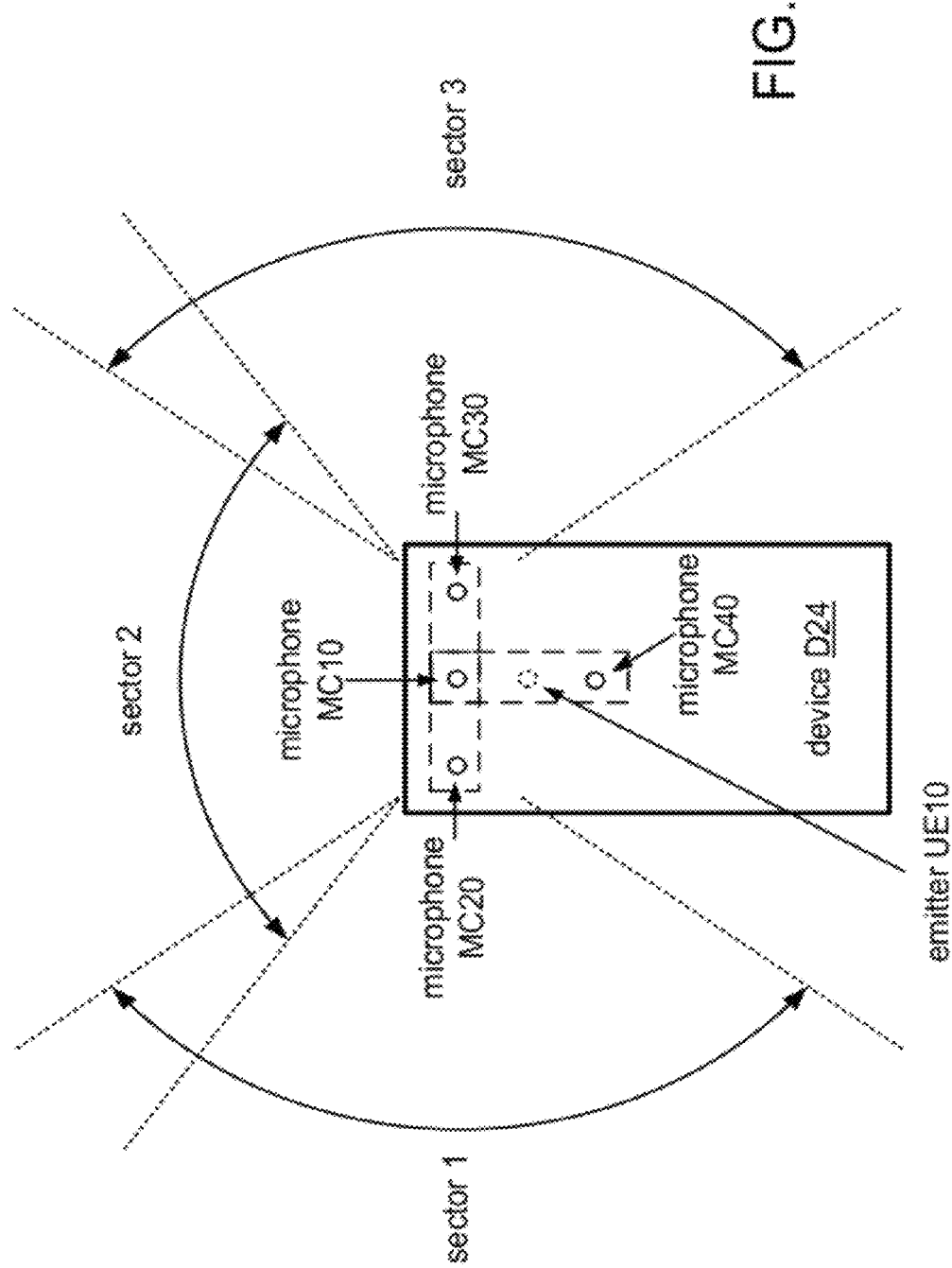
Figure 12:
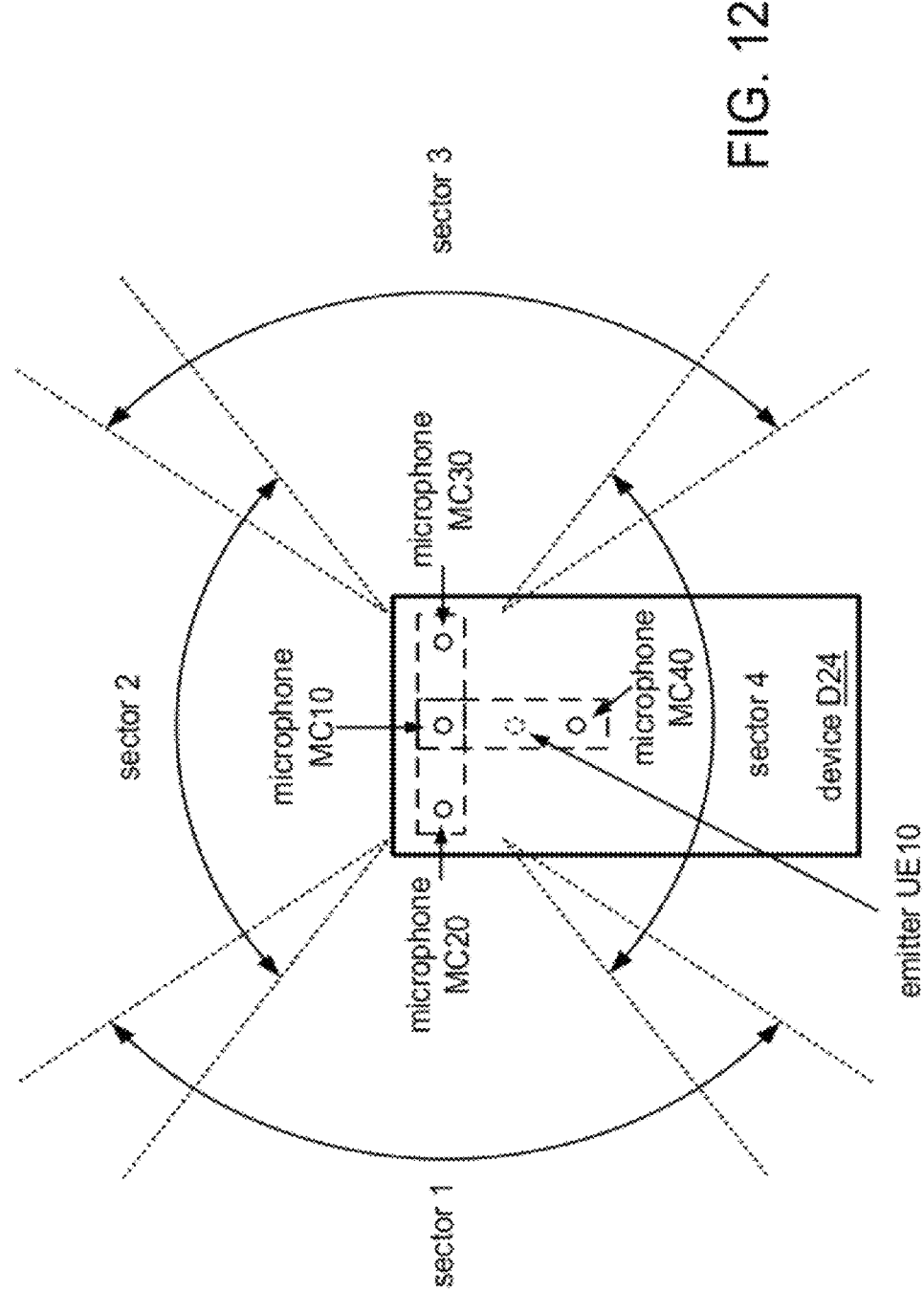
Figure 13:
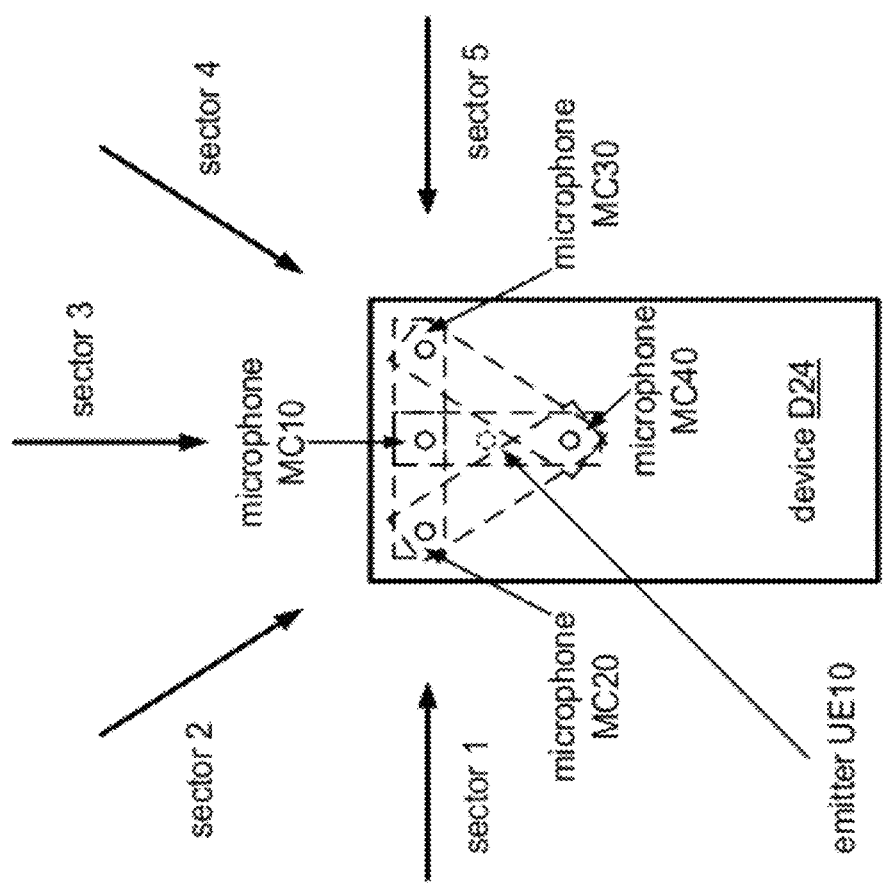

It is also possible to configure a DOA estimation method to evaluate sectors that correspond to different channel pairs. FIGS. 11-14 show examples of such a method used with a four-microphone implementation D24 of device D20. In FIG. 11, sector 1 is defined by a masking function applied to an endfire direction of the (primary-secondary) microphone pair MC20-MC10, sector 2 is defined by a masking function applied to an endfire direction of the microphone pair MC10-MC40, and sector 3 is defined by a masking function applied to an endfire direction of the microphone pair MC30-MC20. The example of FIG. 12 adds a fourth sector that is defined by a masking function applied to an endfire direction of the microphone pair MC40-MC10. FIGS. 13 and 14 show two similar examples (with five and eight sectors, respectively) that illustrate the DOA estimates associated with each sector. In these examples, the DOA estimate associated with each sector corresponds to the endfire direction of the respective microphone pair.

The "directional coherence" of a multichannel signal is defined as the degree to which the various frequency components of the signal arrive from the same direction. For an ideally directionally coherent channel pair, the value of $$\frac{\Delta\varphi}{f}$$

is equal to a constant k for all frequencies, where the value of k is related to the direction of arrival θ and the time delay of arrival τ. The directional coherence of a multichannel signal may be quantified, for example, by rating the estimated direction of arrival for each frequency component according to how well it agrees with a particular direction, and then combining the rating results for the various frequency components to obtain a coherency measure for the signal. Consequently, the masking function output for each sector is a measure of the directional coherence of the multichannel signal within that sector. Calculation and application of a measure of directional coherence is also described in, e.g., Int'l Pat. Publ's WO2010/048620 A1 and WO2010/144577 A1 (Visser et al.).

It may be desirable to produce the coherency measure for each sector as a temporally smoothed value. In one such example, the DOA estimation method is configured to produce the coherency measure as a mean value over the most recent m frames, where possible values of m include four, five, eight, ten, sixteen, and twenty. In another such example, the method is configured to calculate a smoothed coherency measure $z(n)$ for frame n according to an expression such as $z(n)=\beta z(n-1)+(1-\beta)c(n)$ (also known as a first-order IIR or recursive filter), where $z(n-1)$ denotes the smoothed coherency measure for the previous frame, $c(n)$ denotes the current unsmoothed value of the coherency measure, and β is a smoothing factor whose value may be selected from the range of from zero (no smoothing) to one (no updating). Typical values for smoothing factor β include 0.1, 0.2, 0.25, 0.3, 0.4, and 0.5. It is typical, but not necessary, to use the same value of β to smooth coherency measures that correspond to different sectors.

The contrast of a coherency measure may be expressed as the value of a relation (e.g., the difference or the ratio) between the current value of the coherency measure and an average value of the coherency measure over time (e.g., the mean, mode, or median over the most recent ten, twenty, fifty, or one hundred frames). A DOA estimation method may be configured to calculate the average value of a coherency measure for each sector using a temporal smoothing function, such as a leaky integrator or according to an expression such as $v(n)=\alpha v(n-1)+(1-\alpha)c(n)$, where $v(n)$ denotes the average value for the current frame, $v(n-1)$ denotes the average value for the previous frame, $c(n)$ denotes the current value of the coherency measure, and α is a smoothing factor whose value may be selected from the range of from zero (no smoothing) to one (no updating). Typical values for smoothing factor α include 0.01, 0.02, 0.05, and 0.1.

A sector-based DOA estimation method may be configured to estimate the DOA of the signal as the DOA associated with the sector whose coherency measure is greatest. Alternatively, such a method may be configured to estimate the DOA of the signal as the DOA associated with the sector whose coherency measure currently has the greatest contrast (e.g., has a current value that differs by the greatest relative magnitude from a long-term time average of the coherency measure for that sector). Additional description of phase-difference-based DOA estimation may be found, for example, in U.S. Publ. Pat. Appl. 2011/0038489 (publ. Feb. 17, 2011) and U.S. patent application Ser. No. 13/029,582 (filed Feb. 17, 2011).

For both gain-difference-based approaches and phase-difference-based approaches, it may be desirable to perform DOA estimation over a limited audio-frequency range of the multichannel signal. For example, it may be desirable to perform DOA estimation over a mid-frequency range (e.g., from 100, 200, 300, or 500 to 800, 100, 1200, 1500, or 2000 Hz) to avoid problems due to reverberation in low frequencies and/or attenuation of the desired signal in high frequencies.

It may be desirable in certain applications to localize the position of each of one or more directional sound sources relative to an audio sensing device. In addition to DOA estimation, for example, it may be desirable to obtain information regarding the range (i.e., distance) of each directional sound source relative to the microphone array. It may be desirable to use such information to track the position over time of a moving directional source, such as a human speaker, relative to the audio sensing device. Examples of applications for source localization include but are not limited to the following: steering of a directional microphone; steering of a beam of a multi-microphone array; using spatial information for speech enhancement; recording spatial information of a sound field for spatially enhanced reproduction (e.g., using wave field synthesis); control of microphone path gain; control of audio playback gain; audio conferencing; video conferencing; gesture recognition; motion detection; presence detection; steering and/or focusing of an imaging sensor (e.g., a camera); control of a display for glasses-free three-dimensional viewing; interactive motion-related gaming applications, which may include activities such as, for example, dance, sports, and/or musical instrument playing (e.g., Dance Dance Revolution (Konami Corp., Tokyo, JP), Wii Sports (Nintendo Co., Ltd., Kyoto, JP), the Hero series of video games (e.g., Guitar Hero, Band Hero, DJ Hero; Activision Blizzard, Santa Monica, Calif.)). Examples of audio sensing devices that may be used to perform such techniques include set-top boxes, gaming consoles, and laptop and tablet computers.

One approach to ranging is to estimate the range of a source from recordings of audible sound emitted by the source (also called "passive ranging"). To retrieve reliable range information from audio recordings, however, it is typically desirable for the aperture of the microphone array to be comparable to the distance between the array and the sound source. For an application in which it is desirable to support the estimation of ranges of one meter or more (e.g., up to three or four meters), it may be not practical to obtain such a relationship between array aperture and source range for small form factors, such as devices for wireless communications (e.g., smartphones) and/or portable computing (e.g., netbooks or laptops) and other consumer devices (e.g., set-top boxes, gaming consoles). For such applications, it may be desirable to use an active approach for ranging.

In sound recording applications (e.g., for voice communications), using emissions of audible sound to support active ranging may cause interference with the captured audible sound field. Consequently, it may be desirable to use another approach for active ranging. One such approach is active ranging using ultrasound energy, which is imperceptible by humans. Such ranging may include emitting an ultrasound ranging pulse, detecting the echo caused by reflection of the pulse from the object to be ranged (i.e., the source), and calculating a range (e.g., the distance between the sound source and the detector) based on the time-of-flight from emission of the pulse to detection of the reflected echo. Ultrasound energy is typically emitted and detected in frequency bands far above those where most noise is emitted, which may provide a lower noise floor for ultrasound measurements than for audio-frequency measurements.

Combinations of ultrasound ranging and DOA estimation from audible sound can provide good alternatives to other localization approaches, such as those based on imaging data (e.g., motion capture). Integration of ultrasound ranging into an audio processing device is typically easier than similar integration of other ranging technologies, such as micropower impulse radar (MIR) or infrared. For example, it is typically possible to use audio microphones as ultrasound detectors. Ultrasound ranging may also be more accurate than other approaches at a typical distance range of such an audio processing application (e.g., distances of from one to five meters). FIG. 1C shows an example in which both a direction of arrival and a range RS1 are associated with a desired source AS1.

Ultrasound ranging may also help to identify other aspects of the environment, such as room dimensions (e.g., to configure a dereverberation operation to be performed on the received audio-frequency signal). An ultrasonic ranging operation may be combined with one or more directional discrimination methods (e.g., DOA estimation from audible sound), as typically the only range of interest is the range of an object in a particular direction (i.e., as opposed to the ranges of all nearby objects).

It may be desirable to use information from a ranging operation, such as ultrasonic ranging, to improve DOA estimation. For example, it may be desirable to select among different methods for estimating DOA from received sound, based on an estimated distance between the sound source and the microphone array. Some phase-difference-based methods for estimating DOA from received sound may produce better results than an energy-difference-based method when the source is close to the array, while the energy-difference-based method may produce better results when the source is far away from the array.

In such cases, the application may be configured to use phase differences to estimate DOA in response to an indication that the source is close to the device. Near-field noise reduction methods may also be used in such cases. In response to an indication that the source is far away from the device, the application may be configured to use an energy-difference-based DOA estimation method (and/or a different phase-difference-based method) instead.

Time-domain cross-correlation methods may produce better results for close sources than for far sources, while some phase-difference-based methods may produce good DOA estimation results for source-device distances up to 1-2 meters or more. Among gain-difference-based methods, methods based on beam strength or quality differences may be effective at greater source-device distances than methods based on gain difference between channels of the received audio-frequency signal.

Figure 2B:
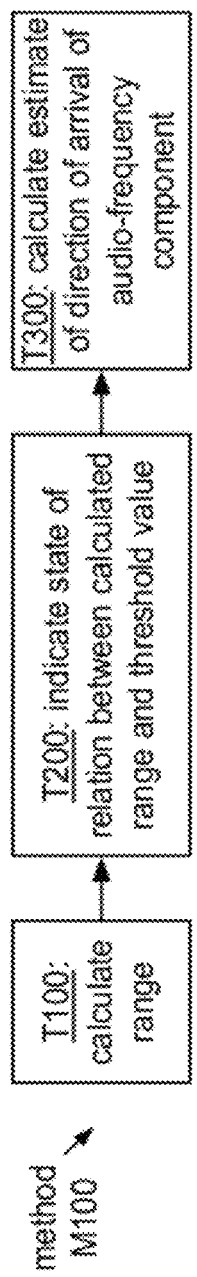
FIG. 2B shows a flowchart for a method M100 according to a general configuration.

FIG. 2B shows a flowchart for a method M100 according to a general configuration that includes tasks T100, T200, and T300. Based on information from a detected reflection of an emitted ultrasonic signal, task T100 estimates a range of a sound-emitting object (e.g., a desired sound source, such as a user). Task T200 indicates a state of a relation between the estimated range and a threshold value. Based on the indicated state of the relation, task T300 calculates an estimate of a direction of arrival of an audio-frequency component of a multichannel signal. For example, task T300 may be configured to calculate the DOA estimate based on a phase difference between channels of the audio-frequency component in response to an indication by task T200 that the relation has a first state (e.g., that the source is close to the array), and to calculate the DOA estimate based on a difference in energy between channels of the audio-frequency component in response to an indication by task T200 that the relation has a second state (e.g., that the source is far from the array), or vice versa. In another example, task T300 may be configured to calculate the DOA estimate based on a selected one among two different gain-difference-based methods, or a selected one among two different phase-difference-based methods, or a selected one (or more) among any of the various DOA estimation techniques disclosed herein. As noted above, FIG. 1D shows an example of an implementation D20 of device D10 that may be configured to perform an implementation of method M100.

Task T100 may be configured to estimate the range from the detected ultrasound signal in the time domain or in a frequency domain, such as a subband domain or a transform domain (e.g., an FFT domain). In a subband-domain example, task T100 passes the time-domain received signal through a bank of one or more time-domain bandpass filters and measures the output energy of each subband. In a transform-domain example, task T100 calculates a spectrogram of the received signal and monitors an evolution of the energy at the peak frequency (e.g., 40 kHz) over time (see, e.g., FIG. 20).

Task T100 may be configured to determine the time-axis location of a received echo as the location of an energy peak in the FFT domain. For a time-domain signal, task T100 may be configured to determine the time-axis location of a received echo as the location of the peak of a region of samples whose energy (individually or, alternatively, collectively) is above an echo detection threshold value. The echo detection threshold value may be fixed or adaptive, and it may be desirable to limit the maximum width (in samples) of the region. Task T100 may be configured to identify the peak as the highest-energy sample of the region or, alternatively, as the center in time of the region.

Task T100 may be configured to estimate the range as a measure of distance (e.g., in meters or centimeters) or, equivalently, as a measure of time (e.g., in seconds, milliseconds, frame periods, or sample periods). Task T100 may be configured to indicate the calculated source-to-device range in terms of the total distance of the path from emitter to reflecting source to detector (e.g., the total time-of-flight from emission to detection). Alternatively, task T100 may be configured to indicate the calculated source-to-device range by dividing the total distance or time-of-flight by two (i.e., to indicate the calculated source-to-device range as the distance between the reflecting source and the device).

Task T100 may be configured to identify the moment at which the pulse is emitted (i.e., the start of the time-of-flight) from the detected ultrasound signal. Alternatively, task T100 may be configured to receive an indication of the time of emission from a signal generator that generates the pulses.

Task T200 may be configured to indicate that the relation between the estimated range and the threshold value has a first state (e.g., one or logical high) if the estimated range is less than the threshold value, and to indicate that the relation has a second state (e.g., zero or logical low) if the estimated range is greater than the threshold value. One example of such a method uses a threshold value that corresponds to a source-to-device distance of about one meter (e.g., a total time-of-flight of about 5.88 milliseconds, for a velocity of sound of 340 meters per second), such that a phase-based DOA method is selected when the source is closer than one meter to the device, and an energy-based DOA method is selected when the source is farther than one meter from the device. Other examples of the threshold value include values that correspond to source-to-device distances in a range from 50 centimeters to 150 centimeters (e.g., 50, 75, 80, 120, 135, or 150 centimeters).

FIGS. 15A-15D illustrate an example of an application of method M100. FIG. 15A shows a plot (amplitude vs. time) of a signal produced by ultrasonic detector UD10 in response to a pulse emitted by ultrasonic emitter UE10 at a first time A and in response to a received echo ES1A caused by reflection of the pulse from an audible source AS1. The time between these two events (emission of the pulse and reception of the echo) is a time-of-flight TOF1A of the ultrasonic pulse that indicates a range RS1A of audible source AS1 at time A, as shown in FIG. 15B. In this case, task T200 indicates that range RS1A is less than a distance threshold value $T_R$, such that a first DOA estimation method (e.g., phase-based) is selected.

FIG. 15C shows a similar plot of a signal produced by ultrasonic detector UD10 in response to a pulse emitted by ultrasonic emitter UE10 at a second time B and in response to a received echo ES1B caused by reflection of the pulse from audible source AS1. The time between these two events is a time-of-flight TOF1B of the ultrasonic pulse that indicates a range RS1B of audible source AS1 at time B, as shown in FIG. 15D. In this case, task T200 indicates that range RS1B is greater than the distance threshold value $T_R$, such that a second DOA estimation method (e.g., energy-based) is selected.

Figure 16A:
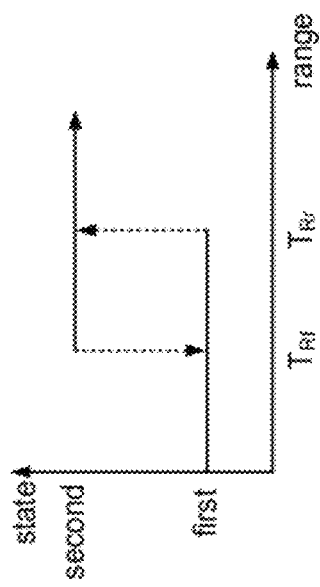
FIG. 16A shows a plot of a state transition with different rising and falling threshold values.

In order to inhibit excessive switching between DOA estimation methods over a short period of time (e.g., in the case of a source whose range is close to the threshold value $T_R$), it may be desirable to implement task T300 to include a hangover or other temporal smoothing operation. In one such example, task T300 is configured to switch the DOA estimation method only after task T200 has indicated the new state for some minimum number of consecutive indications (e.g., for three, five, ten, or twenty consecutive pulses; or for a period corresponding to 50, 100, 200, or 500 milliseconds). Additionally or alternatively, excessive switching between DOA estimation methods over a short period of time may be inhibited by configuring task T200 to use a different distance threshold for each state transition (e.g., as shown in FIG. 16A). For example, task T200 may be configured to indicate a transition from the first state to the second state (e.g., from phase-based to energy-based DOA estimation) only when the range exceeds (alternatively, is at least equal to) a rising threshold value $T_{Rr}$ (e.g., 110, 120, 135, or 150 centimeters), and to indicate a transition from the second state to the first state (e.g., from energy-based to phase-based DOA estimation) only when the range is less than (alternatively, is not greater than) a falling threshold value $T_{Rf}$ (e.g., 50, 60, 75, or 90 centimeters)

It may be desirable to configure method M100 to store a history of the ranges and corresponding directions of audible source AS1 relative to the device (e.g., as shown in FIG. 1C) that are associated with different moments of time. Such a history may be used to support tracking of the location of the source as it moves over time. In one such example, method M100 is configured to store each in a series of source locations as a triplet of a time value and corresponding DOA and range values (e.g., as a polar coordinate associated with a corresponding time value). Such a history may also include locations of more than one source and/or of other objects within the field of view, which locations may change or remain constant over time.

An implementation of method M100 (or an apparatus performing such a method) may also include performing one or more spatially selective processing operations on multichannel signal S10. For example, method M100 may be configured to produce an enhanced signal by attenuating frequency components of the multichannel signal that arrive from directions that are different than the estimated DOA (e.g., from directions that are outside an accepted range of directions around the estimated DOA). For a case in which the multichannel signal includes more than two channels, method M100 may be configured to select a subset (e.g., a pair) of channels, based on the estimated DOA. For example, method M100 may be configured to select the pair of channels that correspond to the microphone pair whose endfire (i.e., axis) direction coincides most closely with the estimated DOA.

Alternatively or additionally, method M100 may be configured to calculate an estimate of a noise component of the multichannel signal that includes frequency components that arrive from directions different from the estimated DOA (e.g., other sectors). For case in which a noise estimate is calculated, method M100 may also be configured to use the noise estimate to perform a noise reduction operation on one or more channels of the multichannel signal (e.g., Wiener filtering or spectral subtraction of the noise estimate from one or more channels of the enhanced signal). Other applications of method M100 include using the estimated DOA or source location to select a portion of an image captured by a camera of the audio sensing device as a focus window (e.g., such that the focus window includes at least part of an image of the source), and using the estimated source range and information from the focus window to focus the camera on the desired source.

It is typically possible to use the same microphones of device D20 for ultrasound detection as for audible sound recording (e.g., to implement detector UD10 as a microphone in an array of microphones), although such a device may be configured to include one or more dedicated ultrasound detectors instead. For a case in which a microphone is used for sensing both ultrasound and audible sound, it may be desirable to pass the received signal through a filter bank to separate the ultrasound component (for ranging and possibly for DOA estimation) from the audio-frequency component (for DOA estimation and possibly for spatially selective processing).

Each among detector UD10 and the microphones of the array (e.g., MC10, MC20, MC30, MC40) may be implemented as an extended-bandwidth microelectromechanical systems (MEMS) microphone and/or as an electret condenser microphone (ECM). Such a detector of ultrasound and/or audible sound may also be implemented as one or more sheets of a piezoelectric material, such as polyvinylidene fluoride (PVDF), piezoceramic, or carbon nanotubes. Multiple PVDF sheets may be applied to a surface.

Figure 17:
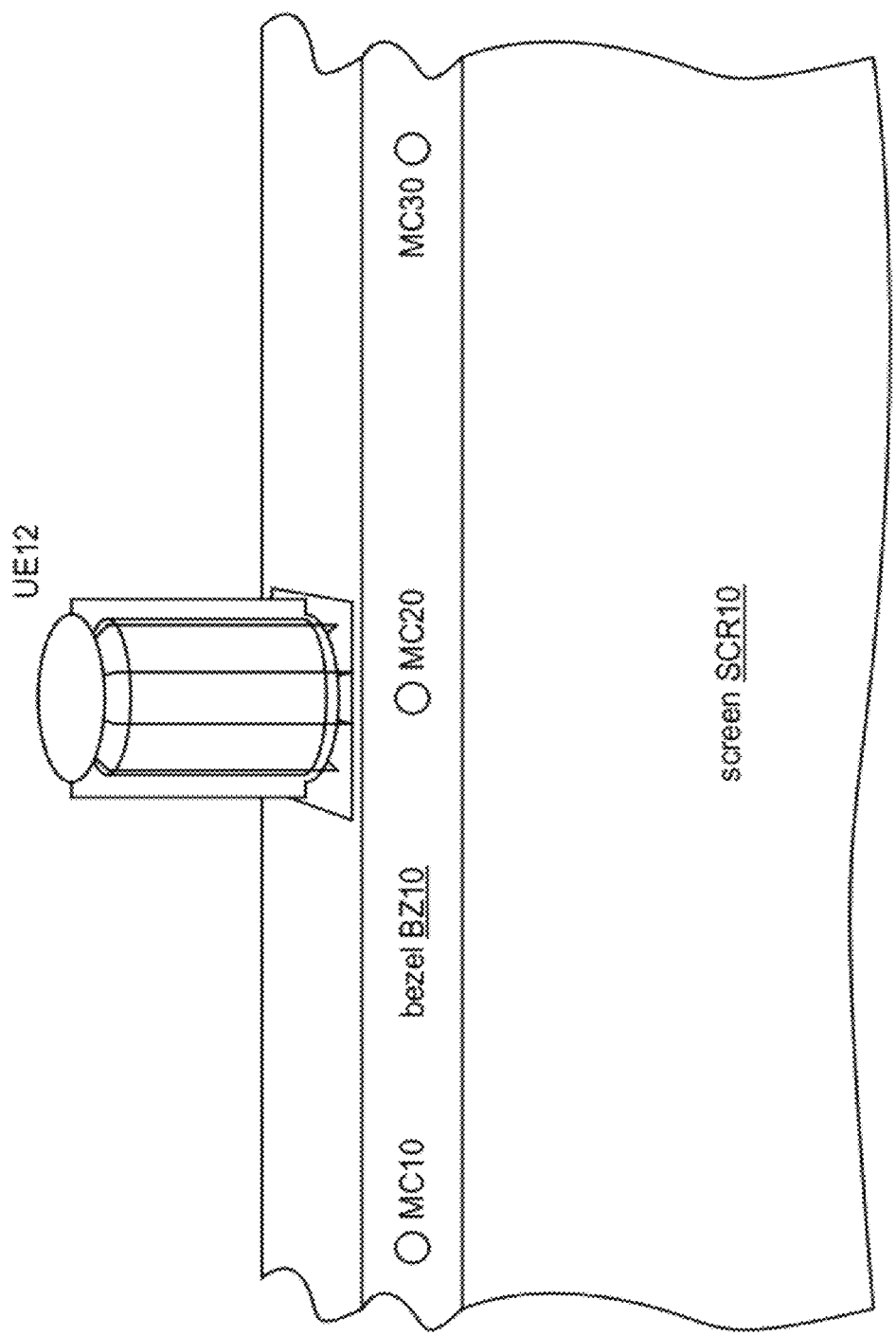
FIG. 17 shows a portion of an example of an implementation of audio sensing device D20.

It is possible to use a loudspeaker to emit the ultrasound ranging signal as well as an audible sound signal (e.g., a far-end speech signal in a telephony application), but it may be desirable to use a dedicated ultrasound emitter UE10 for ranging instead. Examples of ultrasound emitters include piezoelectric film, pyroelectric film, and piezoceramics. Piezoelectric film (e.g., PVDF) ultrasound transmitter and receivers offer unique advantages for air ranging applications. Typical emission and detection frequencies for PVDF films include 40 kHz and 80 kHz. Cylindrical PVDF transmitters typically exhibit omnidirectional horizontal beam directivity and broad band characteristics. Cylindrical PVDF receivers typically exhibit very wide horizontal beam directivity and broad band characteristics. Depending on the application, resonance frequency and vertical beam directivity of the transmitter and/or receiver can easily be customized by changing the diameter and/or length of the PVDF cylinder. FIG. 17 shows a portion of one example of an implementation of audio sensing device D20 (e.g., a laptop or tablet computer) that includes a screen SCR10 mounted in a bezel BZ10, a cylindrical PVDF implementation UE12 of ultrasonic emitter UE10 mounted on bezel BZ10, and an array of three microphones MC10, MC20, MC30 located behind corresponding acoustic ports in bezel BZ10. In this example, microphone MC20 also serves as detector UD10, and one or more of the other microphones may also be used as ultrasound detectors. For an emitter that protrudes as shown in FIG. 17, it may be desirable to mount the emitter in a spring-loaded or otherwise retractable fashion such that it may be moved within bezel BZ10 when not in use. Another example of device D20 includes multiple PVDF cylindrical receivers arranged orthogonally to provide a complete three-axis omnidirectional beam pattern.

Pyroelectric film may also be used as an ultrasound emitter. Carbon nanotube technology (CNT) emitters, for example, may be configured to exhibit a pyroelectric effect. Heating and cooling the air quickly in an adiabatic process compresses and rarifies the air molecules, resulting in sound waves. Such a film (e.g., CNT film) can be used in a planar emitter or, alternatively, wrapped into a cylindrical shape for an omnidirectional beam pattern.

Figure 16B:
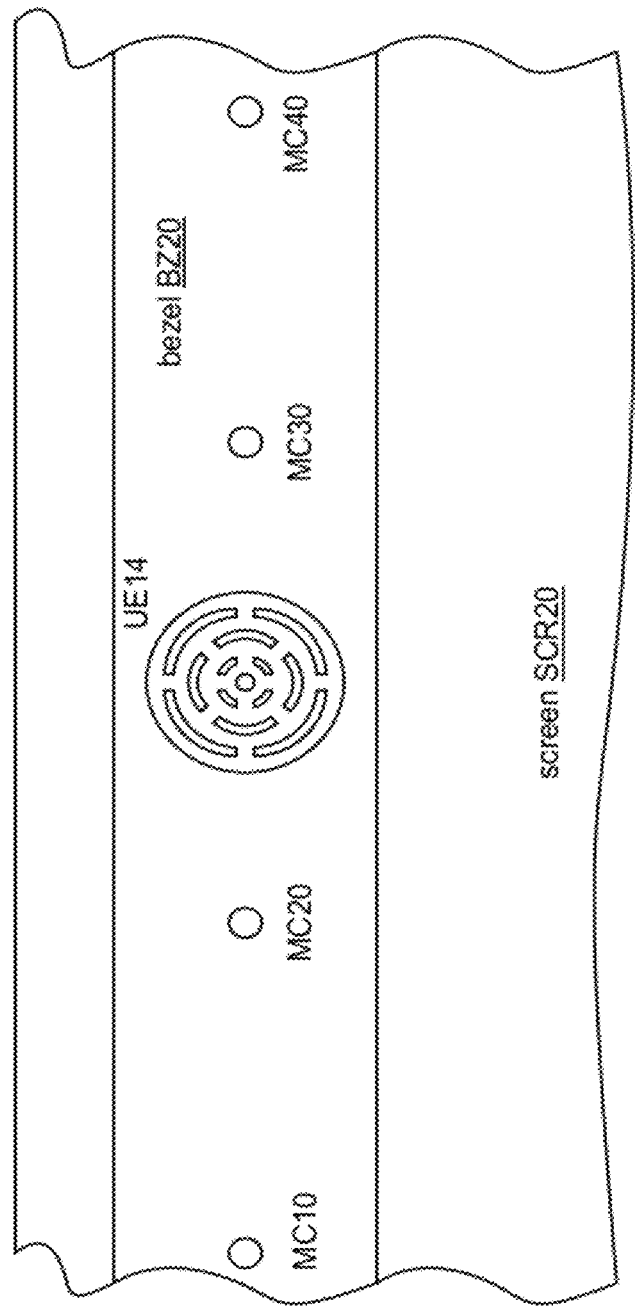
FIG. 16B shows a portion of an example of an implementation of audio sensing device D20.

Piezoceramic emitters are efficient ultrasonic emitters as well, but typically have a lower Q-factor than PVDF transmitters. Such an emitter may be formed into a spherical shape to act as an omnidirectional point source, or formed into a sheet to act as a piston-mode or cantilever beam actuator. FIG. 16B shows a portion of one example of an implementation of audio sensing device D20 (e.g., a laptop or tablet computer) that includes that includes a screen SCR20 mounted in a bezel BZ20, and an array of four microphones MC10, MC20, MC30, MC40 and a piezoceramic implementation UE14 of ultrasonic emitter UE10 located behind corresponding acoustic ports in bezel BZ20. In this example, microphone MC20 also serves as detector UD10, and one or more of the other microphones may also be used as ultrasound detectors.

Device D20 may be configured to drive emitter UE10 to emit ranging pulses at a rate of, for example, 0.2, 0.25, 0.5, 1, 2, 5, 10, 20, 50, or 100 Hz. For installations in consumer home environments (e.g., set-top boxes, gaming consoles, laptop or tablet computers), it may be desirable to use an ultrasound frequency that is above the range of a pet's hearing. Dogs can typically hear sounds up to 40,000 Hz, cats can typically hear sounds up to 60,000 Hz, and rodents can typically hear sounds up to 90,000 Hz. It may be desirable for the rate at which the received signal is sampled to be greater than two times the frequency of the emitted pulse (e.g., a sampling rate of 80-200 kHz or more, such as 192 kHz).

A surface that is large, flat, and hard, such as a wall of a room, is likely to reflect more of the energy of an ultrasound pulse than a human body. Such a surface may produce an echo having a larger amplitude than an echo from a user of the device. Ultrasound signals typically attenuate rapidly (e.g., to about fifty percent in five meters), such that the maximum practical source-to-device range may be limited to about five meters or less (e.g., two or three meters). The received ultrasound signal typically becomes weaker as the distance between the object and the detector increases and also as the size of the object decreases. The effect of distance is typically more perceptible in the detected ultrasound signal for non-flat surfaces than for flat surfaces.

Figure 18:
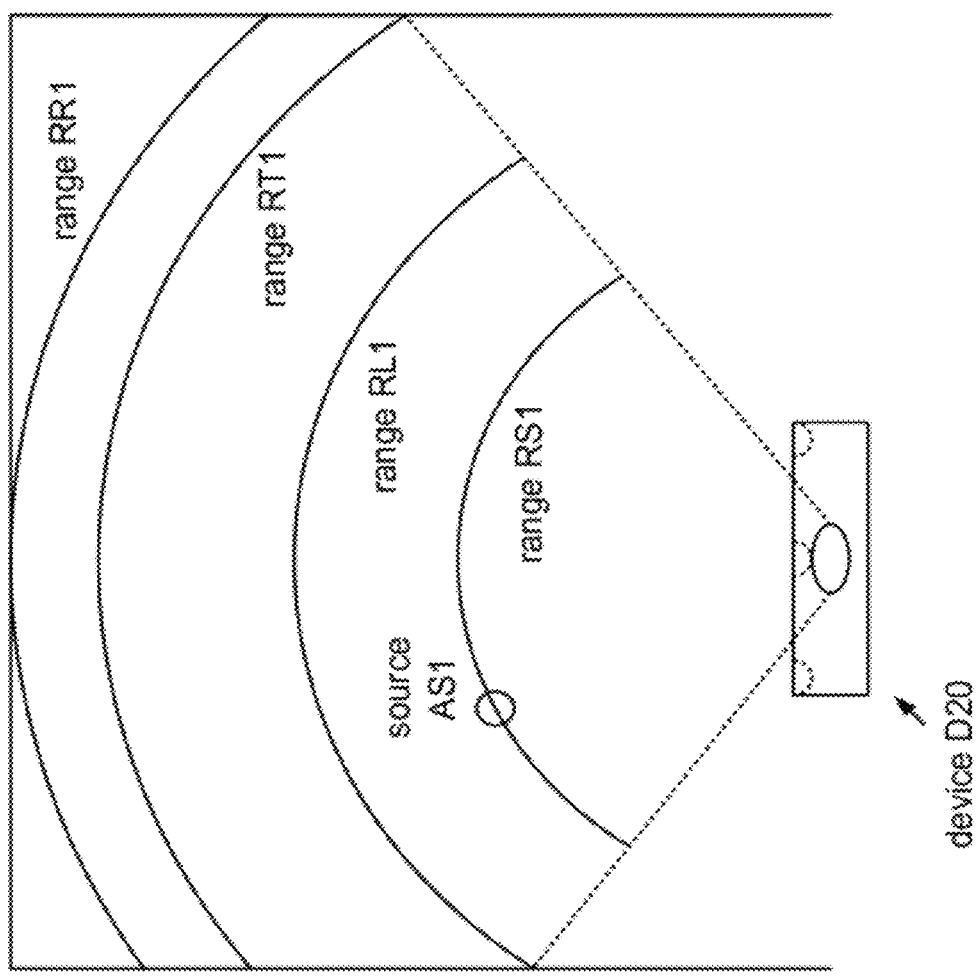
FIG. 18 shows an example of an environment producing multiple echoes of a ranging pulse.
Figure 19:
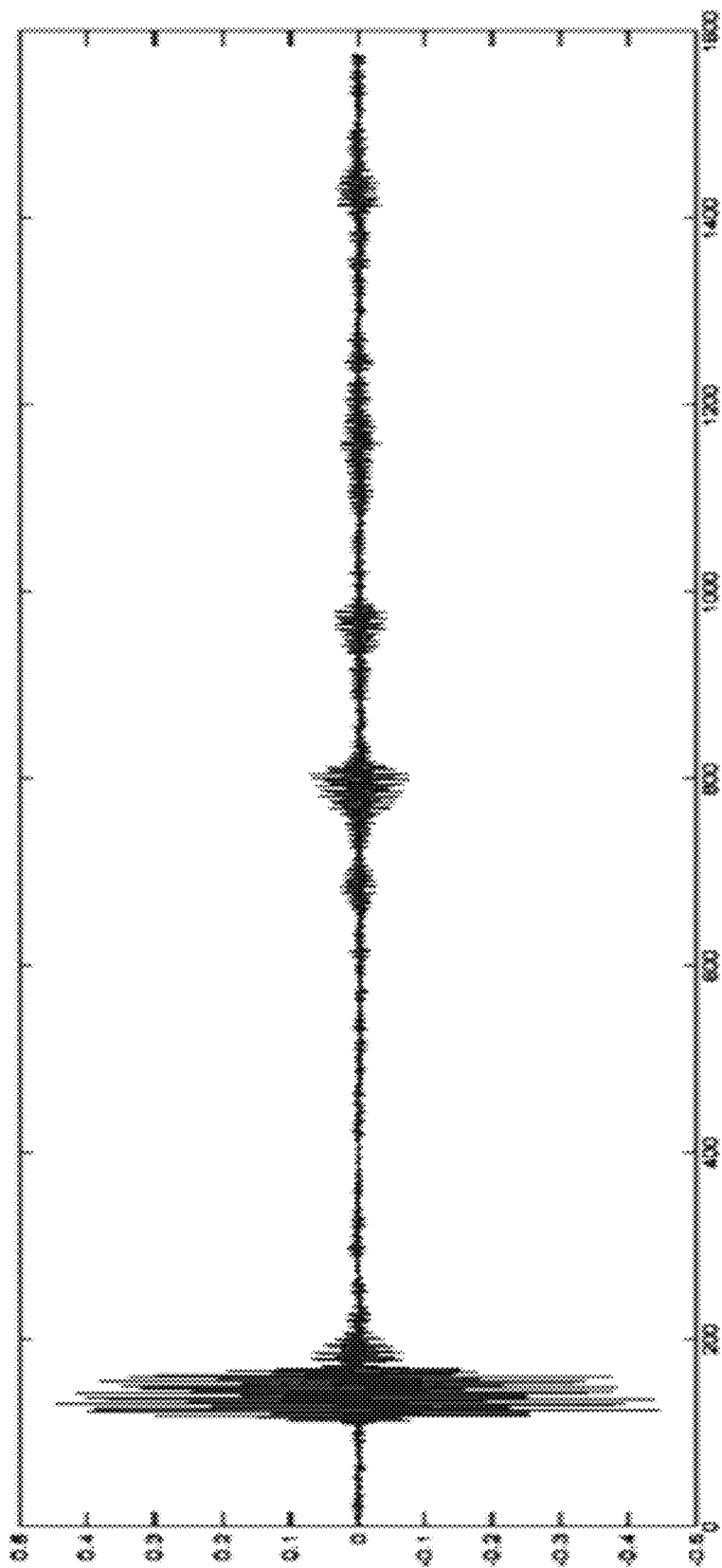
FIG. 19 shows a plot of a recording of a detected signal that includes multiple echoes.
Figure 20:
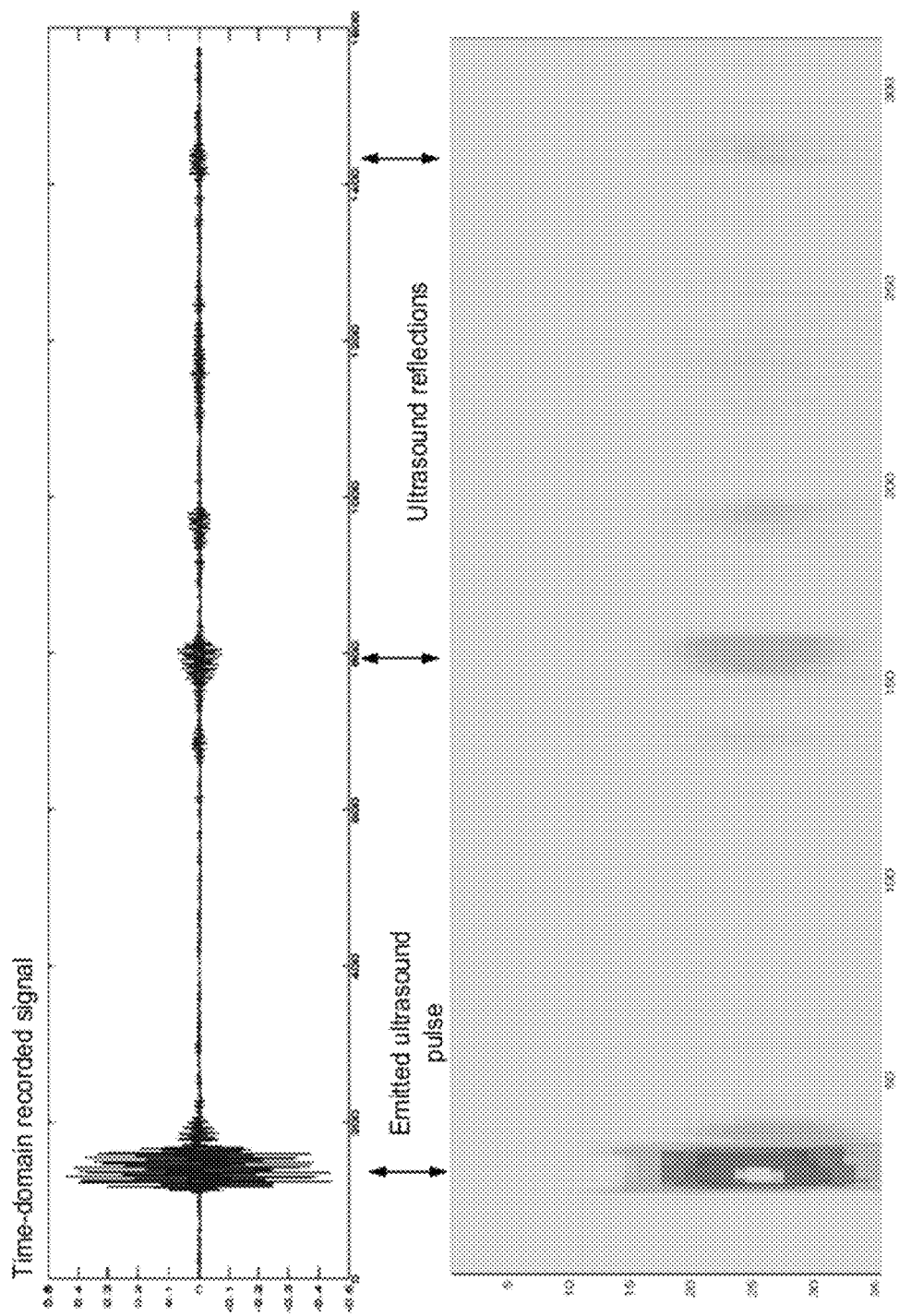
FIG. 20 shows the signal of FIG. 19 and a corresponding spectrogram.

In a practical application, the emitted ultrasonic pulse may be expected to reflect from more than one surface, such that the signal produced by the ultrasonic detector or microphone may be expected to include echoes from more than one reflection of the emitted pulse. FIG. 18 shows an example in which the detected signal includes an echo from source AS1 at range RS1. In this example, the signal may also include echoes from one or more among the left wall at range RL1, the right wall at range RT1, and the rear wall at range RR1. FIG. 19 shows a plot (amplitude vs. time-domain samples) of a recording of a detected signal that includes multiple echoes. FIG. 20 shows this time-domain signal and a corresponding spectrogram (which may be generated from the sensed signal using, for example, an FFT operation having a frame size of 16, 32, 64, or 128 samples).

FIG. 21A shows a plot of a signal produced by ultrasonic detector UD10 in response to a pulse emitted by ultrasonic emitter UE10, in response to an echo ES1 caused by reflection of the pulse from an audible source AS1, and in response to an echo EO1 caused by reflection of the pulse from another object O1 (e.g., a wall, a piece of furniture, another person, etc.). As noted above, the time-of-flight (TOF) of each reflection indicates the range of the corresponding reflecting object. Without more information, however, it may be difficult to reliably determine which of these reflections corresponds to the audible source for which a DOA is estimated during the same time period. The resulting range ambiguity, as illustrated in FIG. 21B, may cause an error in state indication task T200 and prevent task T300 from selecting a range-appropriate DOA estimation method for the audible signal received from source AS1.

One solution is to configure task T100 to select the closest range, so long as it satisfies a specified relation to a specified minimum and/or maximum value. For example, it may be assumed that the desired source is closer to the device than any other object within the field of view. Such an implementation of task T100 may be configured to select the closest range so long as it is not less than (alternatively, is at least equal to) a minimum value (e.g., corresponds to a source-to-detector distance that is not less than 20, 25, 30, 40 or 50 centimeters) and/or is not greater than (alternatively, is less than) a maximum value (e.g., corresponds to a source-to-detector distance that is not greater than 1, 1.25, 1.3, 1.5, or 2 meters).

For a case in which the audio sensing device is to remain stationary during use, it may be desirable to perform a range initialization operation to characterize the space in which the source DOA is to be estimated (e.g., an area in front of the array) in the absence of the source. Such an operation may create a baseline range map, for example, by storing the ranges of the echoes in the unoccupied space (e.g., from walls and furniture), such that echoes indicating these ranges may be ignored during use of the device to process sound received from an audible source.

Alternatively or additionally, it may be desirable to create a baseline map to characterize the ambient audio environment in a similar manner. Such a map may be used to enforce a geometric constraint on the audible DOA estimation method (e.g., to avoid a particular DOA) and/or a spatially selective processing operation (e.g., to attenuate sound arriving from a particular DOA). Such a constraint may help to reduce distraction by a directional interfering source whose location is fixed, such as a radio, television, noisy appliance, clock, etc.

Method M100 may be implemented to use signals from more than one detector (e.g., from more than one microphone of the array) for range estimation. When ranging results from multiple ultrasound detectors are available, for example, using these results for DOA estimation becomes possible. Such DOA estimation may include combining ranges (e.g., times-of-flight) from corresponding energy peaks in recordings from different ultrasonic detectors using, for example, a triangulation algorithm, a lateration algorithm (e.g., trilateration or multilateration), and/or a center-of-mass algorithm.

It may be desirable to arrange the detectors such that the ultrasound reflection pickup is sensitive to elevation and/or can discriminate between front and back directions (e.g., as in the arrangements shown in FIGS. 2A and 11-14). A microphone arrangement may allow higher spatial discrimination for ultrasound than for audio-frequency signals.

FIGS. 22A-C show an example of an application of DOA estimation using ranging results from multiple ultrasound detectors. FIG. 22A shows source AS1 and object O1 located in the field of view of an implementation D30 of audio sensing device D20. FIG. 22B shows a plot of a signal produced by detector UD10 (e.g., microphone MC10) that includes an echo E1 indicating a range R1. In this case, echo E1 is caused by the reflection of the emitted pulse from both of source AS1 and object O1, which have the same range relative to detector UD10 such that their echoes have merged. FIG. 22C shows a plot of a corresponding signal produced by detector UD20 (e.g., microphone MC20) that includes an echo E2S1 indicating a range R2S1 of source AS1 and an echo E2O1 that is distinct from echo E2S1 and indicates a range R2O1 of object O1.

Such an implementation of method M100 may be configured to determine two candidate locations within the field of view from echoes E1, E2S1, and E2O1 (e.g., using bilateration). The method may also be configured to use a DOA estimate from the audible signal produced by source AS1 (e.g., the most recent DOA estimate) to select the appropriate one among the candidate locations. In this example, selection of the appropriate candidate location also resolves a range ambiguity, supporting selection of an appropriate DOA estimation technique in task T300. Of course, such an implementation of method M100 may also be configured to use detected signals from each of three or more detectors.

An ultrasound DOA estimation approach may also include the use of more than one emitter, with each emitter being configured to produce a pulse that is distinguishable from pulses produced by the other emitter or emitters (e.g., a pulse that has a different emitted frequency and/or a different pulse energy profile over time). Alternatively or additionally, a difference between gains (e.g., magnitude, energy) and/or phases of echoes of the same pulse, as reflected by the same object and received by different detectors, may be used for DOA estimation. Detectors that are closely spaced may perform poorly, however, in providing gain-difference measurements. Conversely, for a case in which the microphones are also used as the ultrasonic detectors, the spacing between the detectors is typically too far apart to support phase-difference-based ultrasonic ranging.

For the typical form factor of a set-top box or laptop or tablet computer, it may be expected that DOA estimation from ultrasound reflections may be practical over a range of source-to-device distances of about thirty centimeters to about three meters. When a large object is close to the detectors, ultrasound DOA estimation may become unreliable due to an overlap of the emitted and reflected energy. It may be desirable to enable and/or disable updating of an ultrasound DOA estimate (and possibly of a DOA estimate based on audio-frequency information) based on ultrasound inferred range. For example, if task T100 indicates that an object is closer than a threshold distance $T_{min}$ to the detector, and/or that the size of the object is large compared to the size (e.g., the aperture) of the array, it may be desirable to reject a corresponding DOA estimate as unreliable. In such case, it may be desirable for task T100 to use the most recent DOA estimate as the current estimate, or to reduce the weight $w_a[n]$ of the ultrasound DOA estimate (possibly to zero) relative to the weight $w_p[n]$ of an audio-frequency DOA estimate in a combined estimate. Alternatively, it may be desirable in such case to disable adaptation of a spatially selective processing operation that is based on DOA estimation (e.g., to fall back to a single-channel processing algorithm instead, such as noise estimation by time-averaging the received audio-frequency signal during periods of speech inactivity).

The threshold distance $T_{min}$ (e.g., twenty or thirty centimeters), which may be expressed as a corresponding time-of-flight, may depend upon the wavelength and duty cycle of the emitted ultrasound signal. For example, the distance $T_{min}$ may be reduced by using a higher frequency for the emitted signal. Additionally or alternatively, an emitter with a lower Q may be used, such that the threshold distance $T_{min}$ may be reduced by driving the emitter with a lower duty cycle (e.g., a more narrow pulse).

Figure 23A:
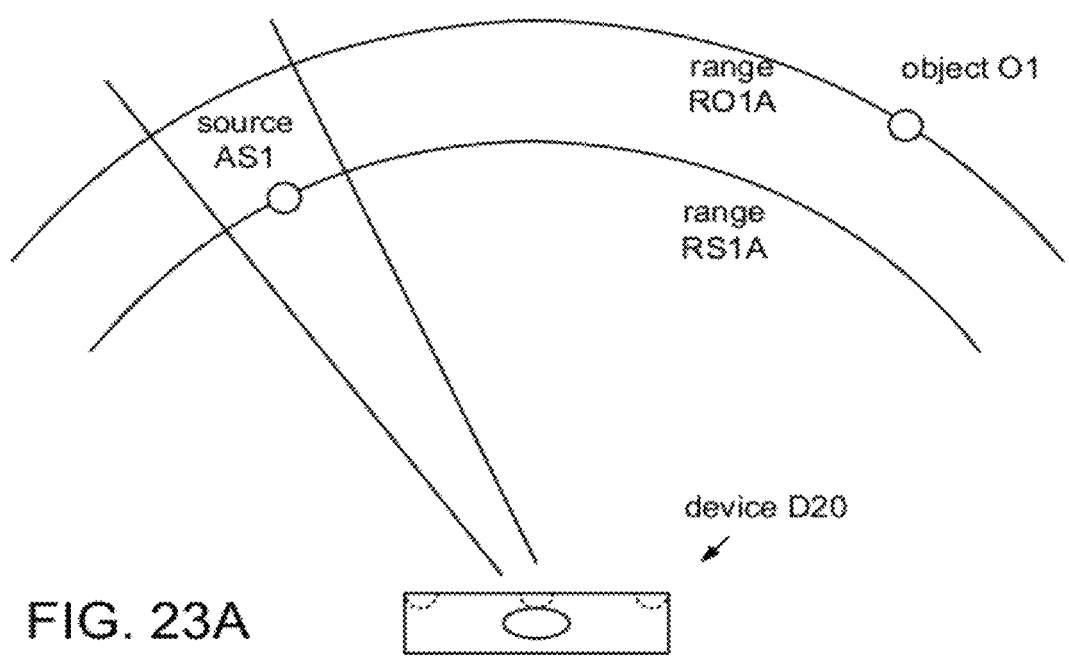
FIGS. 23A and 23B show a typical use scenario at two different times A and B.
Figure 23B:
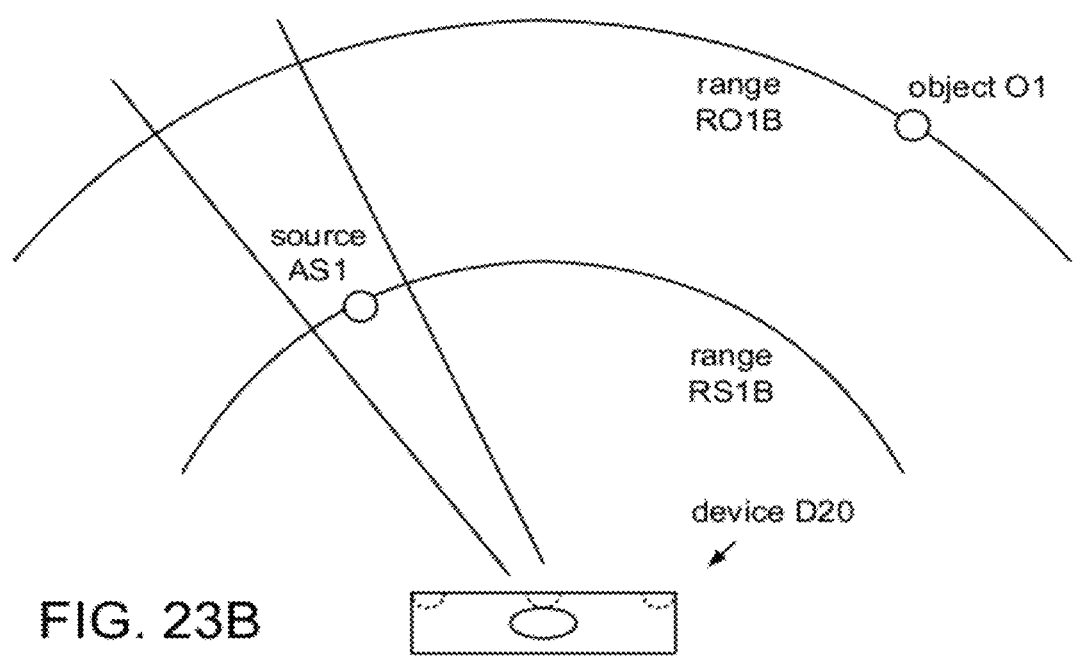

Alternatively or additionally to DOA estimation using results from multiple ultrasound detectors, method M100 may be configured to use changes in range information over time to resolve a range ambiguity. FIGS. 23A and 23B show a typical use scenario at two different times A and B. Object O1 does not move from time A to time B, so that range RO1A and range RO1B are the same. Source AS1 does move from time A to time B, so that range RS1A and range RS1B are different. In general, an audible source, such as a user of the device, is more likely to be moving toward or away from the device than other objects within the field of view (e.g., walls and furniture), resulting in corresponding relative displacement of the received echoes on the time axis. It may be desirable to implement method M100 to track time-axis changes in ultrasound reflected signals, rather than static peaks.

It may be desirable to configure such an implementation of method M100 to include an operation that selects the range of the desired source based on such a change in time-of-flight of successive received echoes. For example, it may be desirable to localize a desired source by associating a DOA estimated by task T300 with a range that changes over time.

Figure 24:
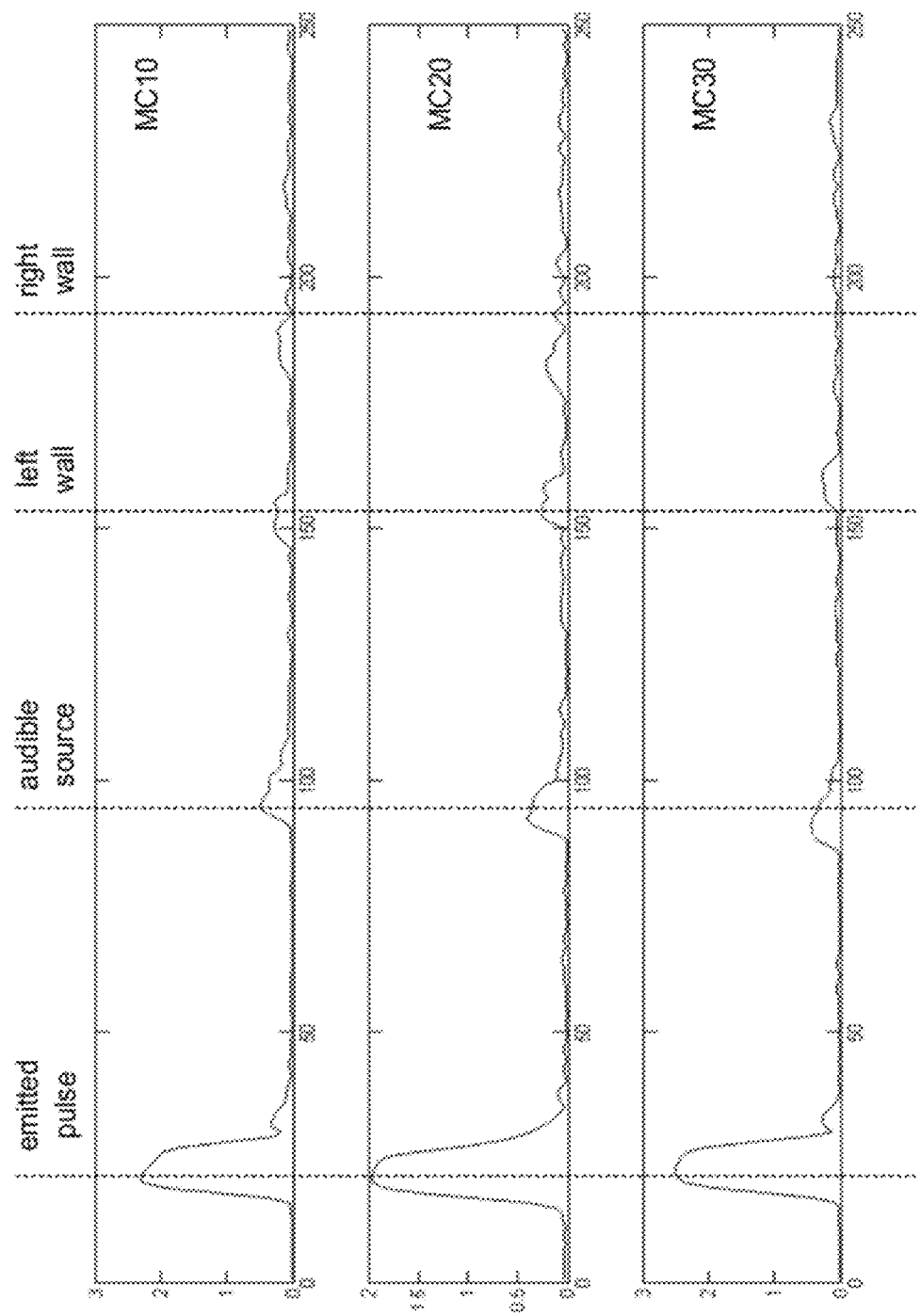
FIGS. 24-26 show examples of three-channel ultrasound recordings at different successive times.
Figure 25:
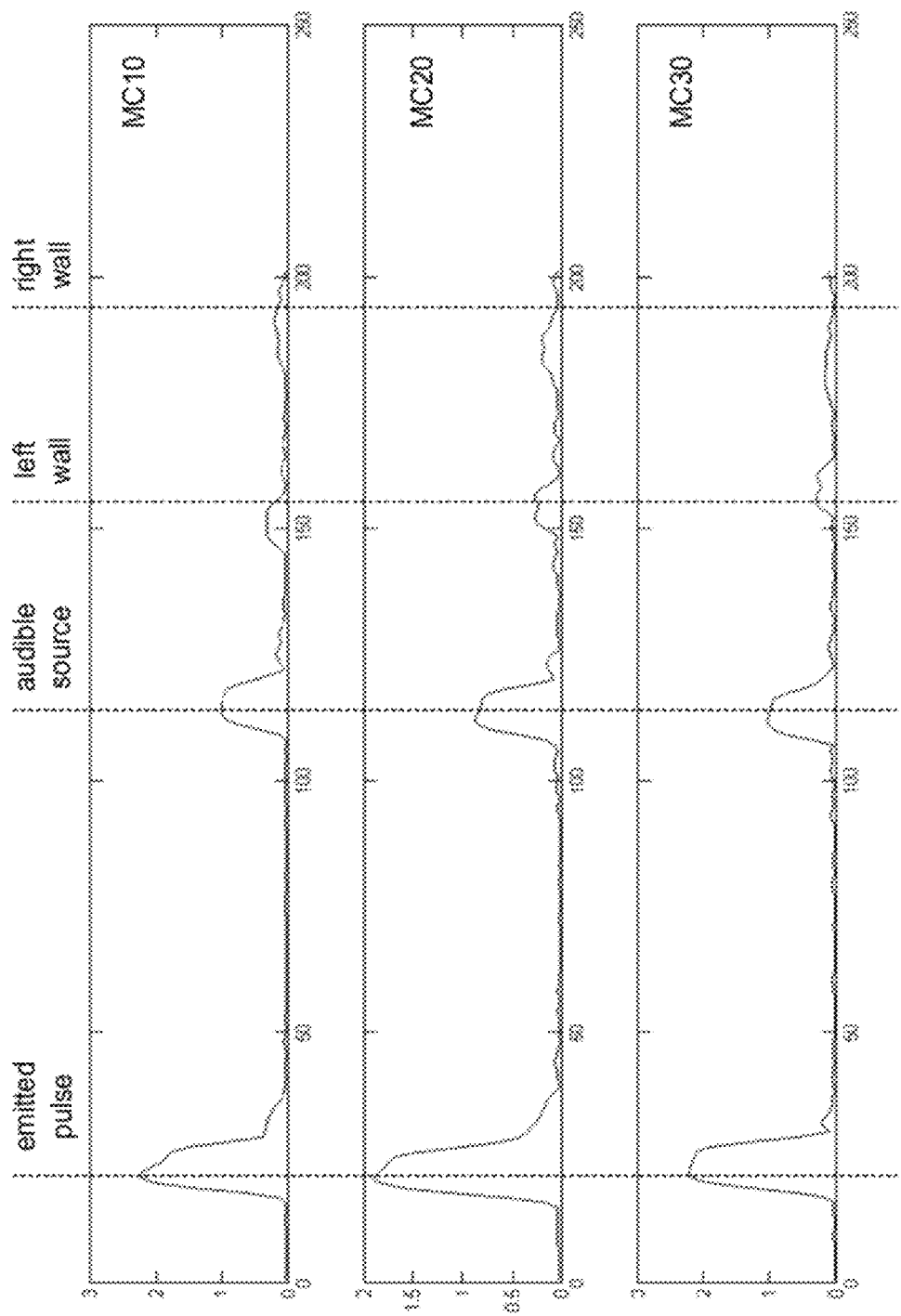
Figure 26:
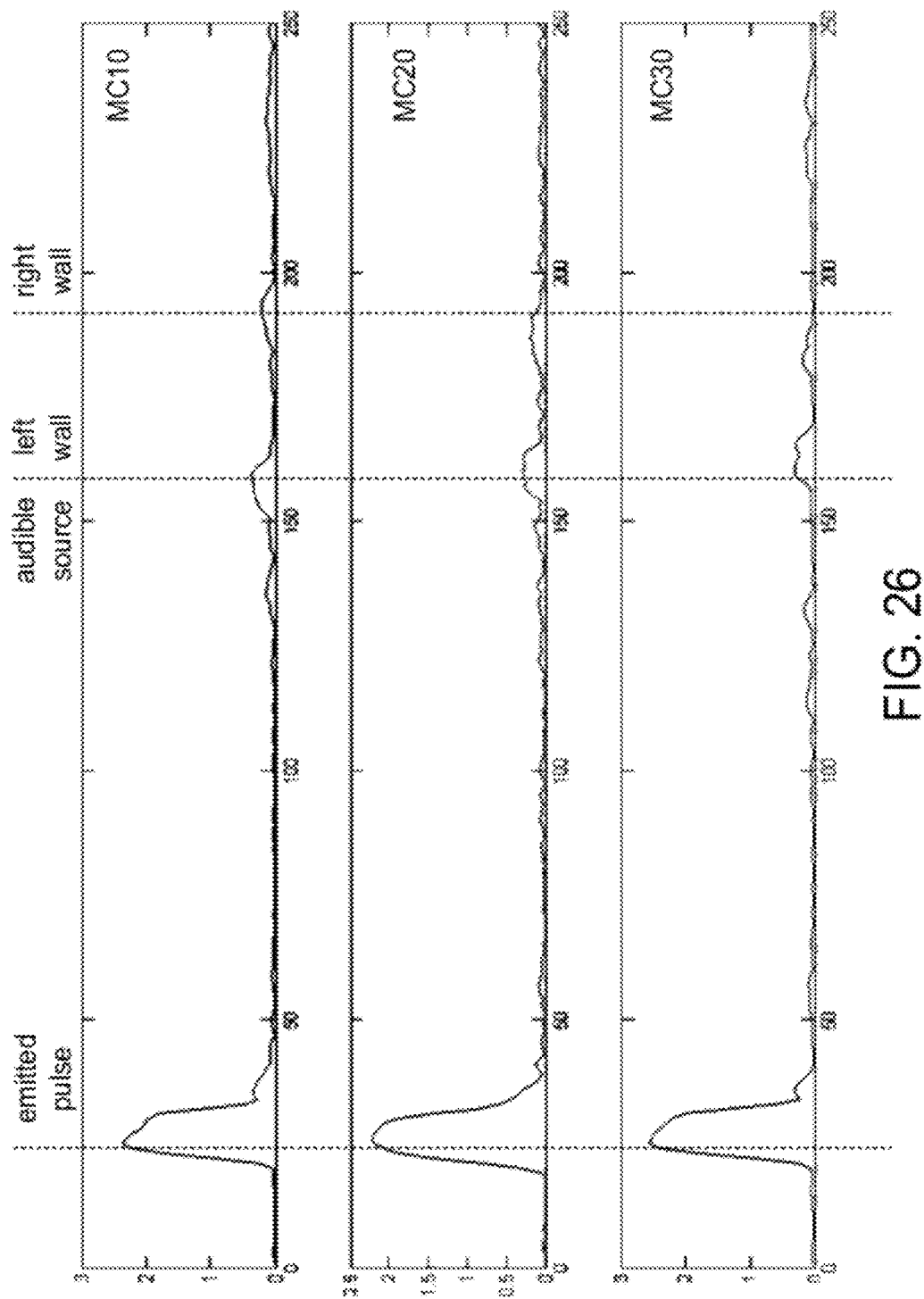

FIGS. 24-26 show examples of three-channel recordings at different successive times as a user moves away from the detector array. FIG. 24 shows plots (energy vs. time) of signals produced by an array of three ultrasound detectors (e.g., microphones MC10, MC20, MC30) of an implementation of device D30 in response to a pulse emitted by ultrasonic emitter UE10 at a time A and resulting echoes. FIGS. 25 and 26 show similar plots in response to pulses emitted at times B and C, respectively, where time B is after time A and time C is after time B. The audible source (e.g., a human speaker) moves away from the device from time A to time C, such that its range changes over time, in contrast to the ranges of the left and right walls which remain constant. It may be assumed that an echo that moves over time is more likely to be associated with a desired source, and that an echo that remains stationary over time is more likely to be associated with a wall, piece of furniture, or other object.

It may be desirable to configure task T100 to use stored information regarding object locations to ignore features whose ranges are persistent over time (e.g., static peaks, bumps, or energy concentrations) in a detected signal and to track features whose ranges change over time. For example, task T100 may be implemented to select a range by calculating differences between successive times-of-flight corresponding to each echo, and selecting the range that corresponds to a moving echo. Such an implementation of task T100 may be configured to identify a feature as persistent or moving according to a relation between a difference between successive ranges of the feature and a movement threshold value $T_m$. In such case, task T100 may be configured to identify a feature as persistent in response to detecting that its range has changed by less than (alternatively, by not more than) $T_m$, and to identify a feature as in motion in response to detecting that its current range is different from its previous range by at least (alternatively, by more than) $T_m$. Examples of values for threshold value $T_m$ include distances of 10, 20, and 25 centimeters and times corresponding thereto.

When the echo from an audible source has the same time-of-flight as the echo from another object, the source may become invisible to the ranging detector, even if it is located in a different direction relative to the device than the masking object is. FIG. 26 shows such an example in which the audible source has moved such that its echo is merged with a masking echo (in this case, the echo from the left wall). A range that is occupied by a masking echo is also called a "blind zone." Implementing task T100 to track changes in the range of a desired source over time allows the method to detect when the source passes into a blind zone, such that the method may continue to provide an appropriate range for the desired source.

It may be desirable to configure method M100 to detect motion of a source by detecting a corresponding Doppler frequency shift of the detected signal. For source motion at a velocity of one meter per second and an emitted ultrasound frequency of 40 kHz, the resulting Doppler frequency shift that may be expected (for a source moving directly toward or away from the array) is about 100 Hz.

A DOA estimation technique may be configured to benefit from synergy between an approach that uses ultrasound and an approach that uses audible sound. For example, it may be desirable to implement task T300 to use adaptive weighting to combine an estimated DOA based on reflected ultrasound with an estimated DOA based on sound received from the desired source. In one such example, task T300 is configured to produce DOA estimates according to an expression such as the following: $D_e[n]=w_a[n]D_a[n]+w_p[n]D_p[n]$, where $D_e[n]$ indicates the DOA estimate for pulse n, $D_a[n]$ indicates the active DOA estimate for pulse n, $w_a[n]$ indicates the weight for the active DOA estimate for pulse n, $D_p[n]$ indicates the passive DOA estimate for pulse n, and $w_p[n]$ indicates the weight for the passive DOA estimate for pulse n. It may be desirable for weights $w_a[n]$ and $w_p[n]$ to have values in the range of from zero to one such that $w_a[n]+w_p[n]=1$.

When more than one object is located at the same distance from an ultrasound detector such that their received echoes coincide, an ultrasound DOA estimation technique that is based on differences between gains and/or phases of received echoes may become unreliable. Such merging of echoes may also complicate a DOA estimation technique that is based on times-of-flight to different detectors. In these cases, it may be desirable to reduce the weight $w_a[n]$ of an ultrasound DOA estimate (possibly to zero) relative to the weight $w_p[n]$ of a corresponding audio-frequency DOA estimate. Conversely, during periods when the sound source is silent, it may be desirable to reduce the weight $w_p[n]$ of an audio-frequency DOA estimate (possibly to zero) relative to the weight $w_a[n]$ of a corresponding ultrasound DOA estimate.

It may be desirable to configure task T300 to smooth the DOA estimate over time. For example, task T300 may be configured to perform a temporal smoothing operation according to an expression such as the following (also called a first-order infinite-impulse-response filter or a leaky integrator): $D_{es}[n]=\alpha D_{es}[n-1]+(1-\alpha)D_e[n]$, where $D_e[n]$ indicates the DOA estimate calculated for pulse n (possibly as a combination of DOA estimates from ultrasound and audio-frequency measurements), $D_{es}[n-1]$ indicates the smoothed DOA estimate for the previous pulse [n−1], $D_{es}[n]$ indicates the smoothed DOA estimate for pulse n, and $\alpha$ indicates a smoothing factor having a value in the range of from zero (no smoothing) to one (maximum smoothing, no updating). Examples of values for smoothing factor $\alpha$ include 0.05, 0.1, 0.2, 0.25, 0.3, 0.4, and 0.5.

For a DOA estimation technique that is based on times-of-flight to different detectors, it may be desirable to increase the separation between peaks of reflected echoes on the time axis by using larger inter-microphone distances. Alternatively or additionally, it may be desirable to distinguish these separate reflective peaks by using multiple directional elements, or a distributed mode actuator, and using time-domain multiplexing of the emitted waveform.

Estimation of DOA from detected ultrasound signals may also be used with estimation of DOA from detected audio-frequency signals to resolve a range ambiguity by enabling the rejection of range information for objects (e.g., people) that are moving but silent. In such case, task T100 may be configured to resolve a range ambiguity by rejecting a range associated with an object whose ultrasound DOA is different than the current audio-frequency DOA estimate.

While ultrasound can be used to identify sources of non-audible sound emissions, the use of ultrasound may also lead to many reflection signals that are irrelevant to human object tracking. In the presence of a continuous ultrasound wave, a talking human source may be identified by an interferometry process, as the vibrations of the throat and chest provide a phase-modulated reflection. Method M100 may be configured to include emission of such a non-pulsed signal (e.g., between ranging pulses, or by another emitter at a different frequency than the frequency of the ranging pulses), and detection of such a phase-modulated reflection may be used to indicate the presence of voice activity (e.g., as opposed to a directional audio-frequency noise signal).

FIG. 27A shows a block diagram of an apparatus A100 according to a general configuration that includes an ultrasound range estimator 100, a comparator 200, and a passive DOA estimator 300. Ultrasound range estimator 100 is configured to estimate a range based on information from a detected ultrasonic signal SU10 (e.g., by performing an implementation of task T100 as described herein). Comparator 200 is configured to indicate a state of a relation between the estimated range and a threshold value (e.g., by performing an implementation of task T200 as described herein). Passive DOA estimator 300 is configured to produce an estimated direction of arrival DE10 of an audio-frequency component of channels S10-1 and S10-2 of a multichannel signal, based on the indicated state of the relation (e.g., by performing an implementation of task T300 as described herein). Detected ultrasound signal SU10 may be a channel of the multichannel signal.

Each of ultrasound range estimator 100 and passive DOA estimator 300 may be implemented to operate in the time domain or in a frequency domain (e.g., a subband domain or a transform domain, such as a fast Fourier transform (FFT) domain). FIG. 27B shows a block diagram of an application of an implementation A110 of apparatus A100 in which channels S10-1 and S10-2 of a multichannel signal are transformed to the frequency domain by respective FFT modules FFT1 and FFT2. Apparatus A110 includes an implementation 110 of ultrasound range estimator 100 that is configured and arranged to receive channel S10-1 as detected ultrasound signal SU10 in the FFT domain and an implementation 310 of passive DOA estimator 300 that is configured and arranged to receive channels S10-1 and S10-2 in the FFT domain.

For a case in which detected ultrasound signal SU10 is a channel of the multichannel signal (i.e., is based on a signal produced by one among an array of microphones), it may be desirable to sample the channel at a suitably high sampling rate (e.g., more than twice the frequency of the emitted ultrasound signal). To reduce power consumption and/or computational complexity, however, it may be desirable to configure passive DOA estimator 300 to operate on the channels at a lower sampling rate (e.g., 7, 8, 12, 16, 20, 22, 24, 32, 44, 1 or 48 kHz).

FIG. 28A shows a block diagram of an implementation A120 of apparatus A100 that includes a filter bank FB10 that is arranged to receive first channel S10-1 at a high sampling rate. Filter bank FB10 is configured to produce a high-frequency (i.e., ultrasonic) band at the high sampling rate as detected ultrasound signal UD10 and to produce a low-frequency (i.e., audio-frequency) band at a lower sampling rate (e.g., by decimation and/or resampling) as input to passive DOA estimator 300. In this example, apparatus A120 receives channel S10-2 at the lower sampling rate, although apparatus A120 may also be implemented to decimate and/or resample second channel S10-2 from the high sampling rate in a similar manner. In this particular example, apparatus A120 also includes FFT modules FFT1, FFT2 that are configured to provide channels S10-1 and S10-2 in the FFT domain to an instance of passive DOA estimator 310.

Apparatus A100 may be implemented to use detected ultrasound signals from more than one detector (e.g., from more than one microphone of the array) for range estimation and possibly for DOA estimation. FIG. 28B shows a block diagram of an application of an implementation A130 of apparatus A100 in which four channels S10-1, S10-2, S10-3, and S10-4 of a multichannel signal are transformed to the FFT domain by respective FFT modules FFT1 to FFT4. In this example, an implementation 112 of range estimator 110 is configured to receive the frequency-domain channels as a multichannel instance of detected ultrasound signal SU10 (e.g., as shown in FIGS. 24-26), and an implementation 312 of passive DOA estimator 310 calculates an estimated DOA of an audio-frequency component of the multichannel signal. Apparatus A130 may also be configured to perform a spatially selective processing operation that includes selecting a subset of the four channels based on the estimated DOA (e.g., selecting the pair of channels that corresponds to the microphone pair whose endfire direction coincides with the estimated DOA). Additional disclosure of microphone array subset selection based on estimated DOA is found in U.S. patent application Ser. No. 13/029,582 (filed Feb. 17, 2011).

FIG. 29A shows a block diagram of an implementation A140 of apparatus A100 (e.g., of apparatus A110, A120, and/or A130) that includes an ultrasound signal generator SG10. Signal generator SG10 is configured to generate an ultrasound ranging signal SR10 (e.g., a series of pulses) to be emitted by emitter UE10. In this example, signal generator SG10 also indicates, to range estimator 100, the time at which each pulse is generated. In another example, range estimator 100 determines the time of each pulse emission (i.e., the beginning of the time-of-flight) from detected ultrasound signal SU10 instead.

It may be desirable to implement ultrasound range estimator 100 to select among more than one calculated range (e.g., to resolve a range ambiguity as described herein). FIG. 29B shows a block diagram of an implementation 120 of ultrasound range estimator 100. Range estimator 120 includes a range calculator 102, which is configured to calculate at least one range for detected ultrasound signal SU10 as described herein. For example, range calculator 102 may be configured to calculate a range from each of one or more echoes of an emitted ultrasound pulse.

Range estimator 120 also includes range selection logic 104 that is configured to select from among the calculated ranges as described herein. For example, range selection logic 104 may be configured to select the smallest among the calculated ranges (or the maximum of the smallest calculated range and a minimum range value).

In this example, range estimator 120 also includes a range history 106 that is configured to store a series of estimated ranges of a desired source over time. Range selection logic 104 may be configured to use range history 106 to select a moving range (e.g., a current calculated range that is not present in range history 106). Range history 106 may include a history of locations (e.g., ranges and DOAs) of the desired source, and may also be configured to include ranges and/or DOAs of more than one desired source and/or a map of other objects in the field of view.

Range estimator 120 may be implemented to include more than one instance of range calculator 102, each corresponding to a different channel of a multichannel instance of detected ultrasound signal SU10. Apparatus A100 may be configured to use multiple ranges of the same echo for active DOA estimation as described herein. In such case, range selection logic 104 may be configured to select from among several candidate locations, based on an audio-frequency and/or ultrasound DOA estimate, and to select the range corresponding to the selected location.

FIG. 30A shows a block diagram of an implementation A150 of apparatus A100 (e.g., of apparatus A110, A120, A130, and/or A140) that includes an active DOA estimator 400. Active DOA estimator 400 is configured to calculate a second estimate of a DOA of the audio-frequency component. Active DOA estimator 400 may be configured to calculate the second DOA estimate based on differences in gain and/or phase between the same echo as received by two or more detectors. Alternatively or additionally, active DOA estimator 400 may be configured to calculate the second DOA estimate based on differences in times-of-flight of the same echo to each of a plurality of detectors. In such case, active DOA estimator 400 may be configured and arranged to receive multiple ranges from the same echo from range estimator 120. An implementation of apparatus A150 that includes an instance of range estimator 120 may be configured to use the active DOA estimate to update range history 106.

Apparatus A150 also includes a combiner 500 that is configured to combine the DOA estimates produced by estimators 300 and 400 according to a relative weighting to obtain a combined estimate of a direction of arrival. The relative weighting may be based on a gain of the audio-frequency component (e.g., such that the relative weighting of the audible DOA is heavier when the audible level is high than when it is low or silent). Additionally or alternatively, the relative weighting may be based on a difference between the calculated DOA estimates (e.g., such that the ultrasound DOA estimate is weighted less heavily when it is very different from the audible DOA estimate, especially when the level of the audio-frequency component is high and/or the audible DOA estimate is consistent with recent combined DOA estimates).

Additionally or alternatively, the relative weighting applied by combiner 500 may be based on a difference between times-of-flight of successive ultrasound signals. A zero or otherwise very low difference between times-of-flight of successive ultrasound signals may indicate that the source has moved into an ultrasound blind zone, for example, such that the reliability of a corresponding ultrasound DOA estimate may be reduced. In this case, it may be desirable to reduce the relative weighting applied by combiner 500 to the ultrasound DOA estimate.

FIG. 30B shows a block diagram of an apparatus MF100 according to a general configuration. Apparatus MF100 includes means F100 for estimating a range based on information from a detected ultrasonic signal US10 (e.g., by performing an implementation of task T100 as described herein). Apparatus MF100 also includes means F200 for indicating a state of a relation between the estimated range and a threshold value (e.g., by performing an implementation of task T200 as described herein). Apparatus MF100 also includes means F300 for producing an estimated direction of arrival DE10 of an audio-frequency component of channels S10-1 and S10-2 of a multichannel signal, based on the indicated state of the relation (e.g., by performing an implementation of task T300 as described herein).

Figure 31:
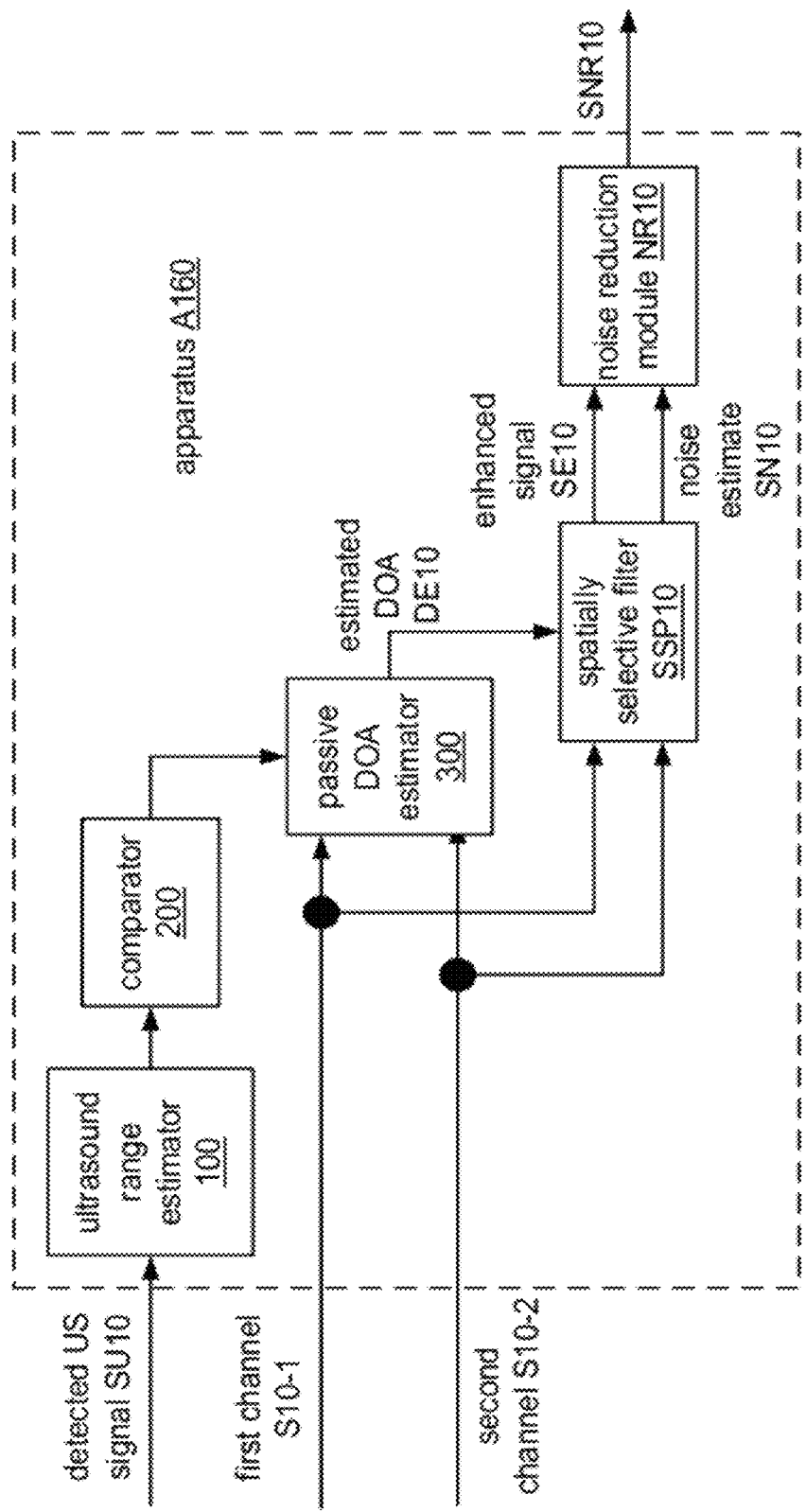
FIG. 31 shows a block diagram of an implementation A160 of apparatus A100.

FIG. 31 shows a block diagram of an implementation A160 of apparatus A100 (e.g., of apparatus A110, A120, A130, A140, and/or A150) that includes a spatially selective filter SSP10. Filter SSP10 is configured to perform one or more spatially selective processing operations on the multichannel signal. For example, filter SSP10 may be configured to produce an enhanced signal SE10 by attenuating frequency components of the multichannel signal that arrive from directions that are different than estimated DOA DE10 (e.g., from directions that are outside an accepted range of directions around estimated DOA DE10, such as nonselected sectors). For a case in which the multichannel signal includes more than two channels, filter SSP10 may be configured to select a subset (e.g., a pair) of channels based on estimated DOA DE10. For example, filter SSP10 may be configured to select the pair of channels that correspond to the microphone pair whose endfire (i.e., axis) direction coincides most closely with estimated DOA DE10.

Alternatively or additionally, filter SSP10 may be configured to calculate an estimate SN10 of a noise component of the multichannel signal that includes frequency components that arrive from directions different from estimated DOA DE10 (e.g., from nonselected sectors). Apparatus A160 also includes a noise reduction module NR10 that is configured to use noise estimate SN10 to perform a noise reduction operation on one or more channels of enhanced signal SE10 (e.g., Wiener filtering or spectral subtraction of noise estimate SN10 from one or more channels of enhanced signal SE10). Other applications of estimated DOA DE10 include selection of a focus window in an imaging operation (e.g., using a camera of the audio sensing device).

In general, the ranging and DOA estimation strategies described herein may be implemented using a fixed-location or portable audio sensing device that has an ultrasonic emitter and an array of two or more microphones configured to receive acoustic signals. Examples of a portable audio sensing device that may be constructed to include such an emitter and array and to be used with these ranging and DOA estimation strategies for audio recording and/or voice communications applications include a telephone handset (e.g., a smartphone or other cellular telephone handset); a handheld audio and/or video recorder; a personal media player configured to record audio and/or video content; and a notebook computer, laptop computer, netbook computer, tablet computer, or other portable computing device. Other examples of audio sensing devices that may be constructed to include such an emitter and array and to be used with these ranging and DOA estimation strategies include set-top boxes and audio- and/or video-conferencing devices.

Each of the two or more microphones of the array may have a response that is omnidirectional, bidirectional, or unidirectional (e.g., cardioid). The various types of microphones that may be used in the array include (without limitation) piezoelectric microphones, dynamic microphones, and electret microphones. In a device for portable voice communications, such as a handset, the center-to-center spacing between adjacent microphones of the array is typically in the range of from about four to five centimeters, although a larger spacing (e.g., up to ten or fifteen centimeters) is also possible in a device such as a smartphone, and even larger spacings (e.g., up to 20, 25 or 30 centimeters or more) are possible in a device such as a tablet computer. The microphones of the array may be arranged along a line or, alternatively, such that their centers lie at the vertices of a two-dimensional (e.g., triangular) or three-dimensional shape. In general, however, the microphones of the array may be disposed in any configuration deemed suitable for the particular application.

During the operation of a multi-microphone audio sensing device as described herein, the microphone array produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

It may be desirable for the array to perform one or more processing operations on the signals produced by the microphones to produce multichannel signal S10. FIG. 32A shows a block diagram of an example R100 of a microphone array that includes microphones MC10 and MC20. Array R100 also includes an audio preprocessing stage AP10 that is configured to perform one or more such operations on the signals produced by the microphones, which may include (without limitation) impedance matching, analog-to-digital conversion, gain control, and/or filtering in the analog and/or digital domains.

FIG. 32B shows a block diagram of an implementation R110 of array R100. Array R110 includes an implementation AP20 of audio preprocessing stage AP10 that includes analog preprocessing stages P10a and P10b. In one example, stages P10a and P10b are each configured to perform a highpass filtering operation (e.g., with a cutoff frequency of 50, 100, or 200 Hz) on the corresponding microphone signal.

It may be desirable for the microphone array to produce the multichannel signal as a digital signal, that is to say, as a sequence of samples. Array R110, for example, includes analog-to-digital converters (ADCs) C10a and C10b that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 44.1 or 48 kHz may also be used. In this particular example, array R210 also includes digital preprocessing stages P20a and P20b that are each configured to perform one or more preprocessing operations (e.g., echo cancellation, noise reduction, and/or spectral shaping) on the corresponding digitized channel.

For a case in which the microphone array is used to produce detected ultrasound signal UD10 as well as multichannel signal S10, it may be desirable to configure converters C10a and C10b to use a sampling rate that is more than twice the frequency of the emitted ultrasound signal. In such case, it may also be desirable to configure the array to provide detected ultrasound signal UD10 at the output of converter C10a and/or C10b (i.e., as opposed to the processed signal at the output of stage P10a and/or P20b). Extensions of the example of array R100 and R110 to more than two (e.g., three, four, or five) microphones are expressly contemplated and hereby disclosed.

Figure 33A:
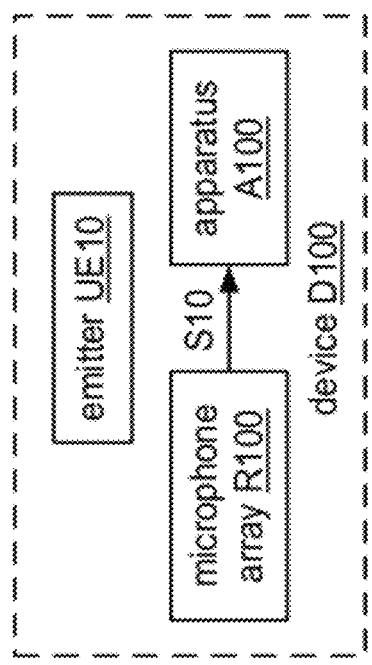
FIG. 33A shows a block diagram of an implementation D100 of audio sensing device D20.

FIG. 33A shows a block diagram of an implementation D100 of audio sensing device D20 (e.g., of D22 or D24). Device D100 includes an instance of any of the implementations of microphone array R100 disclosed herein. Device D100 also includes an instance of any of the implementations of apparatus A100 (alternatively, MF100) described herein that is configured to process a multichannel signal S10 produced by array R100. For example, apparatus A100 may be configured to process multichannel signal S10 according to an instance of any of the implementations of method M100 disclosed herein. Apparatus A100 may be implemented in hardware or in a combination of hardware with software (e.g., firmware). For example, apparatus A100 may be implemented on a processor of device D100 that is also configured to perform a spatially selective processing operation as described herein on the processed multichannel signal (e.g., one or more operations that determine the distance between the audio sensing device and a particular sound source, reduce noise, enhance signal components that arrive from a particular direction, and/or separate one or more sound components from other environmental sounds).

Figure 33B:
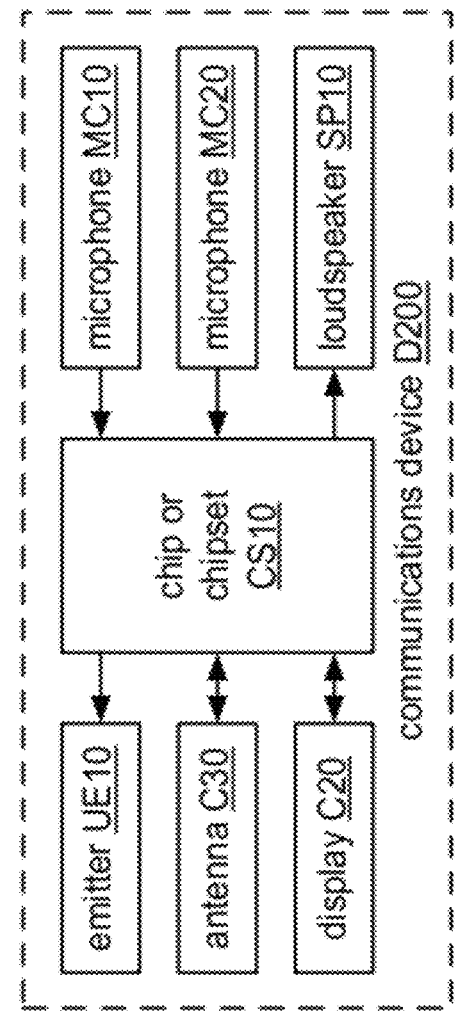
FIG. 33B shows a block diagram of a communications device D200.

FIG. 33B shows a block diagram of a communications device D200 (e.g., a smartphone) that is an implementation of device D100. Device D200 includes a chip or chipset CS10 (e.g., a mobile station modem (MSM) chipset) that includes apparatus A100. Chip/chipset CS10 may include one or more processors, which may be configured to execute one or more software and/or firmware parts of apparatus A100 (e.g., as instructions). Chip/chipset CS10 may also include processing elements of array R100 (e.g., elements of audio preprocessing stage AP10). Chip/chipset CS10 includes a receiver, which is configured to receive a radio-frequency (RF) communications signal via antenna C30 and to decode and reproduce an audio signal encoded within the RF signal via loudspeaker SP10, and a transmitter, which is configured to encode an audio signal that is based on a processed signal produced by apparatus A100 and to transmit an RF communications signal that describes the encoded audio signal via antenna C30. For example, one or more processors of chip/chipset CS10 may be configured to perform a noise reduction operation as described above on one or more channels of the multichannel signal such that the encoded audio signal is based on the noise-reduced signal. Chip/chipset CS10 is also configured to display information and receive user input via touchscreen display C20 and to drive emitter UE10 (e.g., to include an instance of signal generator SG10 as described herein).

The class of portable computing devices currently includes devices having names such as laptop computers, notebook computers, netbook computers, ultra-portable computers, tablet computers, mobile Internet devices, smartbooks, and smartphones. One type of such device has a slate or slab configuration and may also include a slide-out keyboard. FIGS. 34A-D show another type of such device that has a top panel which includes a display screen and a bottom panel that may include a keyboard, wherein the two panels may be connected in a clamshell or other hinged relationship.

FIG. 34A shows a front view of an example of such a portable computing implementation D700 of device D100 that includes ultrasonic emitter UE10 and four microphones MC10, MC20, MC30, MC40 arranged in a linear array on top panel (e.g., bezel) PL10 above display screen SC10. FIG. 34B shows a top view of top panel PL10 that shows the positions of the four microphones in another dimension. FIG. 34C shows a front view of another example of such a portable computing device D710 that includes ultrasonic emitter UE10 and four microphones MC10, MC20, MC30, MC40 arranged in a nonlinear array on top panel PL12 above display screen SC10. FIG. 34D shows a top view of top panel PL12 that shows the positions of the four microphones in another dimension, with microphones MC10, MC20, and MC30 disposed at the front face of the panel and microphone MC40 disposed at the back face of the panel. FIGS. 16B and 17 show close-ups of array R100 and emitter UE10 on similar devices.

It may be expected that the user may move from side to side in front of such a device D700 or D710, toward and away from the device, and/or even around the device (e.g., from the front of the device to the back) during use. It may be desirable to implement an associated processing system as described herein to provide a suitable tradeoff between preservation of near-field speech and attenuation of far-field interference, and/or to provide nonlinear signal attenuation in undesired directions. It may be desirable to select a linear microphone configuration for minimal voice distortion, or a nonlinear microphone configuration for better noise reduction.

FIG. 35 shows a diagram of a portable implementation D800 of multimicrophone audio sensing device D100 for handheld applications. Device D800 includes emitter UE10, a touchscreen display TS10, a user interface selection control UI10 (left side), a user interface navigation control UI20 (right side), two loudspeakers SP10 and SP20, and an implementation of array R100 that includes three front microphones MC10, MC20, MC30 and a back microphone MC40. Each of the user interface controls may be implemented using one or more of pushbuttons, trackballs, click-wheels, touchpads, joysticks and/or other pointing devices, etc. Device D800 may also include a camera CAM in the display face of the device and/or in the back face of the device (i.e., the face that is opposite the touchscreen display). A typical size of device D800, which may be used in a browse-talk mode or a game-play mode, is about fifteen centimeters by twenty centimeters. A portable multimicrophone audio sensing device may be similarly implemented as a tablet computer that includes a touchscreen display on a top surface (e.g., a "slate," such as the iPad (Apple, Inc.), Slate (Hewlett-Packard Co., Palo Alto, Calif.) or Streak (Dell Inc., Round Rock, Tex.)), with microphones of array R100 being disposed within the margin of the top surface (e.g., within a screen bezel) and/or at one or more side surfaces of the tablet computer.

Applications of range and DOA estimation strategies as disclosed herein are not limited to portable audio sensing devices. FIGS. 36A-D show top views of several examples of a conferencing device that includes an omnidirectional (e.g., cylindrical) implementation of ultrasonic emitter UE10. FIG. 36A includes a three-microphone implementation of array R100 (microphones MC10, MC20, and MC30). FIG. 36B includes a four-microphone implementation of array R100 (microphones MC10, MC20, MC30, and MC40). FIG. 36C includes a five-microphone implementation of array R100 (microphones MC10, MC20, MC30, MC40, and MC50). FIG. 36D includes a six-microphone implementation of array R100 (microphones MC10, MC20, MC30, MC40, MC50, and MC60). It may be desirable to position each of the microphones of array R100 at a corresponding vertex of a regular polygon. A loudspeaker for reproduction of the far-end audio signal may be included within the device, and/or such a loudspeaker may be located separately from the device (e.g., to reduce acoustic feedback).

Additional stationary use case examples of device D100, which may be configured to support interactive and/or communications applications (e.g., via a Voice over IP (VoIP) protocol), include a game console (e.g., any of the consoles in the Microsoft Xbox, Sony Playstation, or Nintendo Wii series) and a television set-top box, such as for satellite television, cable television, digital video recording (DVR), or streaming television use (e.g., Revue (Logitech, Inc., Fremont, Calif.); Roku HD, XD, or XDIS (Roku, Inc., Saratoga, Calif.); Apple TV (Apple Inc., Cupertino, Calif.)).

Figure 38:
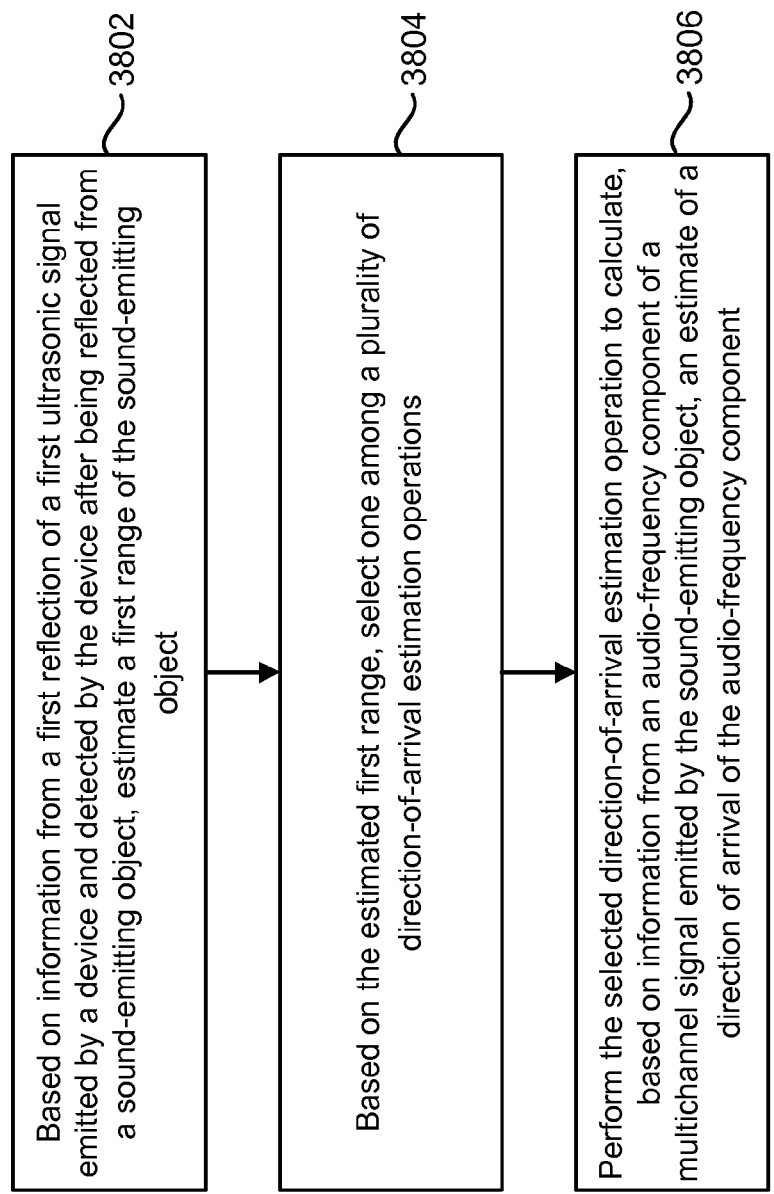
FIG. 38 is a flow diagram of a process of direction estimation in accordance with one embodiment.

FIG. 38 illustrates a method 3800 of signal processing that includes estimating 3802 a range of a sound-emitting object, based on information from a first reflection of a first ultrasonic signal emitted by a device and detected by the device after being reflected from a sound-emitting object. The method 3800 also includes selecting 3804 one among a plurality of direction-of-arrival estimation operations, based on the estimated first range. The method 3800 also includes performing 3806 the selected direction-of-arrival estimation operation to calculate, based on information from an audio-frequency component of a multichannel signal emitted by the sound-emitting object, an estimate of a direction of arrival of the audio-frequency component.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The presentation of the configurations described herein is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as applications for voice communications at sampling rates higher than eight kilohertz (e.g., 12, 16, 44.1, 48, or 192 kHz).

Goals of a multi-microphone processing system as described herein may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing (e.g., spectral masking and/or another spectral modification operation based on a noise estimate, such as spectral subtraction or Wiener filtering) for more aggressive noise reduction.

The various elements of an implementation of an apparatus as disclosed herein (e.g., apparatus A100, A110, A120, A130, A140, A150, A160, or MF100) may be embodied in any hardware structure, or any combination of hardware with software and/or firmware, that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may also be implemented in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100, such as a task relating to another operation of a device or system in which the processor is embedded (e.g., an audio sensing device). It is also possible for part of a method as disclosed herein to be performed by a processor of the audio sensing device (e.g., passive DOA estimation task T300) and for another part of the method to be performed under the control of one or more other processors (e.g., range estimation task T100).

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., method M100 and the other methods disclosed with reference to operation of the various apparatus and devices described herein) may be performed by an array of logic elements such as a processor, and that the various elements of an apparatus as described herein may be implemented in part as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to store the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media, such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device (e.g., a smartphone or other handset), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times). For example, one or more (possibly all) of FFT modules FFT1 to FFT4 may be implemented to use the same structure (e.g., the same set of instructions defining an FFT operation) at different times.

What is claimed is:

1. A method of signal processing with a device, said method comprising:
   based on information from a first reflection of a first ultrasonic signal emitted by the device and detected by the device after being reflected from a sound-emitting object, estimating a first range of the sound-emitting object from the device;

based on the estimated first range, selecting one among a gain-difference-based direction-of-arrival estimation operation and a phase-difference-based direction-of-arrival estimation operation, wherein the gain-difference-based direction-of-arrival estimation operation determines a difference between gains of signals that are based on channels of a multichannel signal, wherein the phase-difference-based direction-of-arrival estimation operation determines a difference between phases of different channels of the multichannel signal, and wherein the multichannel signal is based on at least one signal produced by at least one detector in response to the first reflection of the first ultrasonic signal by the sound-emitting object; and performing the selected direction-of-arrival estimation operation to calculate, based on information from an audio-frequency component of the multichannel signal, an estimate of a direction of arrival of the audio-frequency component.

2. The method according to claim 1, wherein a first channel of the multichannel signal is based on a signal produced by a first detector and a second channel of the multichannel signal is based on a signal produced by a second detector.

3. The method according to claim 2, wherein said estimating the first range includes calculating a time of flight of the first ultrasonic signal to the first detector, and wherein said information from the first reflection of the first ultrasonic signal includes said calculated time of flight of the first ultrasonic signal to the first detector.

4. The method according to claim 1, wherein said estimating the first range includes calculating a time of flight of the first ultrasonic signal to a first detector, and wherein said information from the first reflection of the first ultrasonic signal includes said calculated time of flight of the first ultrasonic signal to the first detector, and wherein said estimating the first range includes calculating a time of flight of the first ultrasonic signal to a second detector, and wherein said information from the first reflection of the first ultrasonic signal includes said calculated time of flight of the first ultrasonic signal to the second detector.

5. The method according to claim 4, wherein the audio-frequency component of the multichannel signal is based on signals produced by the first and second detectors.

6. The method according to claim 4, wherein said method comprises, based on the calculated times of flight of the first ultrasonic signal to the first and second detectors, calculating a second estimate of a direction of arrival of the audio-frequency component.

7. The method according to claim 6, wherein said method comprises combining the calculated estimate of a direction of arrival and the calculated second estimate according to a relative weighting to obtain a combined estimate of a direction of arrival, wherein the relative weighting is based on information associated with the audio-frequency component.

8. The method according to claim 7, wherein the relative weighting is based on a difference between the calculated estimate of a direction of arrival and the calculated second estimate.

9. The method according to claim 7, wherein said method includes calculating a time of flight of a second ultrasonic signal to the first detector, wherein the second ultrasonic signal is emitted by the device and detected by the device after being reflected from the sound-emitting object, and wherein the relative weighting is based on a difference between the times of flight of the first and second ultrasonic signals to the first detector.

10. The method according to claim 2, wherein said method comprises:

based on information from a second reflection of the first ultrasonic signal, estimating a second range;

based on information from a first reflection of a second ultrasonic signal that is emitted by the device after the first ultrasonic signal, estimating a third range;

based on information from a second reflection of the second ultrasonic signal, estimating a fourth range, wherein the first and second reflections of the second ultrasonic signal are detected after being reflected from the sound-emitting object or other surrounding object;

based on a relation between (A) a difference between the first and third ranges and (B) a difference between the second and fourth ranges, selecting one among the third and fourth ranges;

based on the selected range, performing a second selection of one among the gain-difference-based direction-of-arrival estimation operation and the phase-difference-based direction-of-arrival estimation operation; and performing the direction-of-arrival estimation operation selected by the second selection to calculate, based on information from the audio-frequency component, a second estimate of the direction of arrival of the audio-frequency component.

11. The method according to claim 2, wherein said method comprises:

calculating a time of flight of a second ultrasonic signal to the first detector and a time of flight of the second ultrasonic signal to the second detector, wherein the second ultrasonic signal is emitted by the device and detected after being reflected from the sound-emitting object;

detecting that (A) a difference between a time of flight of the first ultrasonic signal to the first detector and the time of flight of the second ultrasonic signal to the first detector does not exceed a threshold value and (B) the time of flight of the second ultrasonic signal differs from the time of flight of the first ultrasonic signal; and in response to said detecting, updating the estimated first range based on the time of flight of the second ultrasonic signal.

12. The method according to claim 1, wherein said method includes:

based on the estimate of the direction of arrival of the audio-frequency component, selecting a portion of an image as a focus window; and based on the estimated first range of the sound-emitting object and on information from the focus window, performing a camera focus operation.

13. The method according to claim 1, wherein the gain-difference-based direction-of-arrival estimation operation includes calculating the estimate based on a difference in gain between channels of the audio-frequency component.

14. The method according to claim 1, wherein the gain-difference-based direction-of-arrival estimation operation includes calculating the estimate based on a difference in gain between beams generated from the audio-frequency component.

15. The method according to claim 1, wherein the phase-difference-based direction-of-arrival estimation operation includes calculating the estimate based on a difference in phase between channels of the audio-frequency component.

16. The method according to claim 1, wherein said selecting one among the gain-difference-based direction-of-arrival estimation operation and the phase-difference-based direction-of-arrival estimation operation comprises:
comparing the estimated first range to a threshold value;
if the estimated first range is less than the threshold value, selecting the phase-difference-based direction-of-arrival estimation operation; and
if the estimated first range is greater than the threshold value, selecting the gain-difference-based direction-of-arrival estimation operation.

17. The method according to claim 1, wherein the audio-frequency component includes sound emitted by the sound-emitting object.

18. An apparatus for signal processing, said apparatus comprising:
means for estimating a first range of a sound-emitting object from the apparatus, based on information from a first reflection of a first ultrasonic signal emitted by the apparatus and detected by the apparatus after being reflected from the sound-emitting object;
means for selecting one among a gain-difference-based direction-of-arrival estimation operation and a phase-difference-based direction-of-arrival estimation operation based on the estimated first range, wherein the gain-difference-based direction-of-arrival estimation operation determines a difference between gains of signals that are based on channels of a multichannel signal, wherein the phase-difference-based direction-of-arrival estimation operation determines a difference between phases of different channels of the multichannel signal, and wherein the multichannel signal is based on at least one signal produced by at least one detector in response to the first reflection of the first ultrasonic signal by the sound-emitting object; and
means for performing the selected direction-of-arrival estimation operation to calculate, based on information from an audio-frequency component of the multichannel signal, an estimate of a direction of arrival of the audio-frequency component.

19. The apparatus according to claim 18, wherein a first channel of the multichannel signal is based on a signal produced by a first detector and a second channel of the multichannel signal is based on a signal produced by a second detector.

20. The apparatus according to claim 19, wherein said means for estimating the first range includes means for calculating a time of flight of the first ultrasonic signal to the first detector, and wherein said information from the first reflection of the first ultrasonic signal includes said calculated time of flight of the first ultrasonic signal to the first detector.

21. The apparatus according to claim 18, wherein said means for estimating the first range includes means for calculating a time of flight of the first ultrasonic signal to a first detector, and wherein said information from the first reflection of the first ultrasonic signal includes said calculated time of flight of the first ultrasonic signal to the first detector, and
wherein said means for estimating the first range includes means for calculating a time of flight of the first ultrasonic signal to a second detector, and wherein said information from the first reflection of the first ultrasonic signal includes said calculated time of flight of the first ultrasonic signal to the second detector.

22. The apparatus according to claim 21, wherein the audio-frequency component of the multichannel signal is based on signals produced by the first and second detectors.

23. The apparatus according to claim 21, wherein said apparatus comprises means for calculating a second estimate of a direction of arrival of the audio-frequency component, based on the calculated times of flight of the first ultrasonic signal to the first and second detectors.

24. The apparatus according to claim 23, wherein said apparatus comprises means for combining the calculated estimate of a direction of arrival and the calculated second estimate according to a relative weighting to obtain a combined estimate of a direction of arrival,
wherein the relative weighting is based on information associated with the audio-frequency component.

25. The apparatus according to claim 24, wherein the relative weighting is based on a difference between the calculated estimate of a direction of arrival and the calculated second estimate.

26. The apparatus according to claim 24, wherein said apparatus includes means for calculating a time of flight of a second ultrasonic signal to the first detector, wherein the second ultrasonic signal is emitted by the apparatus and detected by the apparatus after being reflected from the sound-emitting object, and
wherein the relative weighting is based on a difference between the times of flight of the first and second ultrasonic signals to the first detector.

27. The apparatus according to claim 19, wherein said apparatus comprises:
means for estimating a second range based on information from a second reflection of the first ultrasonic signal;
means for estimating a third range based on information from a first reflection of a second ultrasonic signal that is emitted by the apparatus after the first ultrasonic signal;
means for estimating a fourth range based on information from a second reflection of the second ultrasonic signal, wherein the first and second reflections of the second ultrasonic signal are detected after being reflected from the sound-emitting object or other surrounding object;
means for selecting one among the third and fourth ranges based on a relation between (A) a difference between the first and third ranges and (B) a difference between the second and fourth ranges;
means for performing a second selection of one among the gain-difference-based direction-of-arrival estimation operation and the phase-difference-based direction-of-arrival estimation operation, based on the selected range; and
means for performing the direction-of-arrival estimation operation selected by the second selection to calculate, based on information from the audio-frequency component, a second estimate of the direction of arrival of the audio-frequency component.

28. The apparatus according to claim 19, wherein said apparatus comprises:
means for calculating a time of flight of a second ultrasonic signal to the first detector and a time of flight of the second ultrasonic signal to the second detector, wherein the second ultrasonic signal is emitted by the apparatus and detected after being reflected from the sound-emitting object;
means for detecting that (A) a difference between a time of flight of the first ultrasonic signal to the first detector and the time of flight of the second ultrasonic signal to the first detector does not exceed a threshold value and (B) the time of flight of the second ultrasonic signal differs from the time of flight of the first ultrasonic signal; and
means for updating the estimated first range, in response to said detecting, based on the time of flight of the second ultrasonic signal.

29. The apparatus according to claim 18, wherein the gain-difference-based direction-of-arrival estimation operation includes calculating the estimate based on a difference in gain between channels of the audio-frequency component.

30. The apparatus according to claim 18, wherein the gain-difference-based direction-of-arrival estimation operation includes calculating the estimate based on a difference in gain between beams generated from the audio-frequency component.

31. The apparatus according to claim 18, wherein the phase-difference-based direction-of-arrival estimation operation includes calculating the estimate based on a difference in phase between channels of the audio-frequency component.

32. The apparatus according to claim 18, wherein said means for selecting one among the gain-difference-based direction-of-arrival estimation operation and the phase-difference-based direction-of-arrival estimation operation comprises:
 means for comparing the estimated first range to a threshold value;
 means for selecting the phase-difference-based direction-of-arrival estimation operation, if the estimated first range is less than the threshold value; and
 means for selecting the gain-difference-based direction-of-arrival estimation operation, if the estimated first range is greater than the threshold value.

33. The apparatus according to claim 18, wherein the audio-frequency component includes sound emitted by the sound-emitting object.

34. An apparatus for signal processing, said apparatus comprising:
 a range estimator configured to estimate a first range of a sound-emitting object from the apparatus, based on information from a first reflection of a first ultrasonic signal emitted by the apparatus and detected by the apparatus after being reflected from the sound-emitting object;
 a comparator configured to select one among a gain-difference-based direction-of-arrival estimation operation and a phase-difference-based direction-of-arrival estimation operation, based on the estimated first range wherein the gain-difference-based direction-of-arrival estimation operation determines a difference between gains of signals that are based on channels of a multichannel signal, wherein the phase-difference-based direction-of-arrival estimation operation determines a difference between phases of different channels of the multichannel signal, and wherein the multichannel signal is based on at least one signal produced by at least one detector in response to the first reflection of the first ultrasonic signal by the sound-emitting object; and
 a direction calculator configured to perform the selected direction-of-arrival estimation operation to calculate, based on information from an audio-frequency component of the multichannel signal, an estimate of a direction of arrival of the audio-frequency component.

35. The apparatus according to claim 34, wherein a first channel of the multichannel signal is based on a signal produced by a first detector and a second channel of the multichannel signal is based on a signal produced by a second detector.

36. The apparatus according to claim 35, wherein said range estimator is configured to calculate a time of flight of the first ultrasonic signal to the first detector, and wherein said information from the first reflection of the first ultrasonic signal includes said calculated time of flight of the first ultrasonic signal to the first detector.

37. The apparatus according to claim 34, wherein said range estimator is configured to calculate a time of flight of the first ultrasonic signal to a first detector, and wherein said information from the first reflection of the first ultrasonic signal includes said calculated time of flight of the first ultrasonic signal to the first detector, and
 wherein said range estimator is configured to calculate a time of flight of the first ultrasonic signal to a second detector, and wherein said information from the first reflection of the first ultrasonic signal includes said calculated time of flight of the first ultrasonic signal to the second detector.

38. The apparatus according to claim 37, wherein the audio-frequency component of the multichannel signal is based on signals produced by the first and second detectors.

39. The apparatus according to claim 37, wherein said apparatus comprises a second direction calculator configured to calculate a second estimate of a direction of arrival of the audio-frequency component, based on the calculated times of flight of the first ultrasonic signal to the first and second detectors.

40. The apparatus according to claim 39, wherein said apparatus comprises a combiner configured to combine the calculated estimate of a direction of arrival and the calculated second estimate according to a relative weighting to obtain a combined estimate of a direction of arrival,
 wherein the relative weighting is based on information associated with the audio-frequency component.

41. The apparatus according to claim 40, wherein the relative weighting is based on a difference between the calculated estimate of a direction of arrival and the calculated second estimate.

42. The apparatus according to claim 40, wherein said range estimator is configured to indicate a time of flight of a second ultrasonic signal to the first detector, wherein the second ultrasonic signal is emitted by the apparatus and detected by the apparatus after being reflected from the sound-emitting object, and
 wherein the relative weighting is based on a difference between the times of flight of the first and second ultrasonic signals to the first detector.

43. The apparatus according to claim 35, wherein said range estimator is configured to estimate:
 a second range based on information from a second reflection of the first ultrasonic signal;
 a third range based on information from a first reflection of a second ultrasonic signal that is emitted by the apparatus after the first ultrasonic signal; and
 a fourth range based on information from a second reflection of the second ultrasonic signal, wherein the first and second reflections of the second ultrasonic signal are detected after being reflected from the sound-emitting object or other surrounding object, and
 wherein said apparatus comprises:
 a selector configured to select one among the third and fourth ranges based on a relation between (A) a difference between the first and third ranges and (B) a difference between the second and fourth ranges;
 a second comparator configured to perform a second selection of one among the gain-difference-based direction-of-arrival estimation operation and the phase-difference-based direction-of-arrival estimation operation, based on the selected range; and
 a second direction calculator configured to perform the direction-of-arrival estimation operation selected by the second comparator to calculate, based on information from the audio-frequency component, a second estimate of the direction of arrival of the audio-frequency component.

44. The apparatus according to claim 35, wherein said range estimator is configured to calculate a time of flight of a second ultrasonic signal to the first detector and a time of flight of the second ultrasonic signal to the second detector, wherein the second ultrasonic signal is emitted by the apparatus and detected after being reflected from the sound-emitting object; and
wherein said apparatus comprises a second comparator configured to detect that (A) a difference between a time of flight of the first ultrasonic signal to the first detector and the time of flight of the second ultrasonic signal to the first detector does not exceed a threshold value and (B) the time of flight of the second ultrasonic signal differs from the time of flight of the first ultrasonic signal, and
wherein said range estimator is configured to update the estimated first range, in response to said detecting, based on the time of flight of the second ultrasonic signal.

45. The apparatus according to claim 34, wherein the gain-difference-based direction-of-arrival estimation operation includes calculating the estimate based on a difference in gain between channels of the audio-frequency component.

46. The apparatus according to claim 34, wherein the gain-difference-based direction-of-arrival estimation operation includes calculating the estimate based on a difference in gain between beams generated from the audio-frequency component.

47. The apparatus according to claim 34, wherein the phase-difference-based direction-of-arrival estimation operation includes calculating the estimate based on a difference in phase between channels of the audio-frequency component.

48. The apparatus according to claim 34, wherein said comparator is configured to compare the estimated first range to a threshold value, to select the phase-difference-based direction-of-arrival estimation operation if the estimated first range is less than the threshold value, and to select the gain-difference-based direction-of-arrival estimation operation if the estimated first range is greater than the threshold value.

49. The apparatus according to claim 34, wherein the audio-frequency component includes sound emitted by the sound-emitting object.

50. A communications device including an apparatus according to claim 34.

51. A non-transitory computer-readable storage medium having tangible features that cause a machine reading the features to:
estimate a first range of a sound-emitting object from an apparatus, based on information from a first reflection of a first ultrasonic signal emitted by the apparatus and detected by the apparatus after being reflected from the sound-emitting object;
select one among a gain-difference-based direction-of-arrival estimation operation and a phase-difference-based direction-of-arrival estimation operation based on the estimated first range, wherein the gain-difference-based direction-of-arrival estimation operation determines a difference between gains of signals that are based on channels of a multichannel signal, wherein the phase-difference-based direction-of-arrival estimation operation determines a difference between phases of different channels of the multichannel signal, and wherein the multichannel signal is based on at least one signal produced by at least one detector in response to the first reflection of the first ultrasonic signal by the sound-emitting object; and
perform the selected direction-of-arrival estimation operation to calculate, based on information from an audio-frequency component of the multichannel signal, an estimate of a direction of arrival of the audio-frequency component.

52. The medium according to claim 51, wherein the gain-difference-based direction-of-arrival estimation operation includes calculating the estimate based on a difference in gain between channels of the audio-frequency component.

53. The medium according to claim 51, wherein the gain-difference-based direction-of-arrival estimation operation includes calculating the estimate based on a difference in gain between beams generated from the audio-frequency component.

54. The medium according to claim 51, wherein the phase-difference-based direction-of-arrival estimation operation includes calculating the estimate based on a difference in phase between channels of the audio-frequency component.

55. The medium according to claim 51, wherein said selecting one among the gain-difference-based direction-of-arrival estimation operation and the phase-difference-based direction-of-arrival estimation operation comprises:
comparing the estimated first range to a threshold value;
if the estimated first range is less than the threshold value, selecting the phase-difference-based direction-of-arrival estimation operation; and
if the estimated first range is greater than the threshold value, selecting the gain-difference-based direction-of-arrival estimation operation.

* * * * *